United States Patent
Turley et al.

(10) Patent No.: US 9,761,278 B1
(45) Date of Patent: Sep. 12, 2017

(54) SYSTEMS AND METHODS FOR GENERATING RECOMMENDATIONS OF POST-CAPTURE USERS TO EDIT DIGITAL MEDIA CONTENT

(71) Applicant: GOPRO, INC., San Mateo, CA (US)

(72) Inventors: Logan Turley, Pacifica, CA (US); Stephen Grove, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/196,015

(22) Filed: Jun. 28, 2016

Related U.S. Application Data

(60) Provisional application No. 62/274,723, filed on Jan. 4, 2016.

(51) Int. Cl.
*G11B 27/36* (2006.01)
*H04N 5/232* (2006.01)
(Continued)

(52) U.S. Cl.
CPC .......... *G11B 27/36* (2013.01); *G06F 17/3082* (2013.01); *G06K 9/00718* (2013.01);
(Continued)

(58) Field of Classification Search
CPC ............ G06Q 10/101; G06F 17/30702; H04N 21/47205; H04N 21/472; H04N 21/4756; G11B 27/031
See application file for complete search history.

(56) References Cited

U.S. PATENT DOCUMENTS 7,222,356 B1 5/2007 Yonezawa
7,483,618 B1 1/2009 Edwards
(Continued)

FOREIGN PATENT DOCUMENTS

WO 2009040538 4/2009

OTHER PUBLICATIONS

Ernoult, Emeric, "How to Triple Your YouTube Video Views with Facebook", SocialMediaExaminer.com, Nov. 26, 2012, 16 pages.
(Continued)

*Primary Examiner* — Hung Dang
*Assistant Examiner* — Sunghyoun Park
(74) *Attorney, Agent, or Firm* — Sheppard Mullin Richter & Hampton LLP

(57) ABSTRACT

Contextual parameters of digital media content may be obtained. The digital media content may be associated with a content capture user and/or an end user. Editing parameters having values defining one or more editing attributes, including one or more selected moments of interest, of an edited version of the digital media content may be received. Individual post-capture user profiles may include expertise attributes associated with individual post-capture users. A set of post-capture users may be identified as potential matches for creating the edited version of the digital media content based upon one or more of values of contextual parameters, editing parameters, one or more expertise attributes of the post-capture user profiles, and/or other information. The set of post-capture users may be presented to the content capture user and/or the end user for selection of one of the post-capture users to create the edited version of the digital media content.

20 Claims, 60 Drawing Sheets

(51) Int. Cl.
| | |
|---|---|
| G06K 9/00 | (2006.01) |
| G11B 27/10 | (2006.01) |
| H04N 21/845 | (2011.01) |
| G06F 17/30 | (2006.01) |

(52) U.S. Cl.
CPC ......... *G11B 27/10* (2013.01); *H04N 5/23222* (2013.01); *H04N 21/8456* (2013.01)

(56) References Cited

U.S. PATENT DOCUMENTS

| | | |
|---|---|---|
| 8,446,433 B1 | 5/2013 | Mallet |
| 8,611,422 B1 | 12/2013 | Yagnik |
| 8,718,447 B2 | 5/2014 | Yang |
| 8,763,023 B1 | 6/2014 | Goetz |
| 9,077,956 B1 | 7/2015 | Morgan |
| 9,253,533 B1 | 2/2016 | Morgan |
| 2004/0128317 A1 | 7/2004 | Sull |
| 2005/0025454 A1 | 2/2005 | Nakamura |
| 2005/0060365 A1 | 3/2005 | Robinson |
| 2006/0156219 A1 | 7/2006 | Haot |
| 2007/0002946 A1 | 1/2007 | Bouton |
| 2007/0106419 A1 | 5/2007 | Rachamadugu |
| 2007/0168543 A1 | 7/2007 | Krikorian |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0253735 A1 | 10/2008 | Kuspa |
| 2008/0313541 A1 | 12/2008 | Shafton |
| 2009/0027499 A1 | 1/2009 | Nicholl |
| 2009/0213270 A1 | 8/2009 | Ismert |
| 2010/0086216 A1 | 4/2010 | Lee |
| 2010/0104261 A1 | 4/2010 | Liu |
| 2010/0161720 A1 | 6/2010 | Colligan |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093605 A1 | 4/2011 | Choudhury |
| 2011/0093798 A1 | 4/2011 | Shahraray |
| 2011/0206351 A1 | 8/2011 | Givoly |
| 2011/0293250 A1 | 12/2011 | Deever |
| 2012/0027381 A1 | 2/2012 | Kataoka |
| 2012/0030029 A1* | 2/2012 | Flinn ............... G06Q 10/06 705/14.66 |
| 2012/0030263 A1 | 2/2012 | John |
| 2012/0057852 A1 | 3/2012 | Devleeschouwer |
| 2012/0123780 A1 | 5/2012 | Gao |
| 2012/0192225 A1 | 7/2012 | Harwell |
| 2012/0198319 A1 | 8/2012 | Agnoli |
| 2012/0311448 A1* | 12/2012 | Achour ............... G06Q 10/101 715/723 |
| 2013/0041948 A1 | 2/2013 | Tseng |
| 2013/0104177 A1 | 4/2013 | Kwan |
| 2013/0136193 A1 | 5/2013 | Hwang |
| 2013/0151970 A1* | 6/2013 | Achour ............... H04N 21/854 715/723 |
| 2013/0166303 A1 | 6/2013 | Chang |
| 2013/0185388 A1 | 7/2013 | Mackie |
| 2013/0195429 A1 | 8/2013 | Fay |
| 2013/0197967 A1* | 8/2013 | Pinto ............... G06Q 10/0637 705/7.28 |
| 2013/0208942 A1 | 8/2013 | Davis |
| 2013/0222583 A1 | 8/2013 | Earnshaw |
| 2013/0259399 A1 | 10/2013 | Ho |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1* | 7/2014 | Saint-Jean ........... G11B 27/031 386/241 |
| 2014/0219634 A1 | 8/2014 | McIntosh |
| 2014/0226953 A1* | 8/2014 | Hou .................... H04N 21/4325 386/230 |
| 2014/0232818 A1 | 8/2014 | Carr |
| 2014/0245336 A1 | 8/2014 | Lewis, II |
| 2014/0300644 A1 | 10/2014 | Gillard |
| 2014/0328570 A1 | 11/2014 | Cheng |
| 2014/0341527 A1 | 11/2014 | Hurley |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0186073 A1 | 7/2015 | Pacurariu |
| 2015/0281710 A1 | 10/2015 | Sievert |
| 2015/0287435 A1 | 10/2015 | Land |
| 2015/0318020 A1* | 11/2015 | Pribula ............ H04N 21/43615 386/227 |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0225405 A1 | 8/2016 | Matias |
| 2016/0225410 A1 | 8/2016 | Lee |
| 2016/0234345 A1 | 8/2016 | Roberts |
| 2016/0300594 A1 | 10/2016 | Allen |
| 2016/0358603 A1 | 12/2016 | Azam |
| 2016/0366330 A1 | 12/2016 | Boliek |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the Internet <URL: https://www.ffmpeg.orgidoxyg en/2. 3/structA VP a ck et. html>.

Han et al. Deep Compression: Compressing Deep Neural Networks with Pruning, Trained Quantization and Huffman Coding, International Conference on Learning Representations 2016, 14 pgs.

He et al., "Deep Residual Learning for Image Recognition," arXiv:1512.03385, 2015, 12 pgs.

Iandola et al., "SqueezeNet: AlexNet-level accuracy with 50x fewer parameters and <0.5MB model size, " arXiv:1602.07360, 2016, 9 pgs.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Ioffe et al., "Batch Normalization: Accelerating Deep Network Training by Reducing Internal Covariate Shift," arXiv:1502.03167, 2015, 11 pgs.

Parkhi et al., "Deep Face Recognition," Proceedings of the British Machine Vision, 2015, 12 pgs.

(56) References Cited

OTHER PUBLICATIONS

PCT International Preliminary Report on Patentability for PCT/US2015/023680, dated Oct. 4, 2016.
PCT International Search Report and Written Opinion for PCT/US15/12086 dated Mar. 17, 2016 (20 pgs).
PCT International Search Report and Written Opinion for PCT/US2015/023680, dated Oct. 6, 2015 (13 pages).
PCT International Search Report and Written Opinion for PCT/US2015/023680, dated Oct. 6, 2015, 17 Pages.
PCT International Search Report for PCT/US15/23680 dated Aug. 3, 2015.
PCT International Search Report for PCT/US15/41624 dated Nov. 4, 2015.
PCT International Written Opinion for PCT/US2015/041624, dated Dec. 17, 2015, 17 Pages.
Schroff et al., "FaceNet: A Unified Embedding for Face Recognition and Clustering," IEEE Conference on Computer Vision and Pattern Recognition (CVPR), 2016, 10 pgs.
Tran et al., "Learning Spatiotemporal Features with 3D Convolutional Networks", arXiv:1412.0767 [cs.CV] Dec. 2, 2014 (9 pgs).
Yang et al., "Unsupervised Extraction of Video Highlights Via Robust Recurrent Auto-encoders" arXiv:1510.01442v1 [cs.Cv] Oct. 6, 2015 (9 pgs).

\* cited by examiner

SYSTEMS AND METHODS FOR GENERATING RECOMMENDATIONS OF POST-CAPTURE USERS TO EDIT DIGITAL MEDIA CONTENT

FIELD

The disclosure relates to systems and methods for generating recommendations of post-capture users to edit digital media content.

BACKGROUND

Editing raw digital media content may be burdensome and time consuming. Editing raw digital media content may often require expertise with editing software that the individual capturing the digital media content may not possess. The content creator may want to find someone skilled in editing digital media content.

SUMMARY

One aspect of the disclosure relates to systems and methods for generating recommendations of post-capture users to edit digital media content. Information relating to the digital media content and a proposed edited version of the digital media content may be gathered via a content editing marketplace. Post-capture user profiles including expertise attributes about the post-capture users may be obtained. The expertise attributes may include stated information provided by the post-capture users themselves, feedback information (e.g., ratings, reviews, comments, and/or other information) provided by content capture users who participated in capture of the digital media content edited by the post-capture users, feedback information provided by end users for whom the individual post-capture users have created edited versions of other digital media content, and/or other information. A set of post-capture users may be identified as potential matches for creating the edited version of the digital media content based upon various factors. The factors may include one or more of the information about the digital media content, information about the proposed edited version of the digital media content, including identification of one or more selected moments of interest within the digital media content to include within the edited version of the digital media content, the expertise attributes, and/or other factors. The set of post-capture users may be presented to a content capture user and/or an end user of the digital media content such that the content capture user and/or the end user may select one of the post-capture users to create the edited version of the digital media content.

In some implementations, the system may include one or more servers. The server(s) may be configured to communicate with one or more client computing platforms according to a client/server architecture. The users of the system may access the system via client computing platform(s). The server(s) may be configured to execute computer readable instructions. Computer readable instructions may include one or more of an authentication component, a contextual parameters component, an editing parameters component, a profile component, an identification component, a presentation component, and/or other components.

Digital media content may include content that is viewed, distributed, and/or created via a computing platform (e.g., a computer). Digital media content may include one or more of a digital video content (including, but not limited to, virtual reality captures, spherical captures, 3D captures, panoramic captures, time-lapse captures, and/or other digital video content), digital audio content, digital imagery content, web pages and/or websites, and/or other digital and/or media content. For example, the digital media content may include a playback of live captured video content (e.g., captured via one or more cameras and/or specialized capture equipment), produced video segments, and/or other digital media content.

The authentication component may be configured to authenticate a user associated with one or more client computing platform(s) accessing the content editing marketplace. The content editing marketplace may include an online platform allowing for collaboration between end users, content capture users, and/or post-capture users of digital media content.

The contextual parameters component may be configured to obtain parameter values of contextual parameters of digital media content. The digital media content may be associated with the content capture user and/or the end user. The contextual parameters may define one or more temporal attributes and/or spatial attributes associated with capture of the digital media content. The one or more temporal attributes and/or spatial attributes may include one or more of a geolocation attribute, a device attribute, and/or a content attribute. The geolocation attribute may include a location of where the digital media content was captured. The device attribute may include a type of capturing device that captured the digital media content (e.g., specialized capture equipment, such as a drone, a particular type of camera, and/or other capturing device). The content attribute may include one or more of an action depicted within the digital media content, an activity depicted within the digital media content, and/or one or more objects depicted within the digital media content. The contextual parameters may be provided by the end user and/or the content capture user and/or if the digital media content is uploaded via the system, the contextual parameters may be obtained from the digital media content itself (e.g., metadata associated with the digital media content, object recognition of content included within the digital media content, etc.).

The editing parameters component may be configured to receive parameter values of editing parameters selected by the content capture user and/or the end user. The parameter values of editing parameters may define one or more editing attributes of the edited version of the digital media content to be created. The one or more editing attributes may include one or more of selected moments of the digital media content to include within the edited version of the digital media content, a target audience for the edited version of the digital media content, a sample of targeted edited content for the edited version of the digital media content, a length of the edited version of the digital media content, a category of the digital media content, a proposed budget for the edited version of the digital media content, a completion date for the edited version of the digital media content, a type of editing software to edit the digital media content, and/or other editing attributes.

The editing parameters component may be configured to receive one or more selected moments of interest within the digital media content to include within the edited version of the digital media content. The one or more selected moments of interest may include one or more highlights within the digital media content that the end user and/or the content capture user would like to include within the edited version of the digital media content. The one or more moments of interest may include a point in time within a particular digital media content file at which the one or more moments of interest begin, tag information associated with the one or more moments of interest, one or more screenshots of the one or more moments of interest, one or more sound clips of the one or more moments of interest, and/or other information relating to the one or more moments of interest. The tag information associated with the one or more moments of interest may include a description of the one or more moments of interest received by the content capture user and/or the end user, instructions for inclusion of the one or more moments of interest within the edited version of the digital media content, and/or other tag information associated with the one or more moments of interest.

If the system receives a selection to make the project private from one or more client computing platform(s), the profile component may be configured to obtain post-capture user profiles. The individual post-capture user profiles may include the expertise attributes discussed above associated with individual post-capture users.

The identification component may be configured to identify a set of post-capture users as potential matches for creating the edited version of the digital media content based upon one or more of the contextual parameters, the editing parameters, the one or more expertise attributes of the post-capture user profiles, and/or other information.

The presentation component may be configured to effectuate presentation of the set of post-capture users to the content capture user and/or the end user for selection by the content capture user and/or the end user of one or more of the post-capture users from the set of post-capture users to create the edited version of the digital media content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The present disclosure relates to systems and methods for generating recommendations of post-capture users to edit digital media content. Information relating to the digital media content and a proposed edited version of the digital media content may be gathered via a content editing marketplace. Post-capture user profiles including expertise attributes about the post-capture users may be obtained. The expertise attributes may include stated information provided by the post-capture users themselves, feedback information (e.g., ratings, reviews, comments, and/or other information) provided by capture users who participated in capture of the digital media content edited by the post-capture users, feedback information provided by end users for whom the individual post-capture users have created edited versions of other digital media content, and/or other information. A set of post-capture users may be identified as potential matches for creating the edited version of the digital media content based upon various factors. The factors may include one or more of the information about the digital media content, information about the proposed edited version of the digital media content, including identification of one or more selected moments of interest within the digital media content to include within the edited version of the digital media content, the expertise attributes, and/or other factors. The set of post-capture users may be presented to a content capture user and/or an end user of the digital media content such that the content capture user and/or the end user may select one of the post-capture users to create the edited version of the digital media content.

Figure 1:
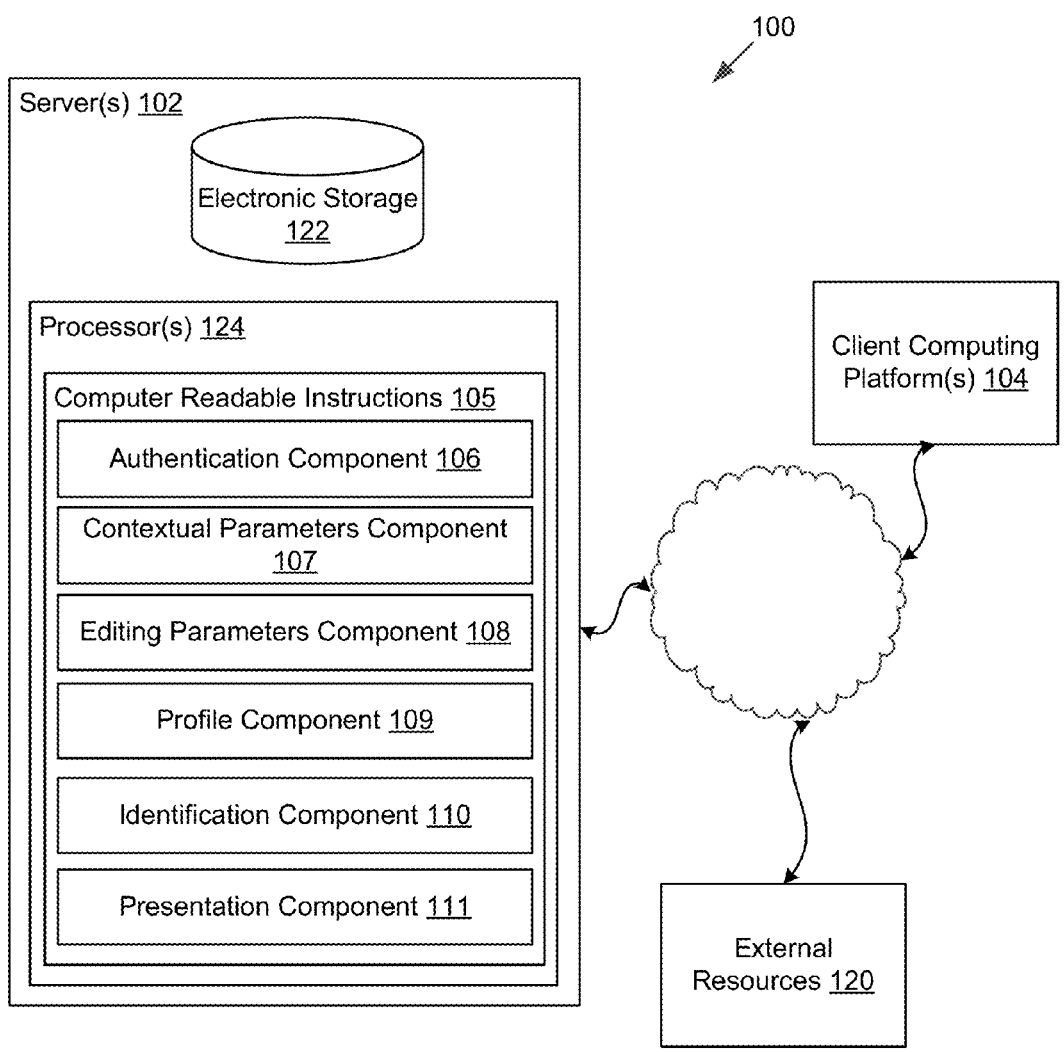
FIG. 1 illustrates a system for generating recommendations of post-capture users to edit digital media content, in accordance with one or more implementations.

FIG. 1 illustrates a system 100 that generates recommendations of post-capture users to edit digital media content and generates a shipping label for shipment of the digital media content to a selected post-capture user, in accordance with one or more implementations. As is illustrated in FIG. 1, system 100 may include one or more server(s) 102. Server(s) 102 may be configured to communicate with one or more client computing platform(s) 104 according to a client/server architecture. The users of system 100 may access system 100 via client computing platform(s) 104. Server(s) 102 may be configured to execute one or more computer program components. The computer program components may include one or more of authentication component 106, contextual parameters component 107, editing parameters component 108, profile component 109, identification component 110, presentation component 111, and/or other components.

In some implementations, server(s) 102 may be configured to provide remote hosting of the features and/or functions of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of client computing platform(s) 104 may include machine-readable instructions (not shown in FIG. 1) comprising the same or similar components as machine-readable instructions 105 of server(s) 102. Client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104.

Digital media content may include content that is viewed, distributed, and/or created via a computing platform (e.g., a computer). Digital media content may include one or more of a digital video content (including, but not limited to, virtual reality captures, spherical captures, 3D captures, panoramic captures, time-lapse captures, and/or other digital video content), digital audio content, digital imagery content, web pages and/or websites, and/or other digital and/or media content. For example, the digital media content may include a playback of live captured video content (e.g., captured via one or more cameras and/or specialized capture equipment), produced video segments, and/or other digital media content. The term camera may refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet, and/or other invisible ranges). The term specialized capture equipment may refer to a drone and/or other specialized capture equipment used to capture virtual reality content, spherical images, videos, and/or digital media content.

The digital media content may include one or more content segments. The content segments may include a beginning, an ending, and/or a duration. For example, a digital video 1 minute in length may include a first content segment including a first 30-second clip of the video and a second content segment including a second 30-second clip of the video.

Authentication component 106 may be configured to authenticate a user associated with one or more client computing platform(s) 104 accessing the content editing marketplace via system 100. The content editing marketplace may include an online platform allowing for collaboration between end users, content capture users, and/or post-capture users of digital media content. The online platform may include a framework of webpages. Some webpages may be accessible to all users of the content editing marketplace, while some webpages may be accessible by particular users. Content included within individual webpages may vary based upon the user accessing the content editing marketplace. For example, the content editing marketplace may include one or more portals associated with the various types of users. Individual portals may include individual frameworks of webpages specific to the user accessing the content editing marketplace.

An end user may refer to a user who would like to capture footage of digital media content. The end user may capture the digital media content himself, the end user may be a participant within the digital media content, the end user may request that a content capture user capture the digital media content on behalf of the end user, and/or digital media content may be captured in other ways. The end user may request capture of the digital media content by a content capture user because the digital media content may include the end user as a performer, because the end user does not have the requisite skill to capture the digital media content, because the end user does not want to capture the digital media content, and/or for other reasons.

The content capture user may refer to a user who may capture the digital media content. The content capture user may have a particular set of skills and/or expertise to capture digital media content. The content capture user may be skilled at capturing particular types of digital media content, such as aerial landscapes, sports, car races, etc. For example, a content capture user may be skilled at capturing water related sporting content, such as surfing. In another example, a content capture user may be skilled at capturing snow-related sporting content, such as snowboarding. That is, in some embodiments, the content capture user may be a service provider for the end user, such that the content capture user captures the digital media content for the end user. However, in some embodiments, the end user and/or the content capture user may be the same user. For example, if the end user captured his own footage of digital media content, the end user may be the content capture user.

The post-capture user may refer to a user who may edit the digital media content. The post-capture user may have a particular set of skills and/or expertise to edit raw digital media content into an edited version of digital media content. The post-capture user may be skilled at editing particular types of digital media content, such as creating a storyboard of the digital media content, creating a montage of the digital media content, editing virtual reality content, and/or other types of digital media content. Learning how to use various types of editing software may be time consuming, so the end user and/or the content capture user may want someone skilled in editing digital media content to edit the footage captured by the end user and/or the content capture user. As such, the post-capture user may be a service provider for the end user and/or the content capture user such that the post-capture user may create an edited version of the digital media content for the end user and/or the content capture user.

Authentication component 106 may be configured to manage individual accounts associated with one or more of individual end users, individual content capture users, and/or individual post-capture users of system 100. The user accounts may include user information associated with the individual users of the user accounts. The user information may include information stored by server(s) 102, one or more client computing platform(s) 104, and/or other storage locations.

The user information may include one or more of information identifying users (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more of online activities such as in social networks and/or other external applications), subscription information, a computing platform identification associated with the user, a phone number associated with the user, privacy settings information, location information associated with the user, and/or other information related to a user.

Location information associated with the user may include a geographical place where the user may be located. For example, the end user, the content capture user, and/or the post-capture user may be associated with a particular geographical address or location. The geographical address and/or location may include latitude and longitude coordinates and/or a street address. The geographical address and/or location may be associated with a commercial building, a personal home, a post office box, and/or other places. The geographical address and/or location may be an address and/or location where the end user, the content capture user, and/or the post-capture user is located.

Authentication component 106 may be configured to obtain user information via one or more client computing platform(s) 104 (e.g., user input via a user interface, etc.). As such, authentication component 106 may be configured to obtain location information associated with a content capture user and/or an end user. The location information associated with the content capture user and/or the end user may include an origin address associated with the content capture user and/or the end user. As discussed above, the origin address may reference latitude and longitude coordinates and/or a street address and may be associated with a commercial building, a personal home, a post office box, and/or other places.

If a user does not have a preexisting user account for the content editing marketplace associated with system 100, the user may register for a user account via a website, web-based application, mobile application, and/or user application. Authentication component 106 may be configured to create a user ID and/or other identifying information for the user when the user registers. The user ID and/or other identifying information may be associated with one or more client computing platform(s) 104 used by the user to register for the user account. Authentication component 106 may be configured to store such association with the user account of the user. The user may associate one or more accounts associated with one or more of social network services, messaging services, and/or other like services with the user account for the content editing marketplace provided by system 100.

Figure 2A:
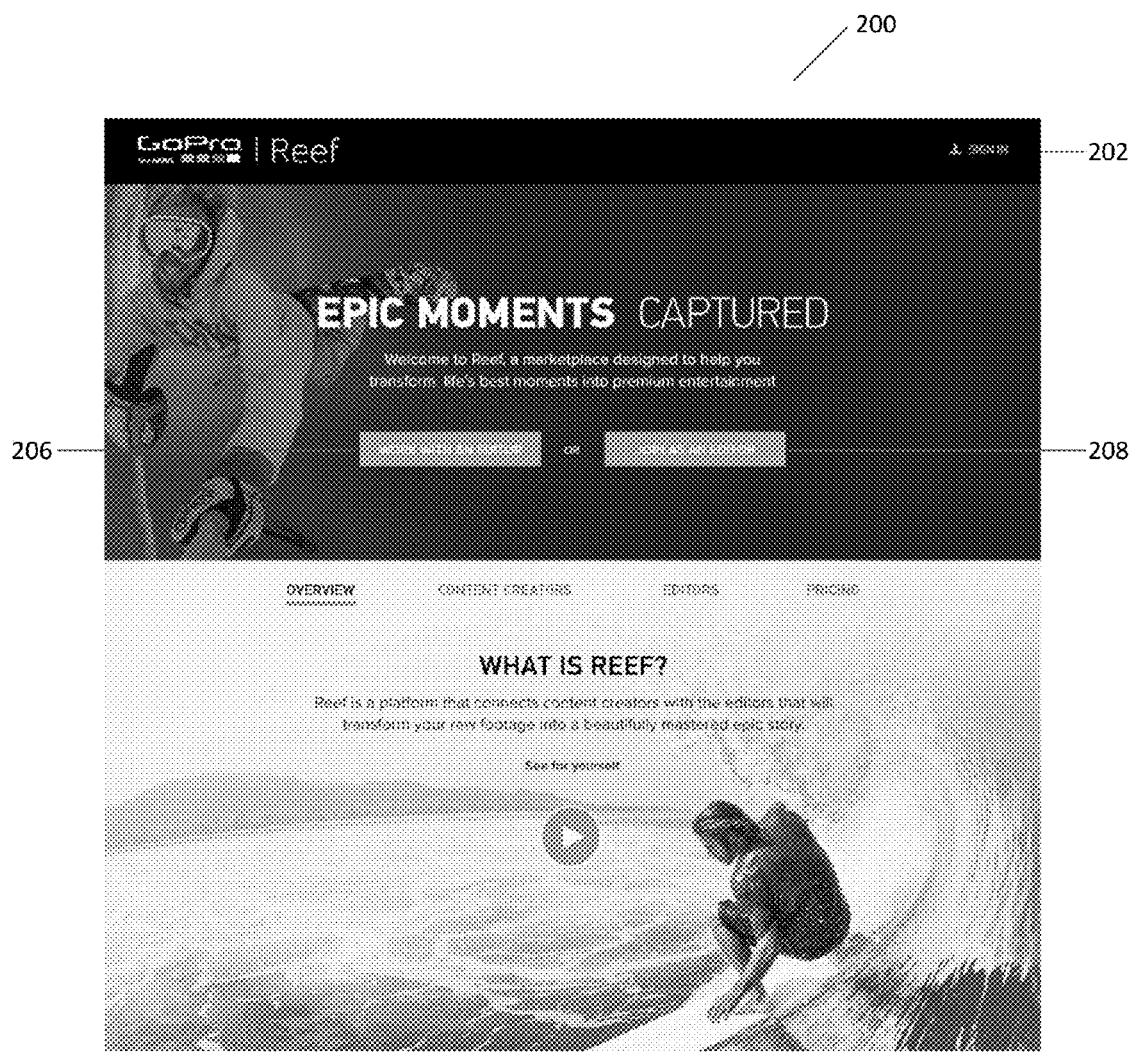
FIGS. 2A-2B illustrate exemplary depictions of a user interface of a content editing marketplace, in accordance with one or more implementations.
Figure 2B:
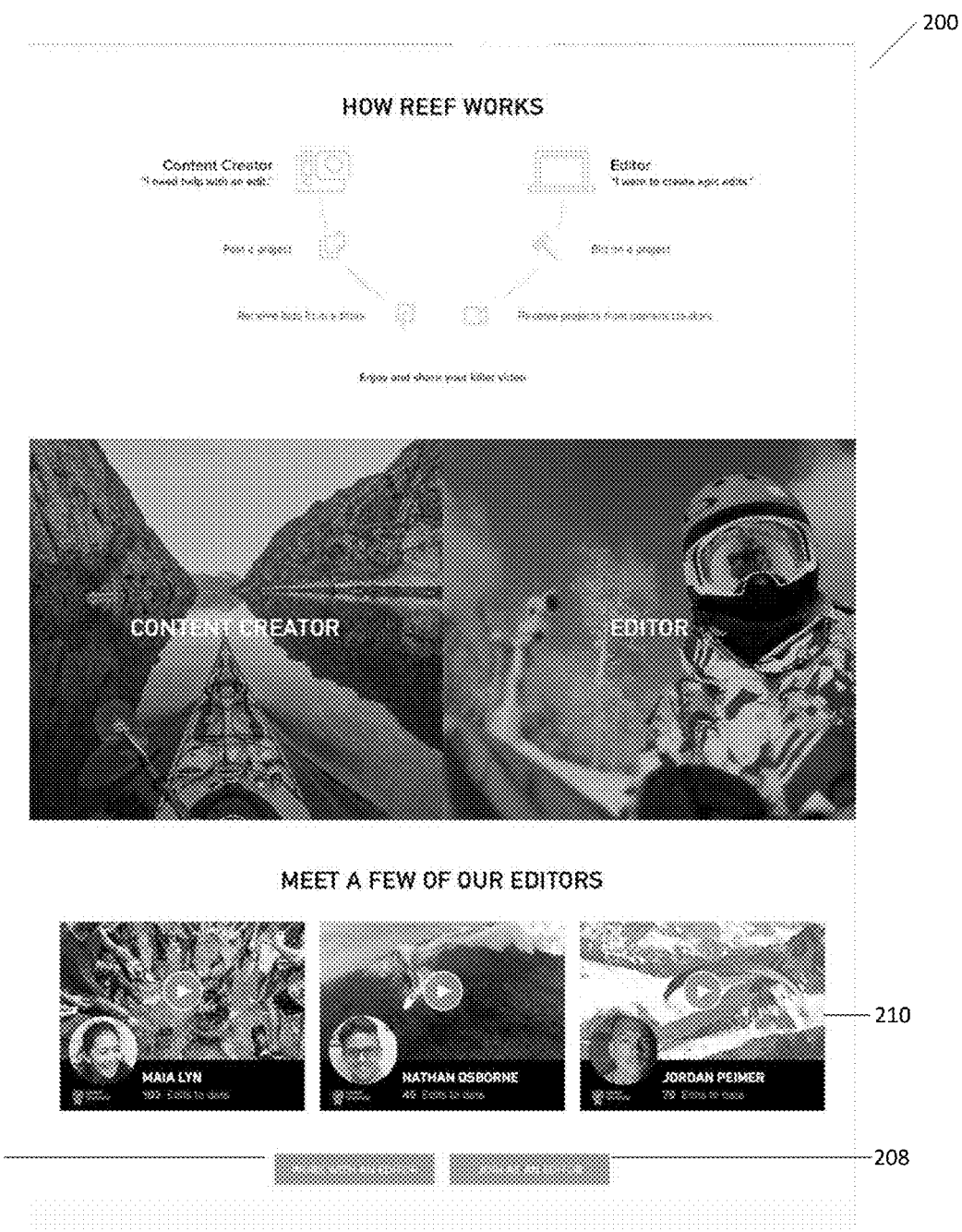

FIG. 1 will be described in conjunction with FIGS. 2-24 throughout this disclosure. Referring to FIGS. 2A-2B, authentication component 106 may effectuate presentation of user interface 200 of the content editing marketplace via a display of one or more client computing platform(s) 104 associated with one or more users of the content editing marketplace. As shown in FIGS. 2A and 2B, if the user (e.g., one of the end users, the content capture users, and/or the post-capture users) has a preexisting user profile with the content editing marketplace stored via system 100 (e.g., stored within electronic storage 122), authentication component 106 may be configured to receive activation (e.g., click, tap, etc.) of "SIGN IN" button 202 from one or more client computing platform(s) 104 to access the preexisting user profile associated with the user. Alternatively, if the user has not previously created a user profile for the content editing marketplace via system 100, authentication component 106 may be configured to receive activation of "WORK WITH AN EDITOR" button 206 or "JOIN AS AN EDITOR" button 208 from one or more client computing platform(s) 104 to create a user profile. Potential end users and/or content capture users may join the content editing marketplace using "WORK WITH AN EDITOR" button 206. Potential post-capture users may join the content editing marketplace using "JOIN AS AN EDITOR" button 208. While "SIGN IN", "WORK WITH AN EDITOR", and "JOIN AS AN EDITOR" have been used to denote buttons 202, 204, and 206 respectively, these are meant for exemplary purposes only and not meant to be a limitation of the disclosure. For example, button 202 may be called "log in" and/or button 204 may be called "create a content provider profile". While not shown in FIGS. 2A-2B, authentication component 106 may be configured to access an existing user profile and/or create a new user profile via user information accessed from an external online platform (e.g., other online platforms, including social media platforms).

An overview of the content editing marketplace is shown in FIGS. 2A-B. A potential user of the content editing marketplace may view user interface 200 via the display of one or more client computing platform(s) 104 to learn more about the content editing marketplace. For example, as shown in FIG. 2B, a potential end user and/or content capture user (e.g., a content creator) may need help editing digital media content (e.g., this may be referred to as a project throughout the disclosure). The potential end user and/or the potential content capture user may use the content editing marketplace to post the project and receive recommendations for post-capture users (e.g., editors) to edit raw digital media content. The content creators may also receive bids on the project from editors. Prior to creating a user profile, the potential user may view existing post-capture user profiles (e.g. one or more post-capture user profiles 210). The content editing marketplace may allow for collaboration of content capture users and editors to create edited footage of raw digital media content.

Figure 3A:
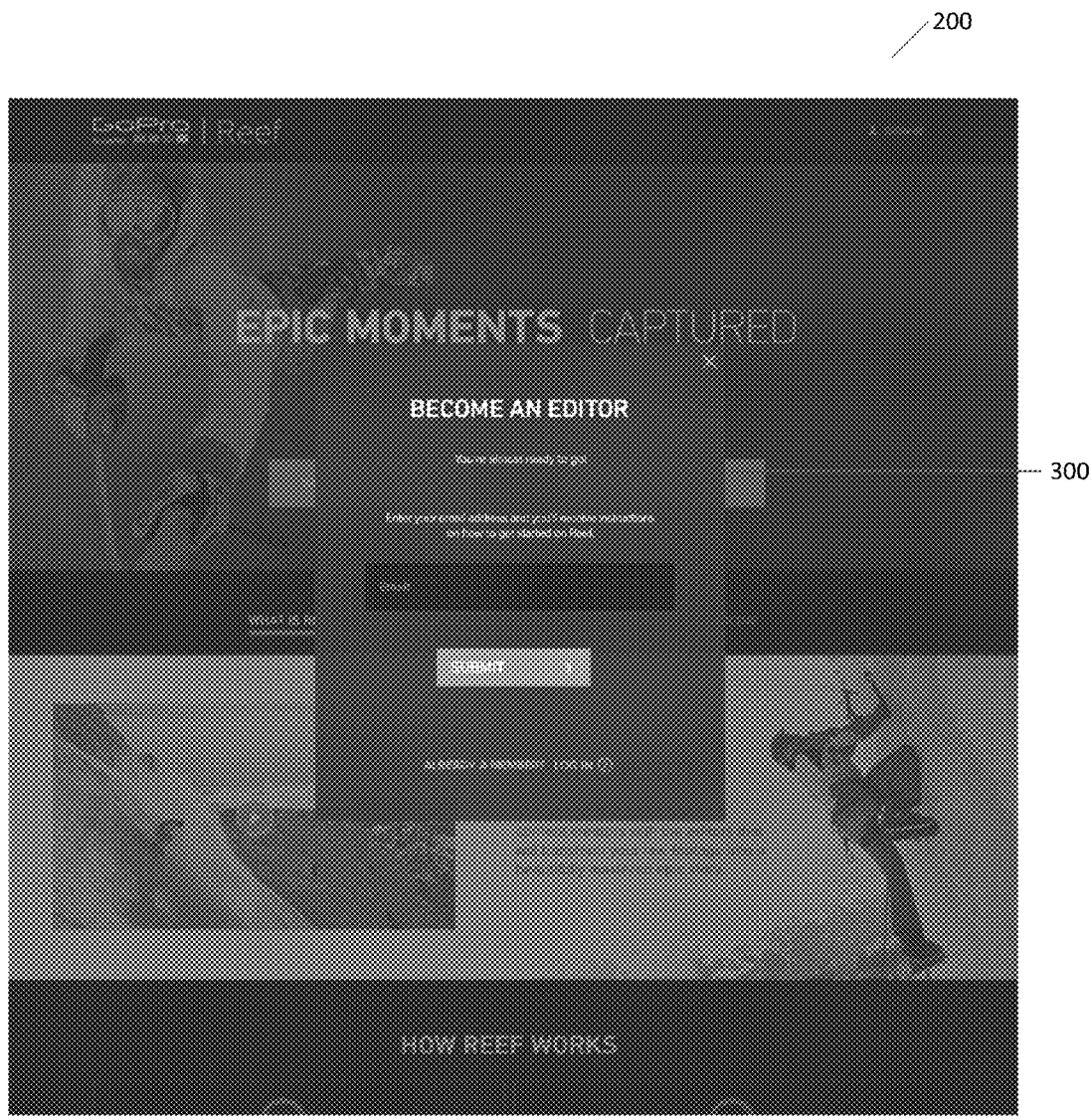
FIGS. 3A-3B illustrate exemplary depictions of a user interface of a content editing marketplace, in accordance with one or more implementations.
Figure 3B:
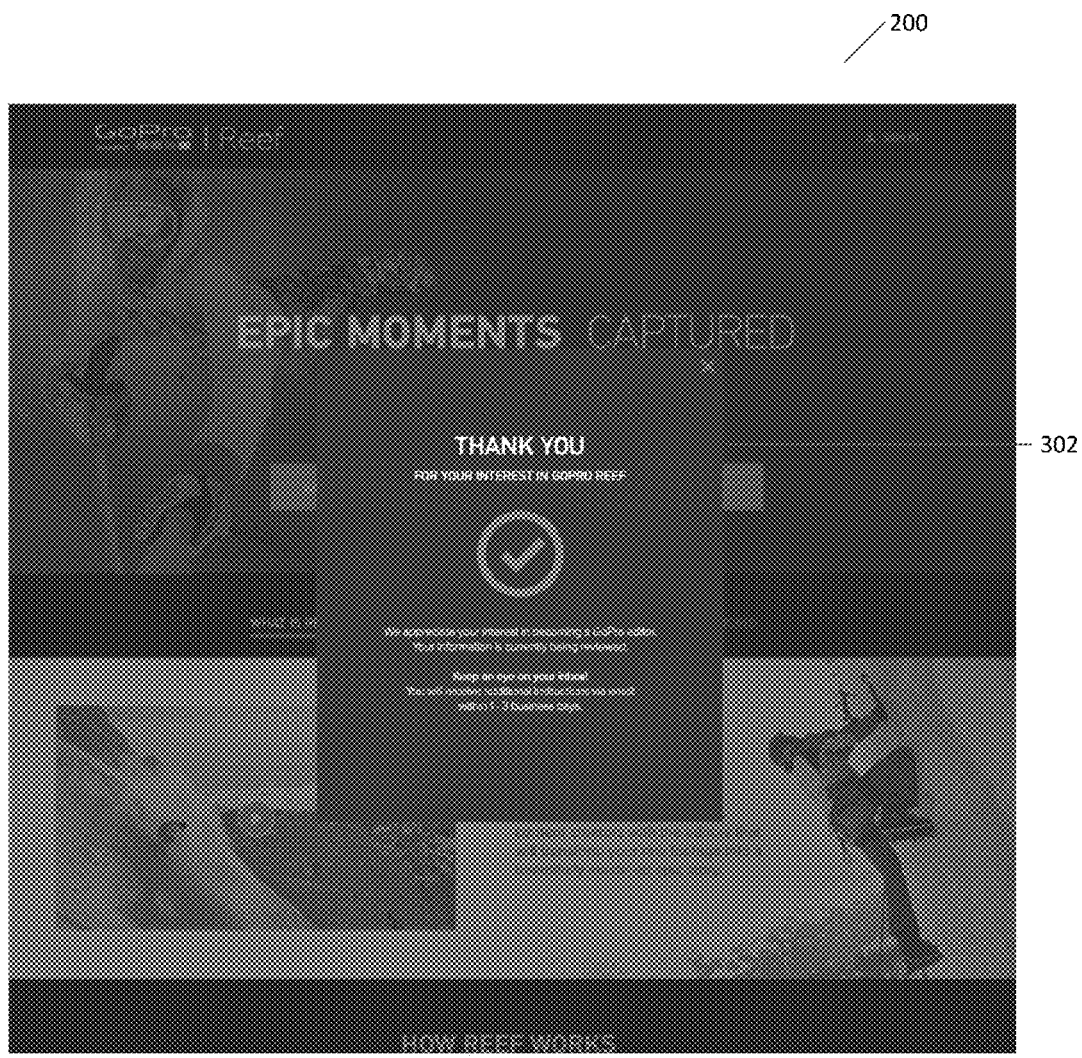

Referring to FIGS. 3A-3B, if authentication component 106 receives an indication from one or more client computing platform(s) 104 that a potential user of the content editing marketplace would like to join the content editing marketplace as an editor (e.g., authentication component 106 receives activation of button 208 of FIGS. 2A-2B), authentication component 106 may be configured to effectuate presentation of user interface 200 via the display of one or more client computing platform(s) 104. As shown in FIG. 3A, authentication component 106 may be configured to prompt the potential user (e.g., the potential post-capture user) via "BECOME AN EDITOR" pop-up window 300 to enter an email address associated with the potential post-capture user. Authentication component 106 may be configured to receive the email address associated with the potential post-capture user via one or more client computing platform(s) 104. As shown in FIG. 3B, authentication component 106 may be configured to effectuate presentation of "THANK YOU" pop-up window 302 indicating that the email address has been received and is awaiting approval. While pop-up windows have been described with reference to FIGS. 3A-3B and may continue to be described throughout this disclosure, they are for exemplary purposes only and are not meant to be a limitation of this disclosure. For example, information displayed via any pop-up window may be provided by any other means, including system 100 navigating one or more users to another page and/or location of the content editing marketplace.

Referring to 4A-4E, upon approval and/or confirmation of the email address associated with the potential post-capture user (e.g., now the post-capture user, as the email address has been confirmed and/or approved), authentication component 106 may be configured to effectuate presentation of profile settings page 400 within user interface 200. Authentication component 106 may be configured to receive information about the post-capture user to create a user profile associated with the post-capture user (e.g., a post-capture user profile). The post-capture user profile may be displayed throughout the content editing marketplace alongside other post-capture user profiles to match post-capture users with end users and/or content capture users.

Individual post-capture user profiles may include expertise attributes associated with the post-capture users. The expertise attributes may include stated information provided by the post-capture users themselves. The expertise attributes may include feedback information. Feedback information may include information provided by one or more of the content capture users and/or the end users for whom the individual post-capture users have created edited versions of other digital media content. The feedback information may include ratings, comments, reviews, and/or other feedback information related to the post-capture user.

Authentication component 106 may be configured to receive the stated information included within individual post-capture user profiles from the post-capture users themselves via one or more client computing platform(s) 104. The stated information may be received when the post-capture user creates the post-capture user profile and/or may be edited at any time after the post-capture user profile has been created.

Figure 4A:
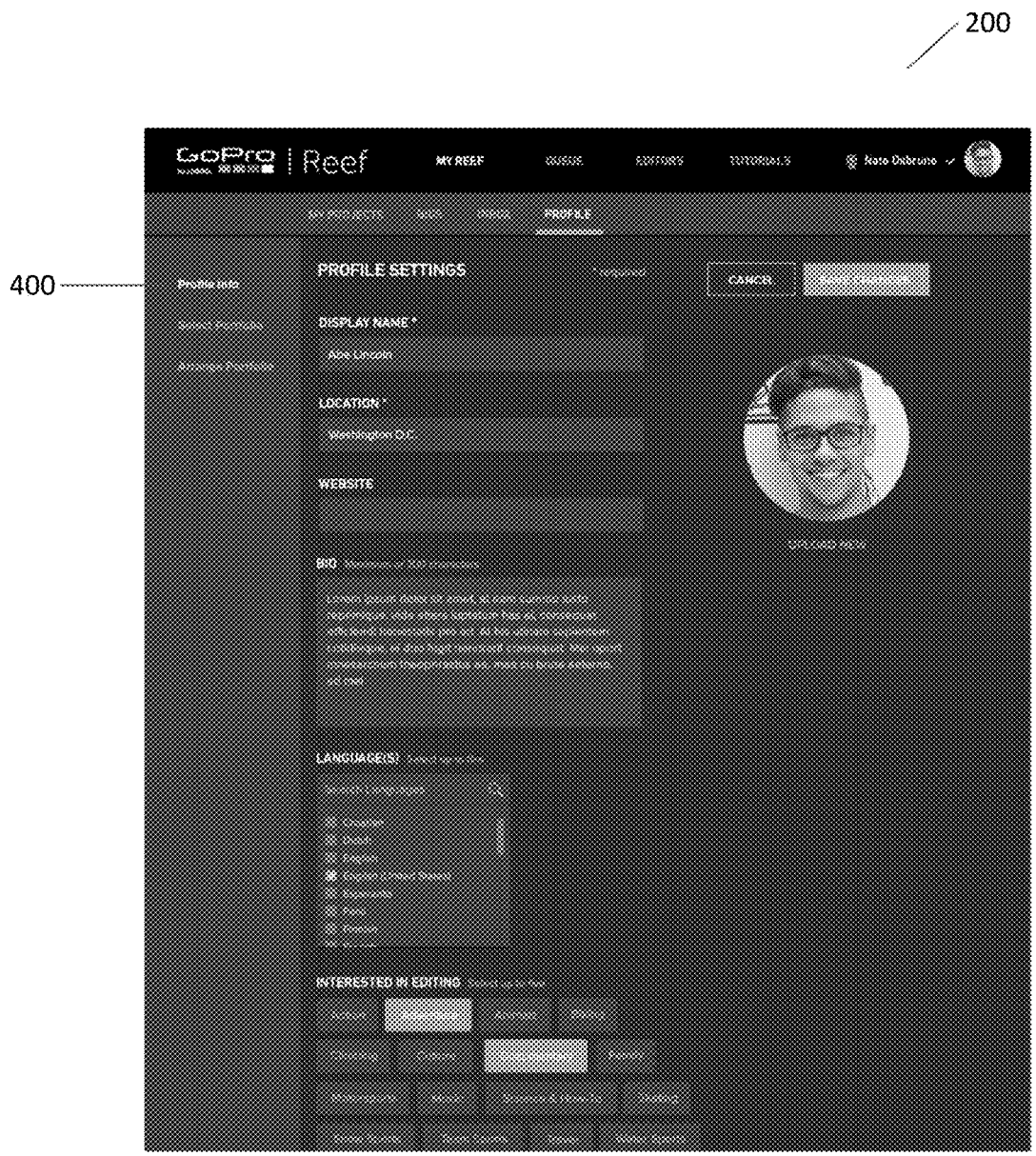
FIGS. 4A-4E illustrate exemplary depictions of a user interface of a content editing marketplace, in accordance with one or more implementations.
Figure 4B:
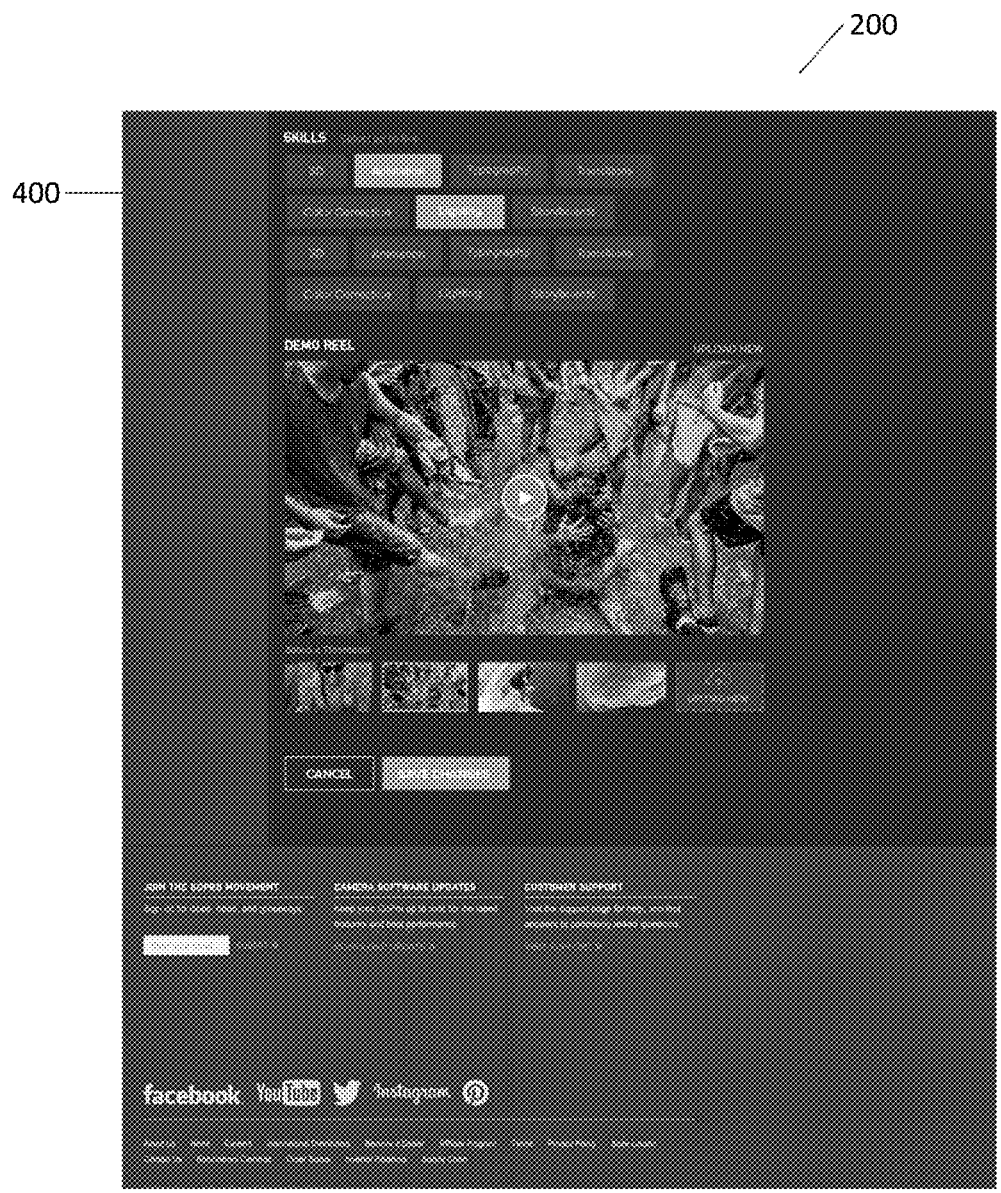

Referring to FIGS. 4A-4B, authentication component 106 may be configured to receive the stated information from one or more client computing platform(s) 104 used by the post-capture user while creating the post-capture user profile. As shown in FIGS. 4A-4B, the stated information may include, but is not limited to, a name and/or alias of the post-capture user, a location where the post-capture user is located, a website associated with the post-capture user, a biography of the post-capture user, one or more languages spoken and/or understood by the post-capture user, one or more genres of the digital content media that the post-capture user may be interested in editing, a photo associated with the post-capture user, one or more skills associated with the post-capture user, and/or one or more demo reels of created edited versions of other digital media content. These examples of the stated information are meant to be illustrative and are not meant to be a limitation of this disclosure, as other stated information associated with the post-capture user may be provided by the post-capture user.

Examples of the one or more genres of the digital media content that the post-capture user may be interested in editing may include one or more of action, adventure, animals, biking, climbing, culture, documentary, family, motorsports, music, science and how-to, skating, snow sports, team sports, travel, and/or water sports. These examples of the one or more genres are meant to be illustrative and are not meant to be a limitation of this disclosure, as other genres of digital media content may be available.

Examples of the one or more skills associated with the post-capture user may include one or more of 3D, animation, typography, transitions, color correction, lighting, and/or storyboards. These examples of the one or more skills are meant to be illustrative and are not meant to be a limitation of this disclosure, as other skills of the post-capture user may be available.

Figure 4C:
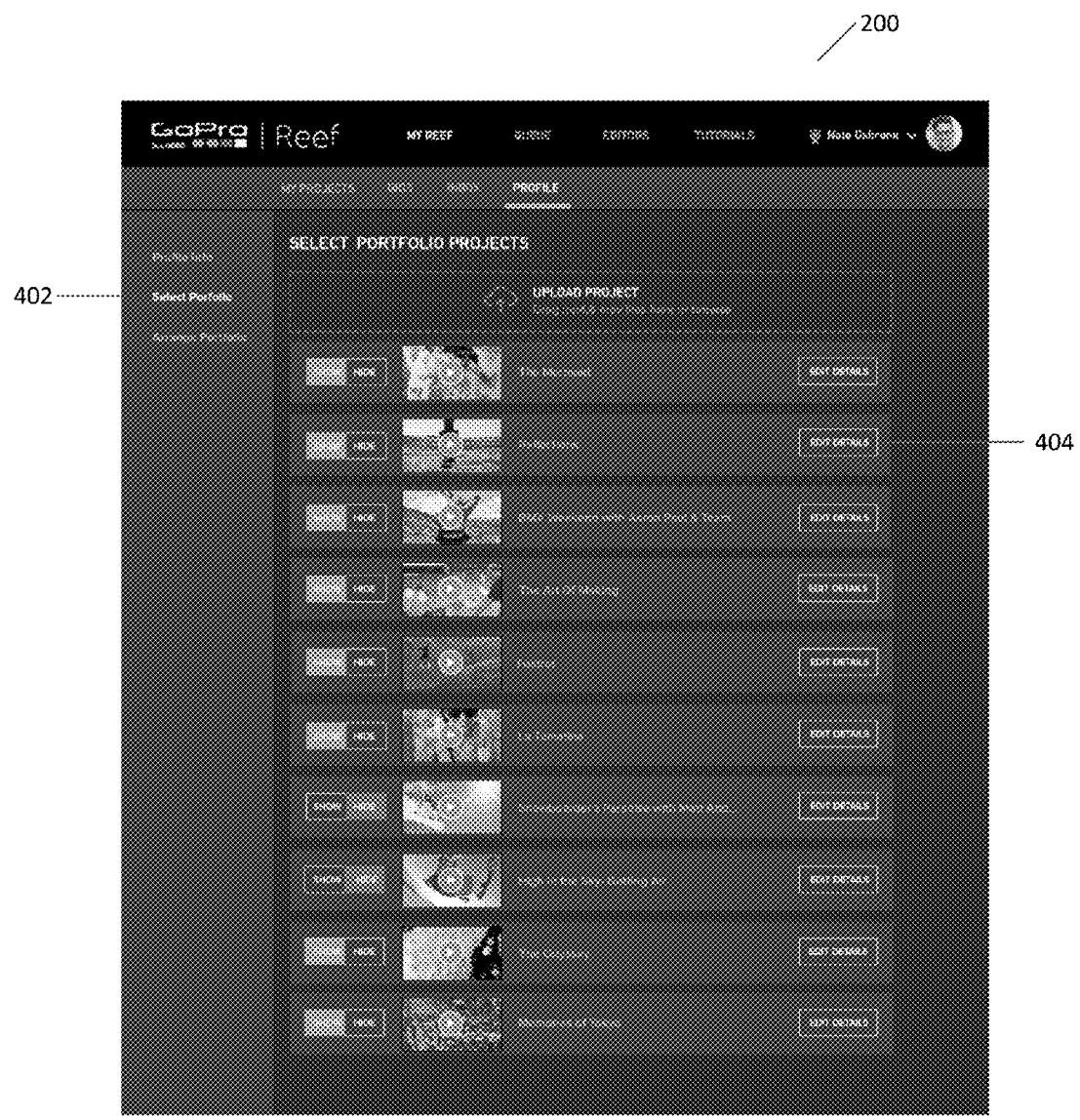
Figure 4D:
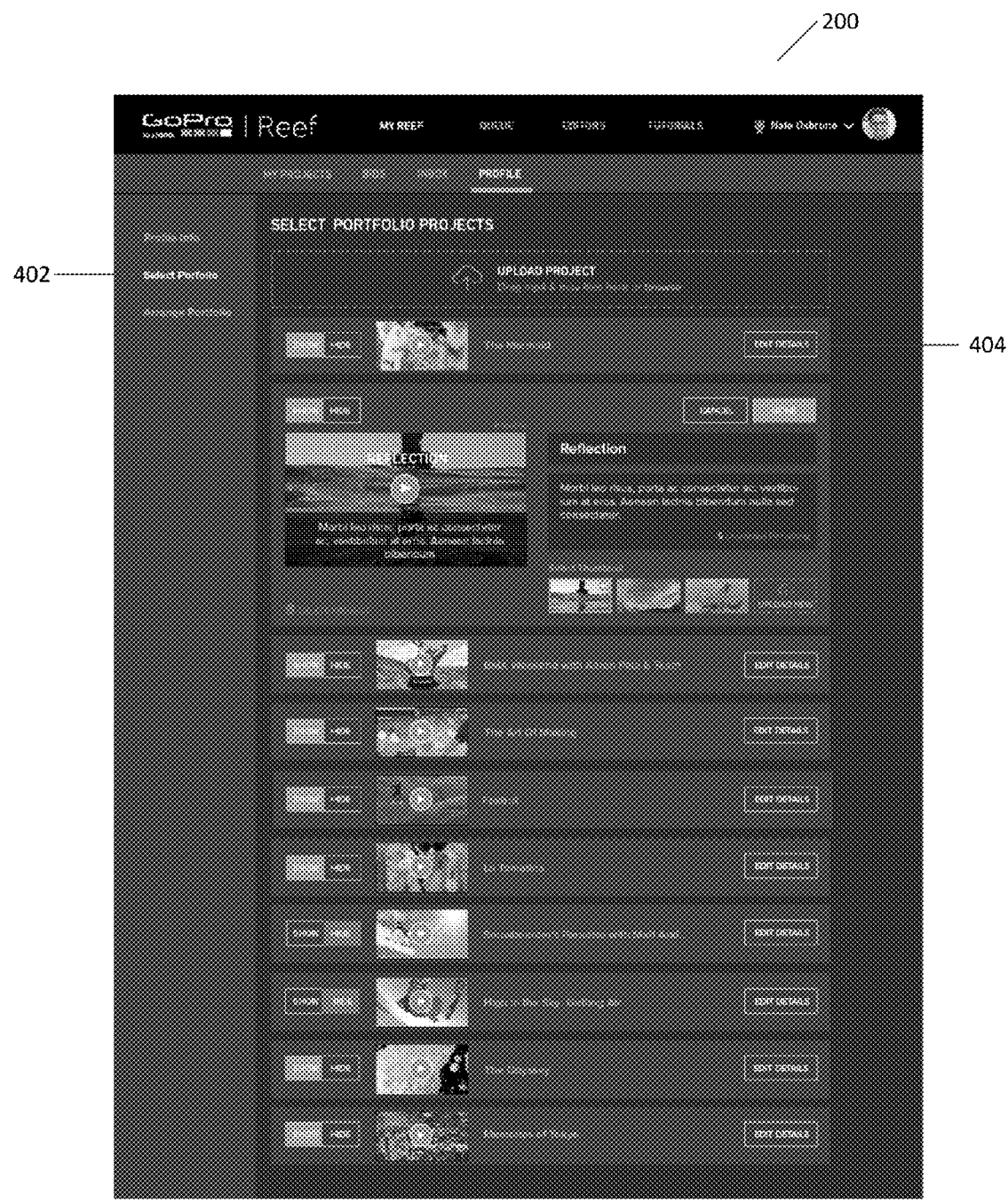

Referring to FIGS. 4C-4D, authentication component 106 may be configured to effectuate presentation of portfolio page 402 within user interface 200. Authentication component 106 may be configured to receive selected projects of created edited versions of other digital media content from one or more client computing platform(s) 104 to create a portfolio associated with the post-capture user. The portfolio may be available for display within the post-capture user profile such that other users of the content editing marketplace may view other projects that the post-capture user profile has created, completed, and/or edited in the past.

As shown in FIG. 4C, authentication component 106 may be configured to receive an upload of a created edited version of other digital media content from one or more client computing platform(s) 104. Authentication component 106 may be configured to receive an indication to show or hide individual created edited versions of other digital media content within the post-capture user profile. If selected to be shown, the project may be displayed within the post-capture user profile to be for other users of the content editing marketplace to view. If hidden, the project may not be displayed within the post-capture user profile for other users of the content editing marketplace to view. Authentication component 106 may be configured to receive activation of "EDIT DETAILS" button 404 from one or more client computing platform(s) 104 to add and/or edit information relating to individual received selected projects of created edited versions of other digital media content.

As shown in FIG. 4D, if authentication component 106 receives activation of button 404 from one or more client computing platform(s) 104, authentication component 106 may be configured to receive information relating to the received selected projects of created edited versions of other digital media content. The information may include a title of the created edited version of the other digital media content, a description of the created edited version of the other digital media content, a still image and/or thumbnail associated with and/or selected from the created edited version of the other digital media content, and/or other information relating to the created edited version of the other digital media content. The description may include a description of what was edited, how it was created, content included within the other digital media content, and/or other information the post-capture user may want to include relating to the created edited version of the other digital media content.

Figure 4E:
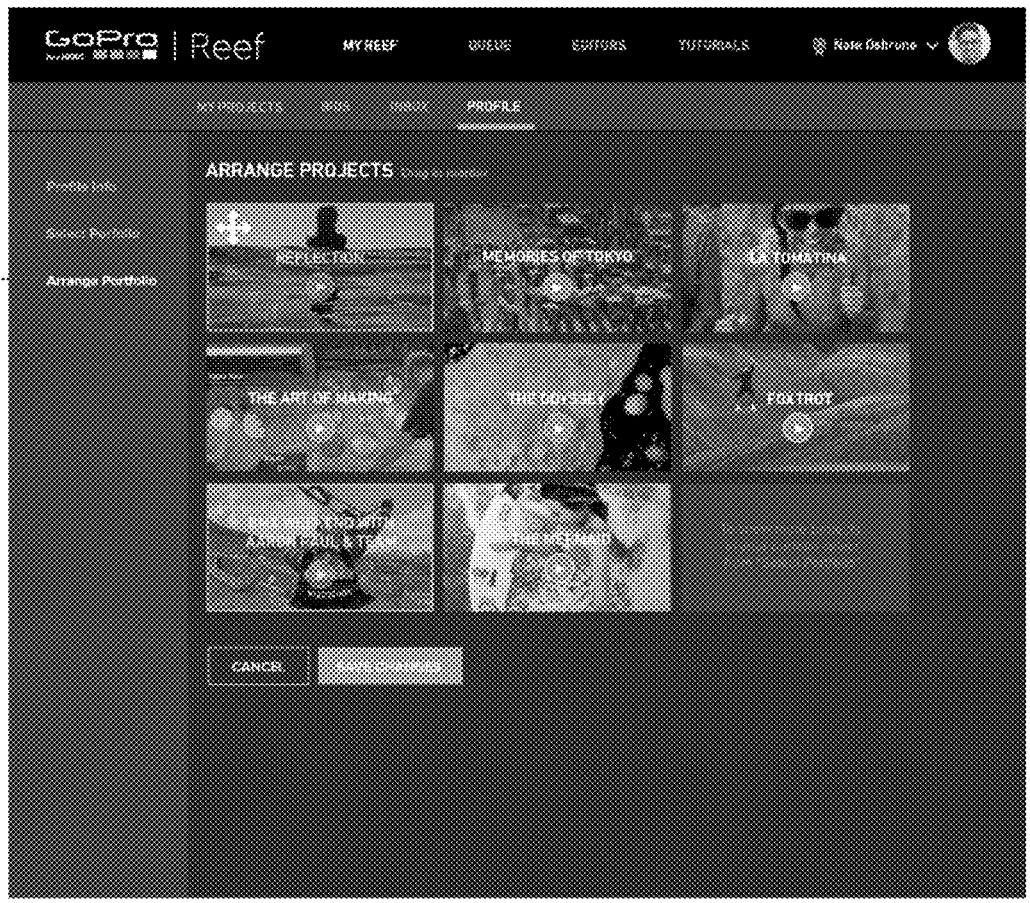

Referring to FIG. 4E, authentication component 106 may be configured to effectuate presentation of portfolio arrangement page 406 within user interface 200. Authentication component 106 may be configured to receive one or more selections relating to an arrangement of the selected portfolio projects that the post-capture user would like to display within the post-capture user profile for other users of the content editing marketplace to view. As shown in FIG. 4E, the post-capture user may drag one or more of the selected portfolio projects via one or more client computing platform(s) 104 to arrange the projects within the portfolio in the order to display the projects within the post-capture user profile for viewing.

Individual user profiles associated with end users (e.g., end user profiles) and/or content capture users (e.g., content capture user profiles) may be created in a similar manner as discussed above with reference to creating a post-capture user profile associated with a post-capture user. Authentication component 106 may be configured to receive activation of button 206 from FIGS. 2A-2B indicating that the user would like to create an end user profile or a content capture profile. Authentication component 106 may be configured to receive information relating to the end user and/or the content capture user provided by the end user and/or the content capture user via one or more client computing platform(s) 104 while creating the end user profile and/or the content capture user profile. The information included within the end user profile and/or the content capture user profile may be edited at any time.

While not shown, authentication component 106 may be configured to receive the information from one or more client computing platform(s) 104 used by the end user and/or the content capture user. The information may include, but is not limited to, a name and/or alias of the end user and/or the content capture user, a location where the end user and/or the content capture user is located, a website associated with the end user and/or the content capture user, a biography of the end user and/or the content capture user, one or more languages spoken and/or understood by the end user and/or the content capture user, one or more genres of the digital content media that the end user and/or the content capture user may be interested in creating, a photo associated with the end user and/or the content capture user, one or more skills associated with the end user and/or the content capture user, and/or one or more completed projects of other digital media content associated with the end user and/or the content capture user. These examples are meant to be illustrative and are not meant to be a limitation of this disclosure, as other information associated with the end user and/or the content capture user may be provided by the end user and/or the content capture user.

Figure 5A:
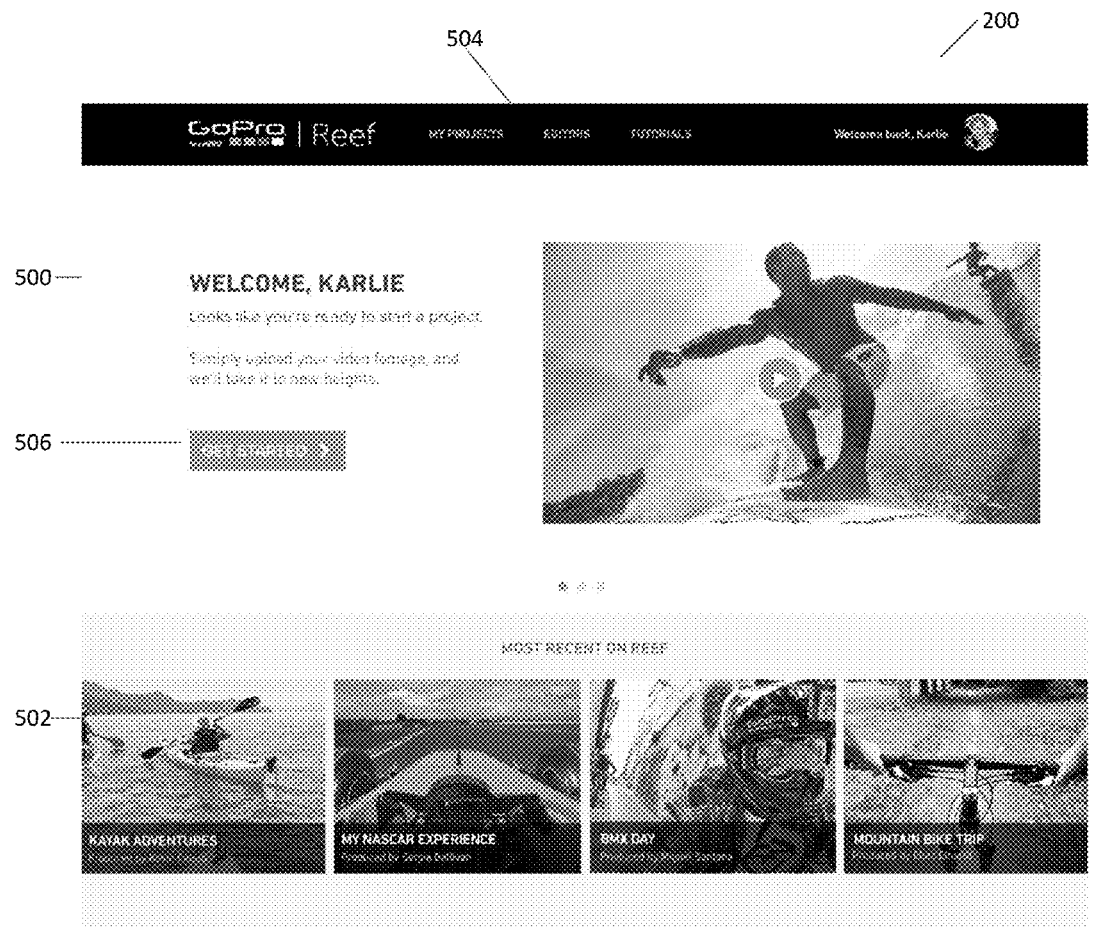
FIGS. 5A-5B illustrate exemplary depictions of a user interface of a content editing marketplace, in accordance with one or more implementations.
Figure 5B:
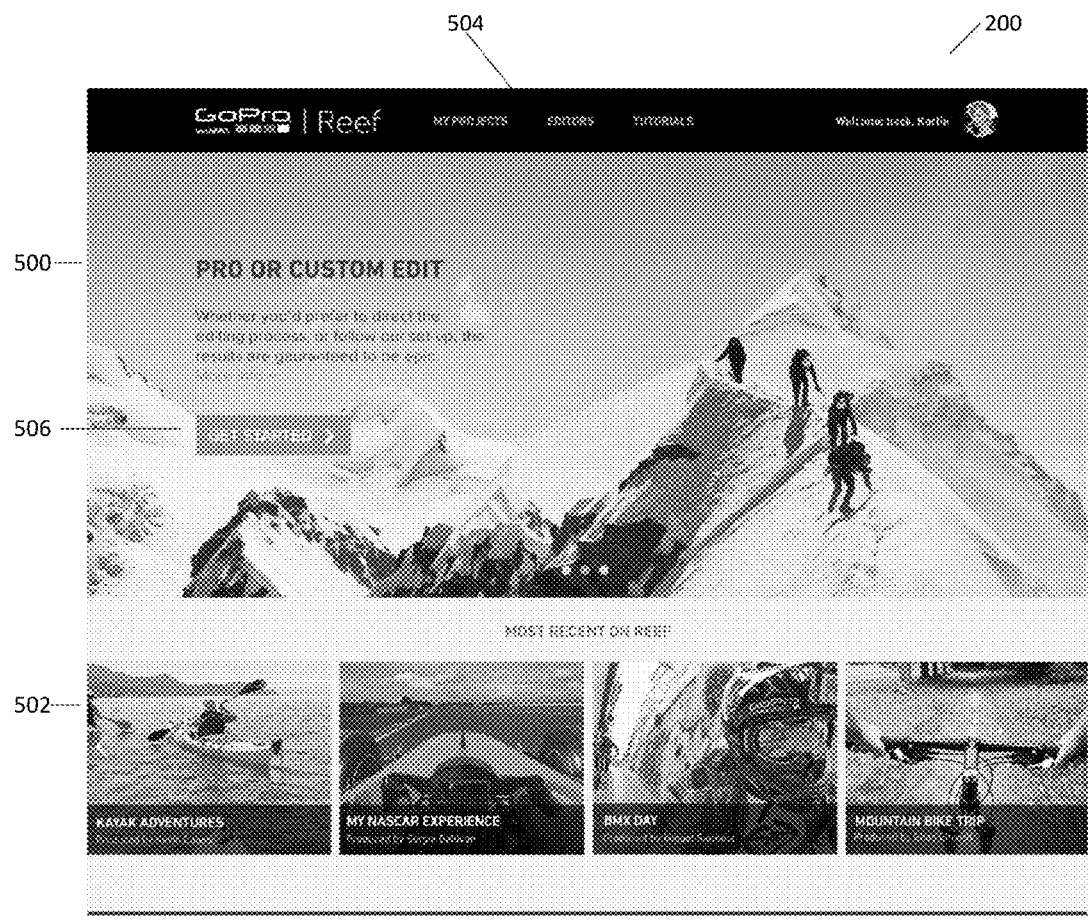

Referring to FIGS. 5A-5B, upon completion of a user profile and/or successfully logging in to an existing user profile, authentication component 106 may be configured to effectuate presentation of welcome page 500 within user interface 200. Welcome page 500 may include recently created edited versions of other digital media content available to view (e.g., edited versions of other digital media content 502), the post-capture user associated with production of the individual created edited versions of other digital media content included within welcome page 500, navigation menu 504 (which may include sub-navigation menus), and/or other information may be provided within welcome page 500. As shown in FIGS. 5A-5B, authentication component 106 may be configured to effectuate presentation of one or more variations of welcome page 500. Authentication component 106 may be configured to rotate through the one or more variations of welcome page 500.

As shown in FIGS. 5A-5B, the end user and/or the content capture user (e.g., Karli as shown in the upper right-hand corner of FIGS. 5A-5B) has logged into the content editing marketplace. Karli may wish to find post-capture users to edit raw digital media content that Karli and/or another content capture user has produced. Karli, via one or more client computing platform(s) 104 that Karli is using to access user interface 200, may activate (e.g., click, tap, and/or otherwise activate) "GET STARTED" button 506 to indicate that Karli would like to find post-capture users to edit the raw digital media content.

Figure 6:
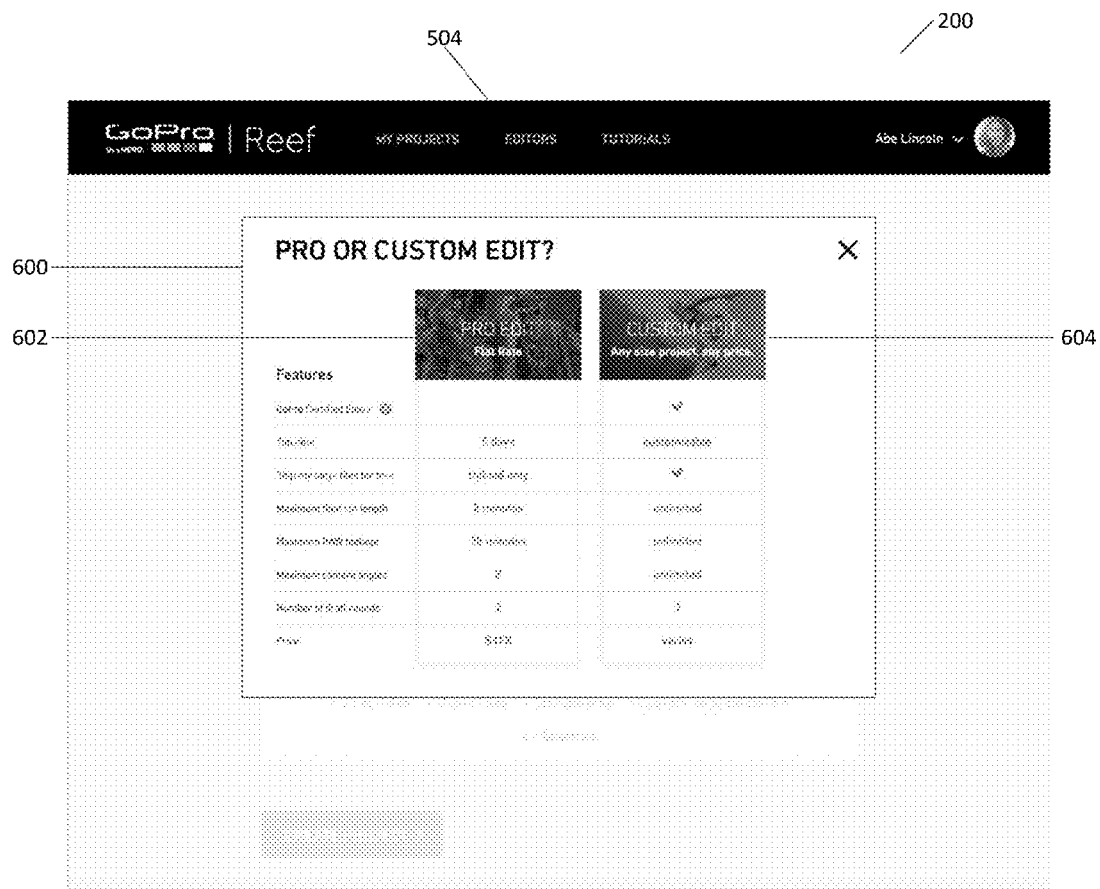
FIG. 6 illustrates an exemplary depiction of a user interface of a content editing marketplace, in accordance with one or more implementations.

Referring to FIG. 6, system 100 may receive activation of button 506 and effectuate presentation of pop-up window 600 (e.g., pro or custom edit page 600). Pop-up window 600 may provide information relating to different options available to the end user and/or the content capture user for creating an edited version of the digital media content. For example, system 100 may be configured to effectuate presentation of pro edit 602 and/or custom edit 604. Edit options pro edit 602 and/or custom edit 604 are provided for exemplary purposes only and are not meant to be a limitation of this disclosure, as other edit options may be available.

As shown in FIG. 6, pro edit 602 and/or custom edit 604 may include one or more features including, but not limited to, a certified editor, a timeline, an option to ship the digital media content to a post-capture user for editing, a maximum final cut length for the edited version of the digital media content, a maximum amount of raw digital media content, a maximum number of camera angles included within the raw digital media content, a number of draft rounds between the end user/content capture user and the post-capture user, and/or a cost associated with creating the edited version of the digital media content. These features are for exemplary purposes only and are not meant to be a limitation of this disclosure, as any other feature may be available and/or offered.

For example, pro edit 602 may include a flat rate fee with a turnaround timeline of producing an edited version of the digital media content within 5 days. The end user and/or the content capture user may upload the raw digital media content via system 100. The maximum final cut length for the edited version of the digital media content may be up to 2 minutes. The maximum amount of raw digital media content that may be uploaded may be 30 minutes. The maximum number of camera angles included within the raw digital media content may be 2 and the number of draft rounds under pro edit 602 may be 2. These options and/or features are for exemplary purposes only and are not meant to be a limitation of this disclosure, as any other option, quantity, and/or feature may be available for pro edit 602.

In another example, custom edit 604 may include any amount of raw digital media content, any length of the edited version of the digital media content, and/or any price with 3 draft rounds available. As will be discussed in further detail below, the end user and/or the content capture user may ship the raw digital media content to a selected post-capture user for editing via a postal service. These options and/or features are for exemplary purposes only and are not meant to be a limitation of this disclosure, as any other option, quantity, and/or feature may be available for custom edit 604.

Figure 7A:
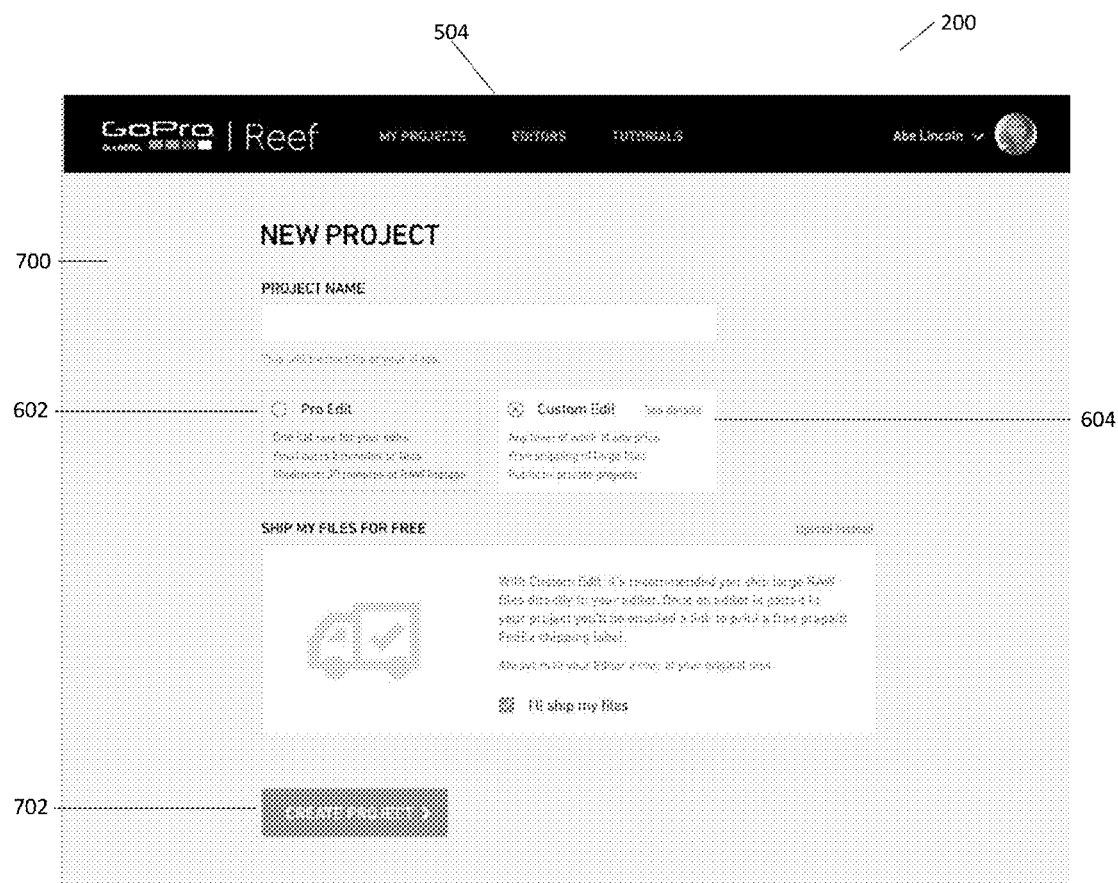
FIGS. 7A-7F illustrate exemplary depictions of a user interface of a content editing marketplace, in accordance with one or more implementations.

FIGS. 7A-F may refer to the custom edit process associated with custom edit 604 of FIG. 6. Referring to FIG. 7A, system 100 may be configured to effectuate presentation of new project page 700 within user interface 200. New project page 700 may allow for the end user and/or the content capture user to select an editing option (e.g., pro edit 602 and/or custom edit 604). If system 100 receives an indication from the end user and/or the content capture user that the end user and/or the content capture user would like to see details of the editing options, system 100 may effectuate presentation of pop-up window 600 (e.g., pro or custom edit page 600) of FIG. 6. System 100 may be configured to receive a project name associated with the digital media content and/or a selection of the editing options (e.g., pro edit 602 and/or custom edit 604) from one or more client computing platform(s) 104. System 100 may be configured to prompt the end user and/or the content capture user to ship a copy of the raw digital media content to the selected post-capture user, as will be discussed in further detail below. System 100 may effectuate presentation of "CREATE PROJECT" button 702. System 100 may receive activation of button 702 from one or more client computing platform(s) 104 to indicate that the end user and/or the content capture user would like to create the project. New project page 700 is provided for exemplary purposes only and is not meant to be a limitation of the disclosure. Any information may be provided within new project page 700, including information related to shipping the raw digital media content to a selected post-capture user for editing.

Figure 7B:
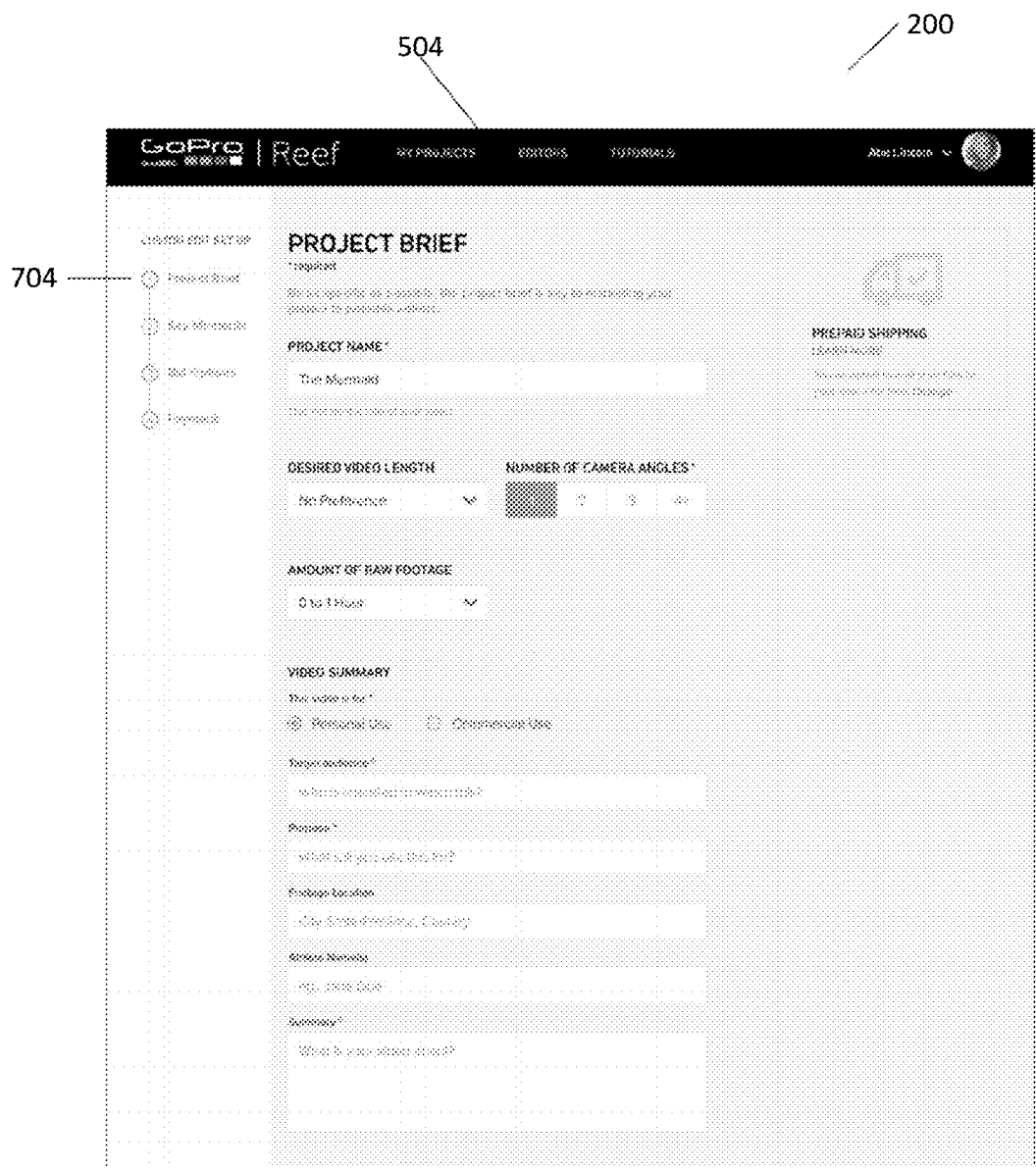
Figure 7C:
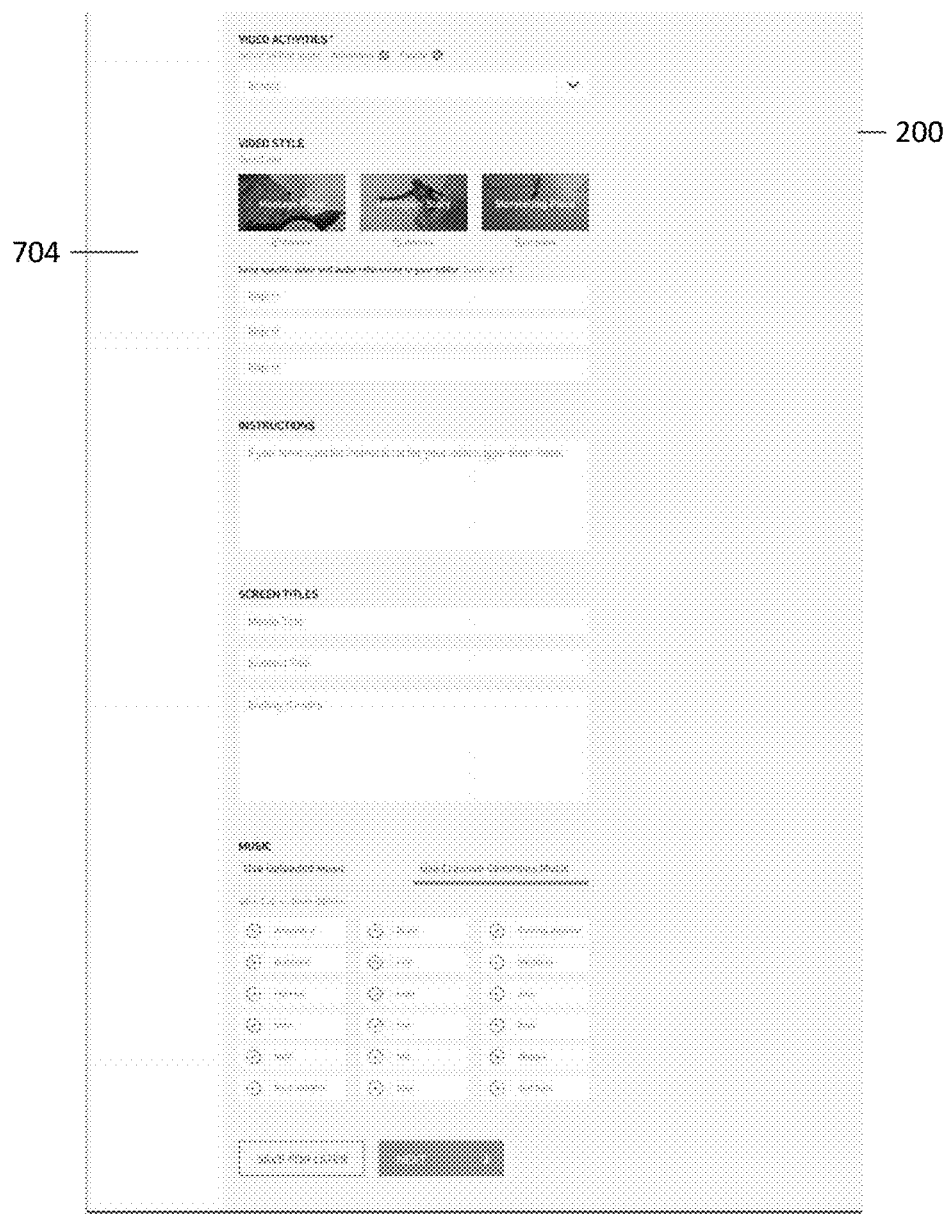

Referring to FIGS. 7B-7C, upon activation of button 702, system 100 may effectuate presentation of project brief page 704 within user interface 200. Project brief page 704 may be provided such that for the end user and/or the content capture user may provide as much information relating to the digital media content and/or the edited version of the digital media content as possible. This information may be used to generate recommendations of post-capture users to edit the digital media content.

Contextual parameters component 107 may be configured to obtain parameter values of contextual parameters of digital media content. The digital media content may be associated with the content capture user and/or the end user. Parameter values of the contextual parameters may define one or more temporal attributes and/or spatial attributes associated with capture of the digital media content. The one or more temporal attributes and/or spatial attributes may include one or more of a geolocation attribute, a device attribute, and/or a content attribute. The geolocation attribute may include a location of where the digital media content was captured. The device attribute may include a type of capturing device that captured the digital media content (e.g., specialized capture equipment, such as a drone, a particular type of camera, and/or other capturing device). The content attribute may include one or more of an action depicted within the digital media content, an activity depicted within the digital media content, and/or one or more objects depicted within the digital media content. The parameter values of contextual parameters may be provided by the end user and/or the content capture user and/or if the digital media content is uploaded via system 100, the parameter values of contextual parameters may be obtained from the digital media content itself (e.g., metadata associated with the digital media content, object recognition of content included within the digital media content, etc.).

Editing parameters component 108 may be configured to receive parameter values of editing parameters selected by the content capture user and/or the end user. The parameter values of editing parameters may define one or more editing attributes of the edited version of the digital media content to be created. The one or more editing attributes may include one or more of selected moments of the digital media content to include within the edited version of the digital media content, a target audience for the edited version of the digital media content, a sample of targeted edited content for the edited version of the digital media content, a length of the edited version of the digital media content, a category of the digital media content, a proposed budget for the edited version of the digital media content, a completion date for the edited version of the digital media content, a type of editing software to edit the digital media content, and/or other editing attributes.

Contextual parameters component 107 and/or editing parameters component 108 may be configured to obtain and/or receive such parameter values provided by the end user and/or the content capture user via project brief page 704. For example, as shown in FIGS. 7B-7C, the project name may have been provided via new project page 700 and auto-populated within project brief page 704. If not provided on new project page 700, system 100 may receive the project name associated with the digital media content (e.g., the project) from one or more client computing platform(s) 104 from project brief page 704. System 100 may further provide options for the length of the edited version of the digital media content (e.g., a desired length of the final footage), a number of camera angles within the raw digital media content, an amount of raw footage of digital media content, what the edited version of the digital media content may be used for (e.g., personal use, commercial use, etc.), the target audience for the edited version of the digital media content, a purpose for the edited version of the digital media content, the geolocation attribute, names of any individuals included within the digital media content, a summary of the digital media content, the content attribute (e.g., adventure, family, etc.), a type of the edited version of the digital media content (e.g., montage, story, a combination of montage and story, etc.), the category of the digital media content, one or more samples of target edited content for the edited version of the digital media content (e.g., the samples may be uploaded and/or provided via hyperlinks), any specific instructions for the post-capture user to be aware of when editing the digital media content, screen titles associated with the digital media content, music to be included within the edited version of the digital media content (e.g., music may be uploaded and/or selected by genre), and/or other parameters. While not shown, system 100 may provide an option for a field of view (e.g., for example, where the digital media content includes virtual reality, a spherical capture, or the like), a moment in time, and/or other options.

Figure 7D:
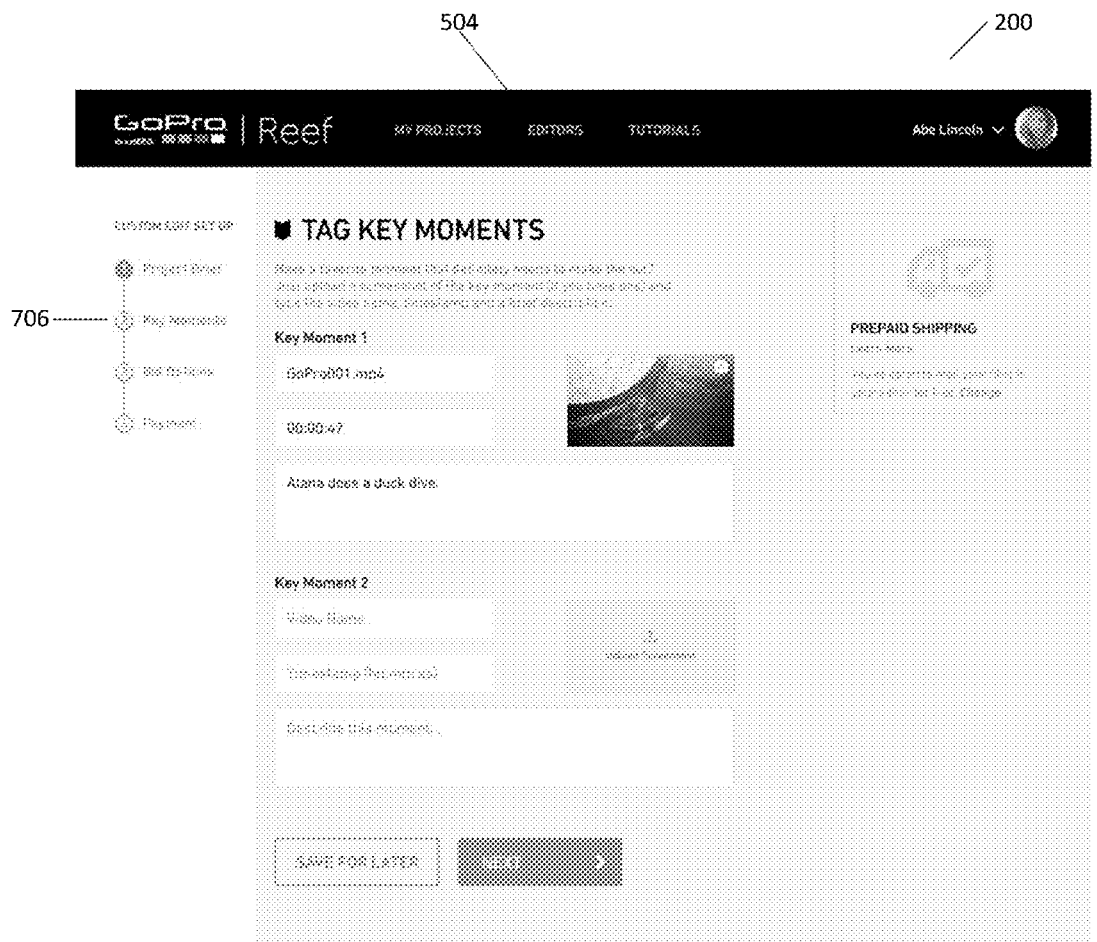

Editing parameters component 108 may be configured to receive one or more selected moments of interest within the digital media content to include within the edited version of the digital media content. The one or more selected moments of interest may include one or more highlights within the digital media content that the end user and/or the content capture user would like to include within the edited version of the digital media content. Referring to FIG. 7D, system 100 may effectuate presentation of key moments page 706 within user interface 200. Editing parameters component 108 may be configured to receive, via one or more client computing platform(s) 104, the one or more selected moments of interest within the digital media content. The one or more moments of interest may include a point in time within a particular digital media content file at which the one or more moments of interest begin, tag information associated with the one or more moments of interest, one or more screenshots of the one or more moments of interest, one or more sound clips of the one or more moments of interest, and/or other information relating to the one or more moments of interest. The tag information associated with the one or more moments of interest may include a description of the one or more moments of interest received by the content capture user and/or the end user, instructions for inclusion of the one or more moments of interest within the edited version of the digital media content, and/or other tag information associated with the one or more moments of interest. As will be described in further detail below with reference to FIG. 8D, a selection of the one or more moments of interest may be received from a client computing platform 104 associated with the content capture user and/or the end user via a selection within an uploaded portion of the digital media content.

Figure 7E:
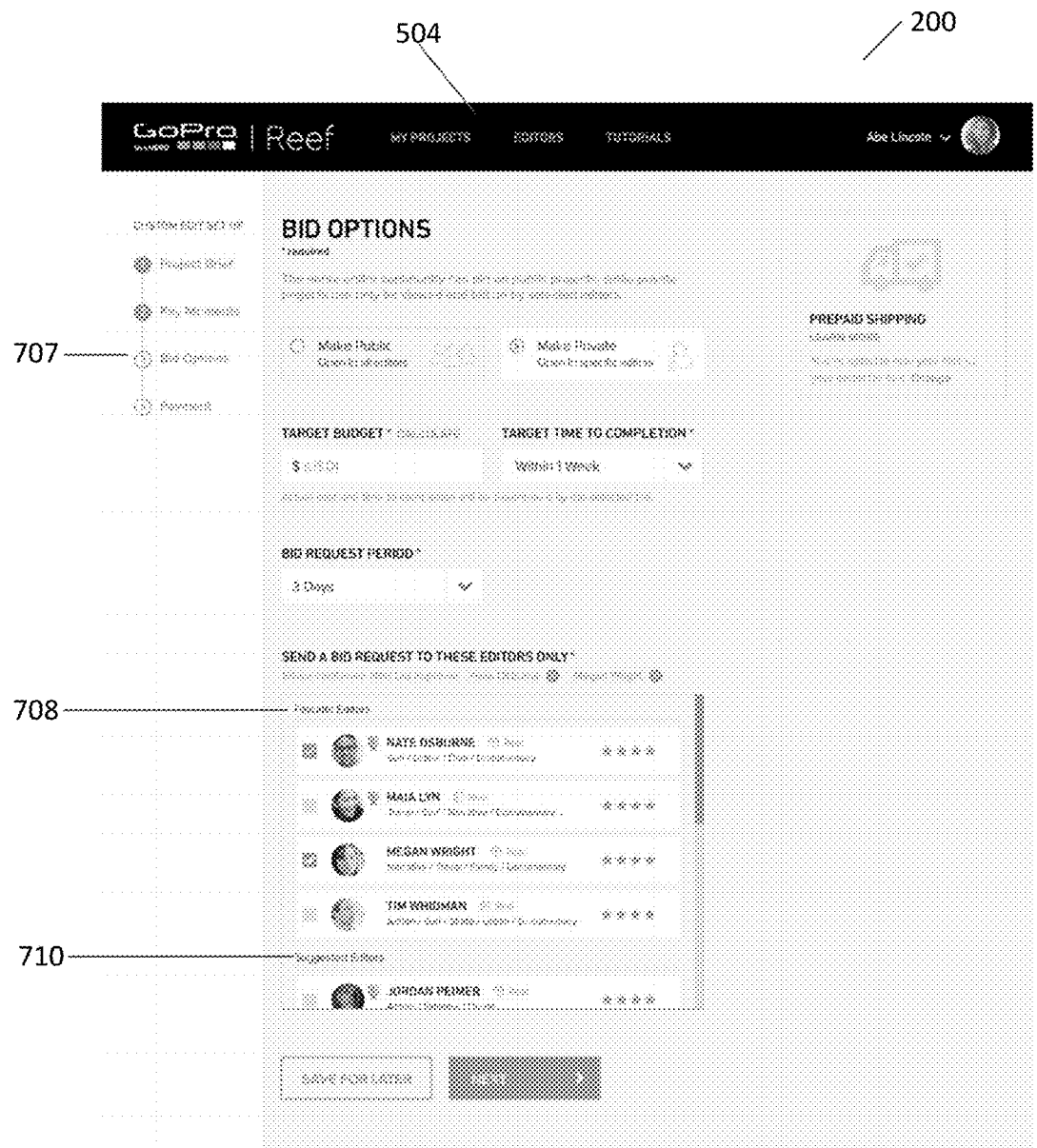

System 100 may effectuate presentation of bid options which the end user and/or the content capture user would like to select for post-capture users to bid on the project. For example, bid options page 707 may be presented within user interface 200. Editing parameters component 108 may be configured to obtain one or more of the proposed budget for the edited version of the digital media content, the completion date for the edited version of the digital media content, a bid request period for post-capture users to bid on editing the digital media content, and/or other information. System 100 may allow for the project to be open to a public community of post-capture users within the content editing marketplace to bid on editing the digital media content for the end user and/or the content capture user. System 100 may allow for the project to be private such that selected post-capture users may bid on editing the digital media content for the end user and/or the content capture user. As shown in FIG. 7E, system 100 may be configured to receive a selection of public bids or private bids from one or more client computing platform(s) 104.

If system 100 receives a selection to make the project public from one or more client computing platform(s) 104, system 100 may effectuate presentation of the project to any and/or all of the post-capture users available within the content editing marketplace. Any of the post-capture users may view the project and/or bid on the project to edit the digital media content.

If system 100 receives a selection to make the project private from one or more client computing platform(s) 104, profile component 109 may be configured to obtain post-capture user profiles. The individual post-capture user profiles may include the expertise attributes discussed above associated with individual post-capture users. As discussed above, the expertise attributes may include stated information (e.g., information provided by individual post-capture users themselves) and feedback information (e.g., ratings, reviews, and/or comments provided by the end users and/or the content capture users for whom the individual post-capture users have created edited versions of other digital media content).

Identification component 110 may be configured to identify a set of post-capture users as potential matches for creating the edited version of the digital media content based upon the contextual parameter values, the editing parameter values, the one or more expertise attributes of the post-capture user profiles, and/or other information. For example, if the end user and/or the content capture user would like the edited version of the digital media content to be a storyboard, identification component 110 may be configured to identify a set of post-capture users that specialize and/or are skilled in creating a storyboard with the highest average rating of feedback information. In another example, if the content included within the digital media content includes watersports, identification component 110 may be configured to identify a set of post-capture users that specialize and/or are skilled in editing digital media content including watersports with the highest average rating of feedback information.

Presentation component 111 may be configured to effectuate presentation of the set of post-capture users to the content capture user and/or the end user for selection by the content capture user and/or the end user of one or more of the post-capture users from the set of post-capture users to create the edited version of the digital media content. For example and referring to FIG. 7E, presentation component 111 may be configured to effectuate presentation of a set of favorite post-capture users 708 and/or the set of post-capture users as potential matches (e.g., suggest editors 710) within bid options page 707. The set of favorite post-capture users 708 may include one or more post-capture users that have the highest ratings (e.g., based upon ratings, comments, reviews, etc. of the feedback information). Presentation component 111 may be configured to effectuate presentation of the set of suggested post-capture users 710 which identification component 110 has identified. Presentation component 111 may be configured to effectuate presentation of relevant information associated with individual post-capture users such that the end user and/or the content capture user may quickly glance through the sets of post-capture users 708 and 710 to select one or more of the post-capture users. For example, the relevant information may include the name and/or alias of the post-capture user, a rating (e.g., based upon the feedback information) associated with the post-capture user, genres and/or types of digital media content that the post-capture user specializes in, the image associated with the post-capture user, and/or at least one demo reel from the post-capture user profile. System 100 may be configured to navigate to and/or effectuate presentation of a full post-capture user profile associated with any one of the recommended post-capture users if selected by one or more client computing platform(s) 104. System 100 may be configured to receive a selection of one or more of the post-capture users from the set of post-capture users 708 and/or 710 to create the edited version of the digital media content.

While recommending post-capture users to edit digital media content has been discussed herein, system 100 may be configured to recommend content capture users in a similar manner as described above. That is, a user may want to use a content capture user to capture content for the user. For example, contextual parameters component 106 may be configured to obtain values of contextual parameters of targeted digital media content (e.g., content to be captured). The values of contextual parameters of the targeted digital media content may define one or more temporal attributes and/or spatial attributes associated with capture of the targeted digital media content. Profile component 109 may be configured to obtain content capture user profiles. Individual content capture user profiles may include expertise attributes associated with individual content capture users. The expertise attributes may include stated information and feedback information. The stated information may be provided by the content capture users themselves. The feedback information may include information provided by one or more other users (e.g., post-capture users, etc.) of the content editing marketplace for whom the individual content capture users have captured other digital media content. Identification component 110 may be configured to identify a set of content capture users as potential matches for capturing the digital media content based upon one or more of the contextual parameter values, the one or more expertise attributes of the content capture user profiles, and/or other information. Presentation component 111 may be configured to effectuate presentation (not shown) of the set of content capture users for selection from the set of content capture users to capture the digital media content. This is not meant to be a limitation of the disclosure, as system 100 may be configured to recommend other users of the content editing marketplace. For example, system 100 may be configured to recommend music editors for the end user and/or the content capture users. Music editors may provide music and/or sound to be included within the edited version of the digital media content.

Figure 7F:
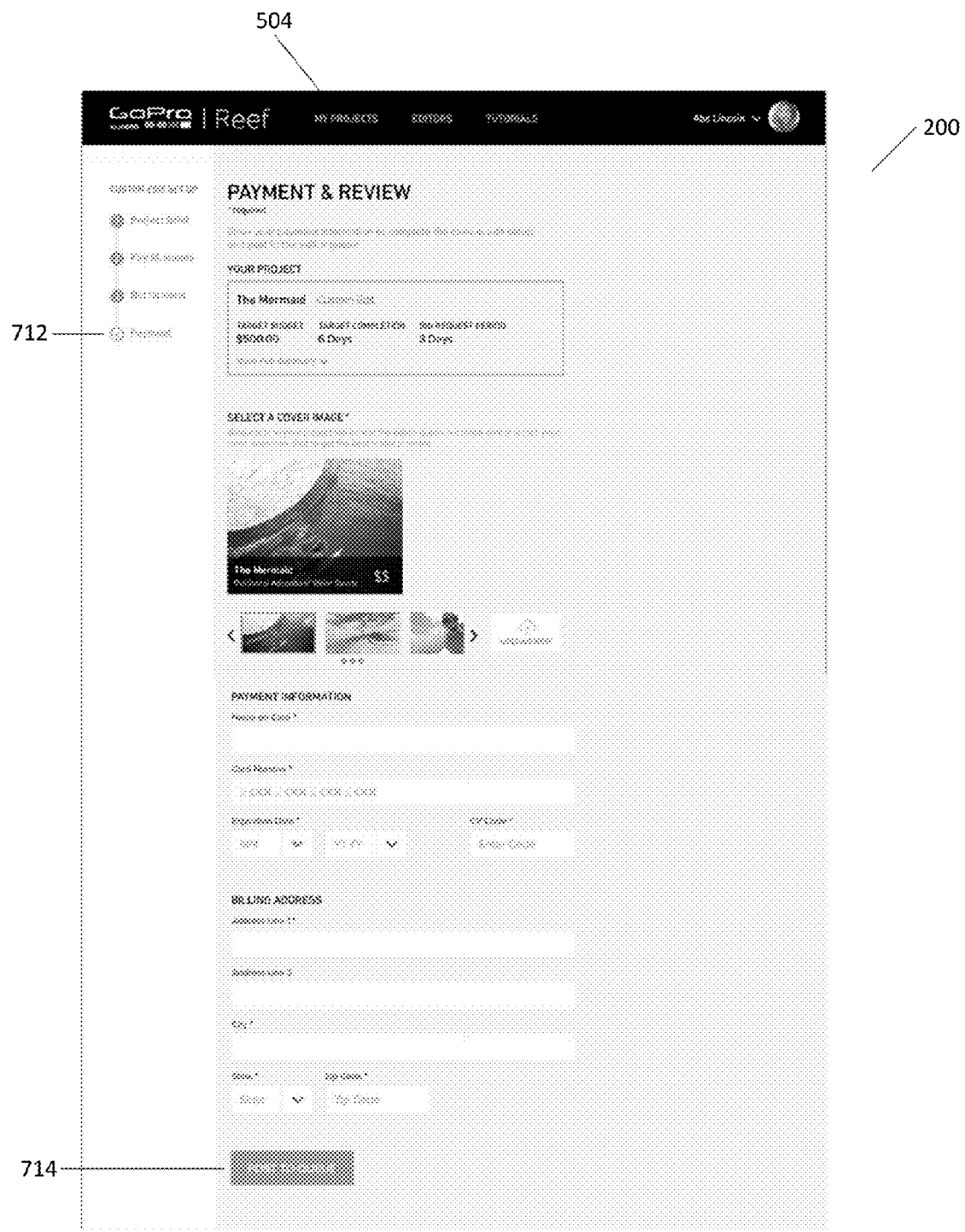

System 100 may be configured to effectuate presentation of payment page 712 of FIG. 7F within user interface 200. Payment page 712 may be provided to allow for the end user and/or the content capture user to provide a payment method and/or payment-related information (e.g., debit card information, credit card information, billing address, etc.) for the services of one or more of the post-capture users. System 100 may be configured to effectuate presentation of "POST TO QUEUE" button 714 within payment page 712. If button 714 is activated by one or more client computing platform(s) 104, system 100 may post the project to a queue, which will be discussed in further detail below.

Figure 8A:
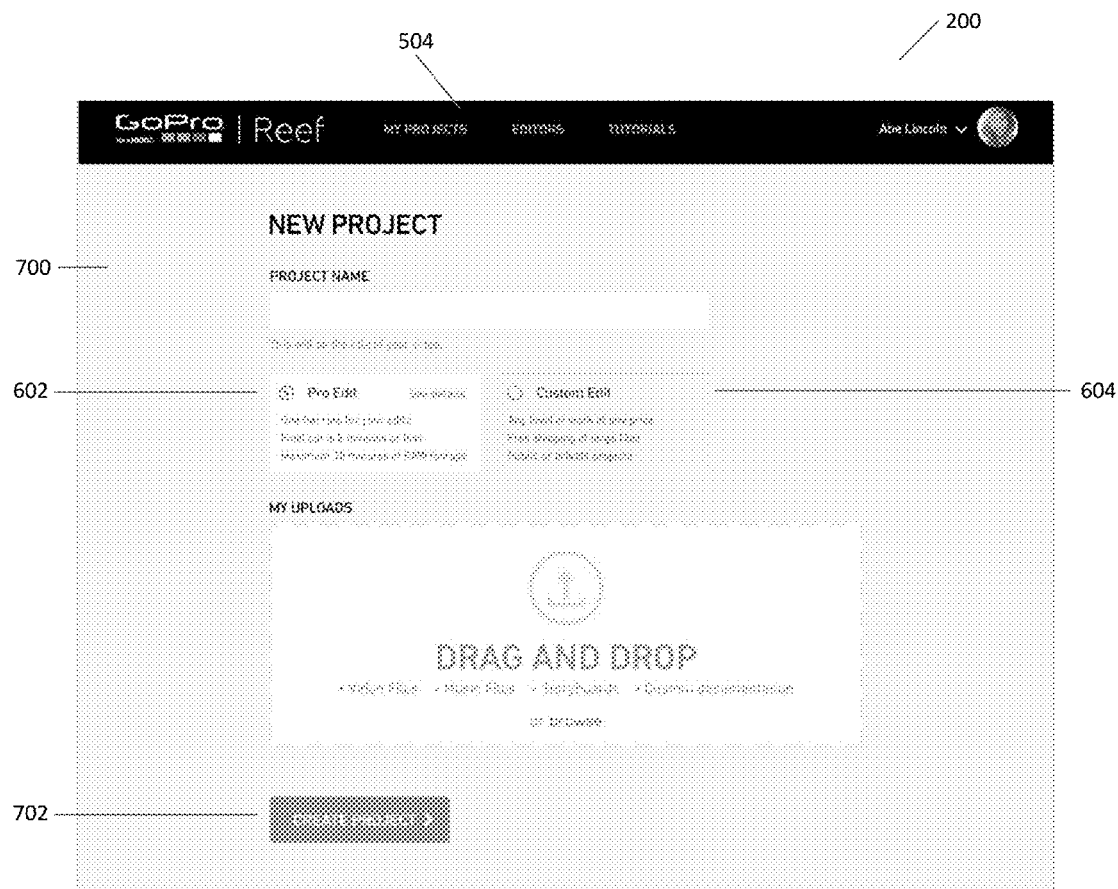
FIGS. 8A-8E illustrate exemplary depictions of a user interface of a content editing marketplace, in accordance with one or more implementations.

FIGS. 8A-E may refer to the pro edit process associated with pro edit 602 of FIG. 6. Referring to FIG. 8A, system 100 may be configured to effectuate presentation of new project page 700 within user interface 200. As discussed above, new project page 700 may allow for the end user and/or the content capture user to select an editing option (e.g., pro edit 602 and/or custom edit 604). If system 100 receives an indication from the end user and/or the content capture user that the end user and/or the content capture user would like to see details of the editing options, system 100 may effectuate presentation of pop-up window 600 (e.g., pro or custom edit page 600) of FIG. 6. System 100 may be configured to receive a project name associated with the digital media content and/or a selection of the editing options (e.g., pro edit 602 and/or custom edit 604) from one or more client computing platform(s) 104. System 100 may effectuate presentation of "CREATE PROJECT" button 702. System 100 may receive an activation of button 702 from one or more client computing platform(s) 104 to indicate that the end user and/or the content capture user would like to create the project. New project page 700 is provided for exemplary purposes only and is not meant to be a limitation of the disclosure. Any information may be provided within new project page 700, including information related to directly uploading the raw digital media content from project page 700. The raw digital media content may be stored to electronic storage 122 of FIG. 1.

Figure 8B:
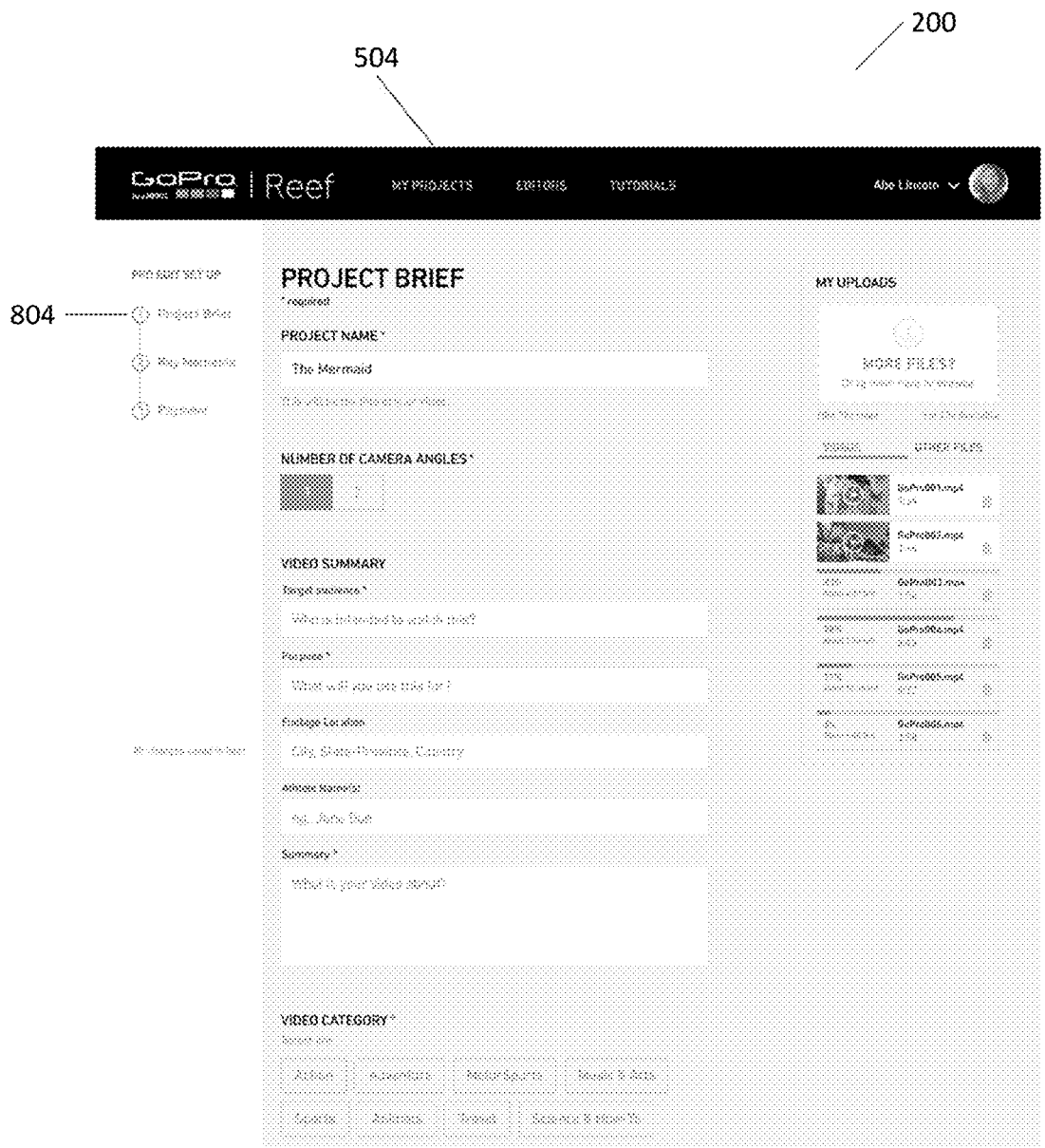
Figure 8C:
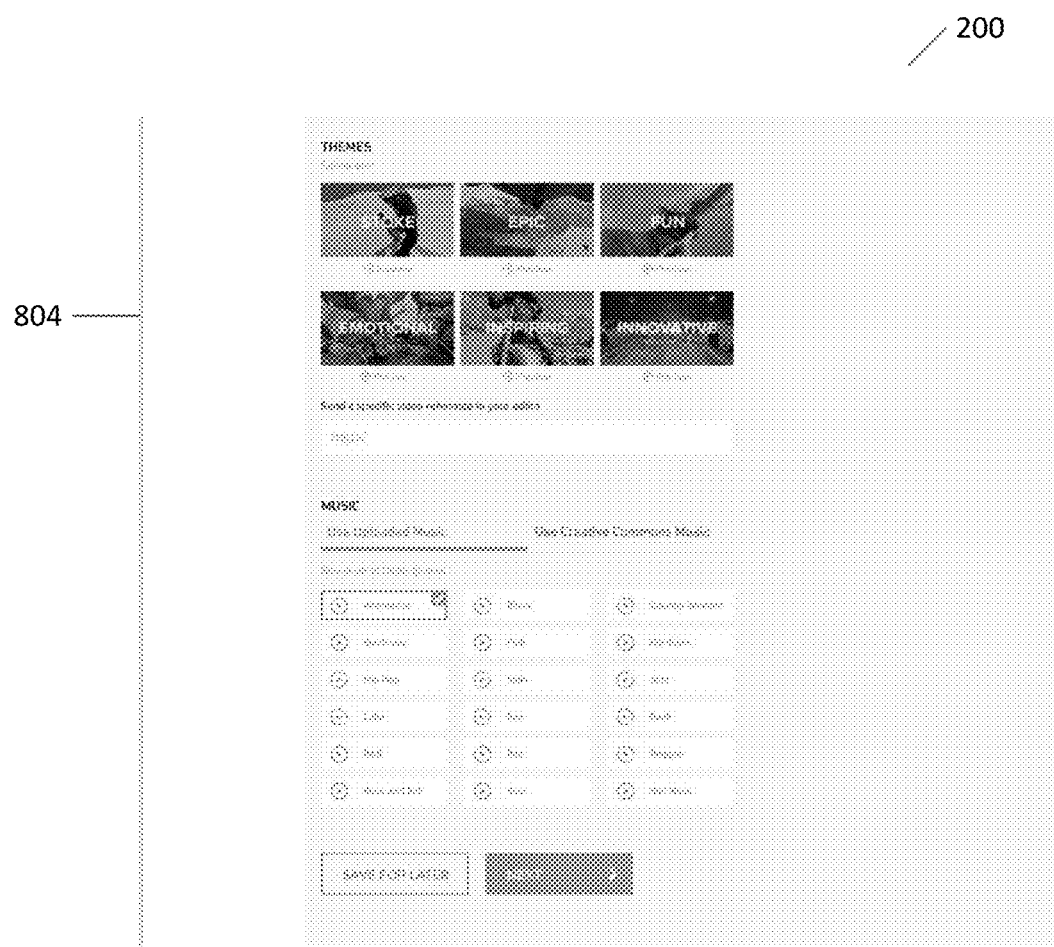

Referring to FIGS. 8B-8C, upon activation of button 702, system 100 may effectuate presentation of project brief page 804 within user interface 200. Project brief page 804 may be provided such that the end user and/or the content capture user may provide as much information relating to the digital media content and/or the edited version of the digital media content as possible. As discussed above, this information may be used to generate recommendations of post-capture users to edit the digital media content. Project brief page 804 may be similar to project brief page 704 of FIGS. 7B-7C. Project brief page 804 of FIGS. 8B-8C may include an option to upload one or more raw digital media content files. System 100 may be configured to accept uploaded raw digital media content up to a particular amount as indicated by the one or more features and/or options of pro edit 602.

Figure 8D:
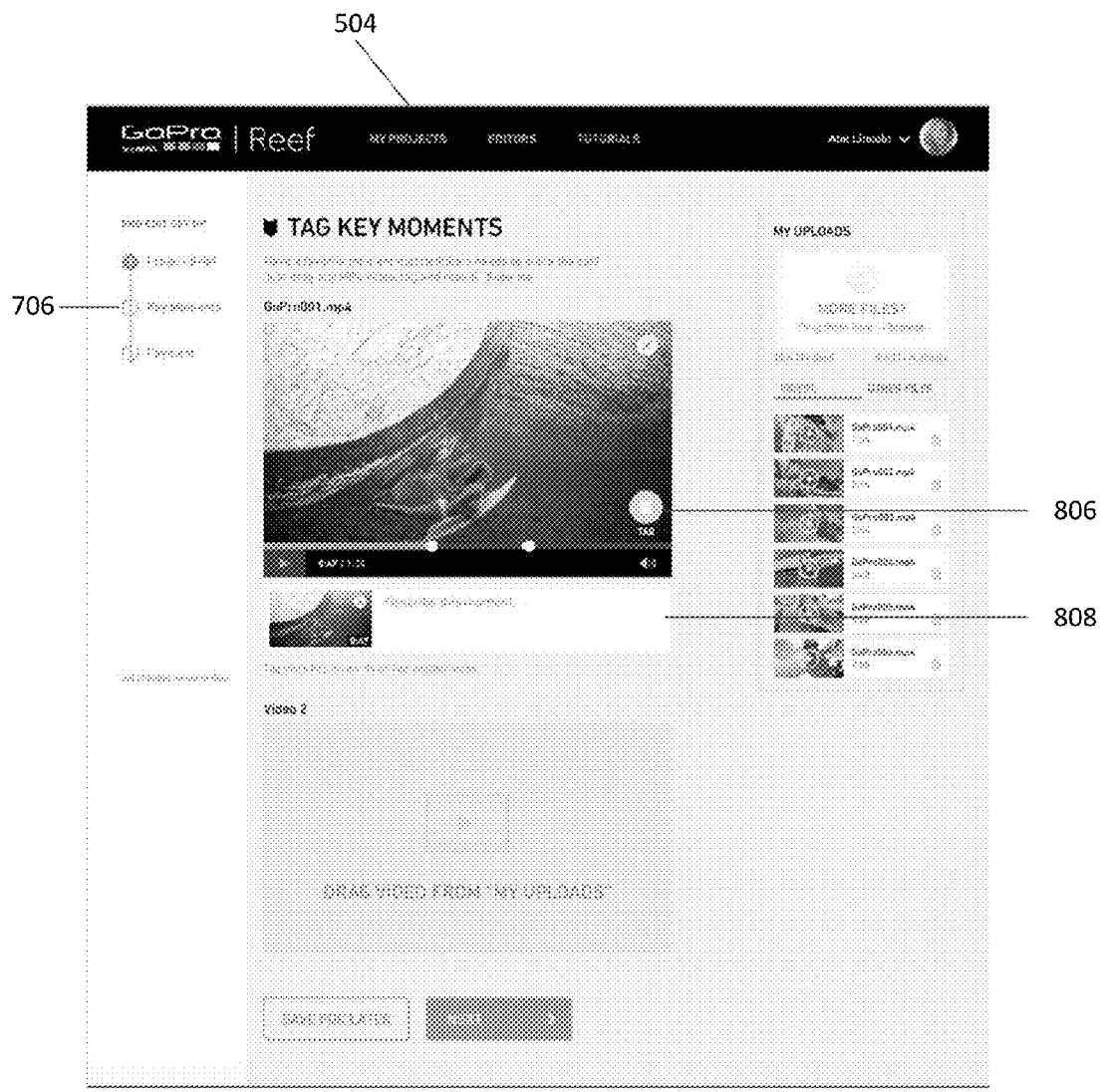

Referring to FIG. 8D, system 100 may effectuate presentation of key moments page 706 within user interface 200. Key moments page 706 of FIG. 8D may be similar to key moments page 706 of FIG. 7D. System 100 may be configured to obtain, via client computing platform 104 associated with the content capture user and/or the end user, a portion of the digital media content. The portion of the digital media content may have a time duration. The time duration of the portion of the digital media content may be less than a time duration of the digital media content or may be equal to the time duration of the digital media content. In this manner, the content capture user and/or the end user may upload, via user interface 200, the portion of the digital media content to the content editing marketplace via client computing platform 104.

Upon receiving the portion of the digital media content, system 100 may be configured to effectuate transmission of the portion of the digital media content to client computing platform 104 for presentation. The content capture user and/or the end user may consume the portion of the digital media content that was uploaded to the content editing marketplace. As the content capture user and/or the end user consumes the portion of the digital media content, system 100 may be configured to receive a selection of one or more moments of interest within the portion of the digital media content. Individual moments of interest may correspond to individual points in time within the time duration of the portion of the digital media content. Individual points in time may correspond to individual frames of the digital media content.

System 100 may receive activation of "TAG" button 806 from one or more client computing platform(s) 104 at a point in time within the time duration of the portion of the digital media content. Upon receiving activation of "TAG" button 806, system 100 may be configured to tag the moment of interest at the point in time during the time duration within the portion of the digital media content. Tagging the moment of interest may include providing a highlight of the moment of interest during playback of the portion of the digital media content and/or editing of the digital media content. The tag may include an indication provided to one or more users to make the user(s) aware of the moment(s) of interest. The indication may include one more of a visual indication, an audible indication, and/or other indications. The indication may be provided during one or both of playback and/or editing of the digital media content to make user(s) aware of the moment(s) of interest. If the digital media content includes a spherical video segment, receiving one or more selected moments of interest may include receiving, from one or more client computing platforms 104, a selection of a field of view within the spherical video segment.

Receiving the one or more selected moments of interest may include receiving, from one or more client computing platforms 104, tag information associated with the one or more moments of interest. Individual moments of interest may include tag information. The tag information may include instructions for editing the digital media content. For example, the content capture user and/or the end user may provide instructions via freeform field 808 within user interface 200 to include a particular moment of interest and/or audio associated with that particular moment of interest within the edited version of the digital media content. The instructions may include instructions for a selected post-capture user to include a particular moment of interest as an opening frame and/or closing frame for the edited version of the digital media content. Any other instructions may be provided via freeform field 808 to be associated with one or more moments of interest.

Receiving the one or more selected moments of interest may include obtaining individual images associated with the individual moments of interest from the portion of the digital media content at individual points in time within the time duration. For example, system 100 may be configured to obtain a first image from the portion of the digital media content at a first point in time of a first moment of interest. The first image may include a still image associated with the first point in time of the first moment of interest of the portion of the digital media content. The still image may be timestamped with the first point in time.

Figure 8E:
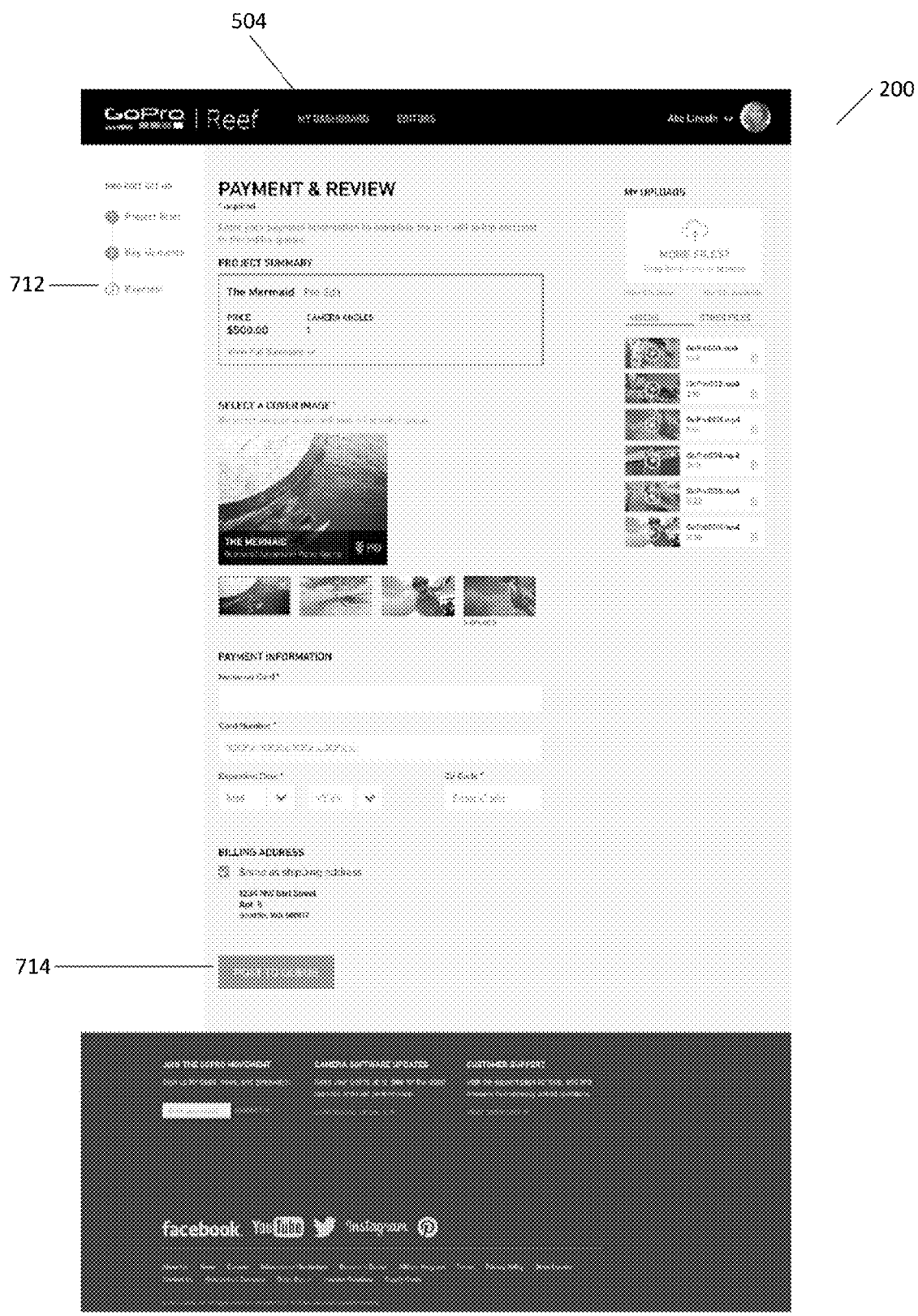

System 100 may be configured to effectuate presentation of payment page 712 of FIG. 8E within user interface 200. Payment page 712 of FIG. 8E may be similar to payment page 712 of FIG. 7F, including "POST TO QUEUE" button 714.

While not shown with reference to FIGS. 8A-8E, identification component 110 may be configured to identify a set of post-capture users as potential matches for creating the edited version of the digital media content based upon one or more of values of the contextual parameters, values of the editing parameters, the one or more expertise attributes of the post-capture user profiles in a similar manner as discussed above, and/or other information. For example, if the end user and/or the content capture user would like the edited version of the digital media content to be a storyboard, identification component 110 may be configured to identify a set of post-capture users that specialize and/or are skilled in creating a storyboard with the highest average rating of feedback information. In another example, if the content included within the digital media content includes watersports, identification component 110 may be configured to identify a set of post-capture users that specialize and/or are skilled in editing digital media content including watersports with the highest average rating of feedback information. With reference to the pro edit process, system 100 may automatically select a post-capture user from the identified set of post-capture users as potential matches to edit and/or create the edited version of the digital media content for the end user and/or the content capture user. In this manner, the end user and/or the content capture user may not be required to view the set of post-capture users and/or select one of the post-capture users from the set of post-capture users.

Figure 9A:
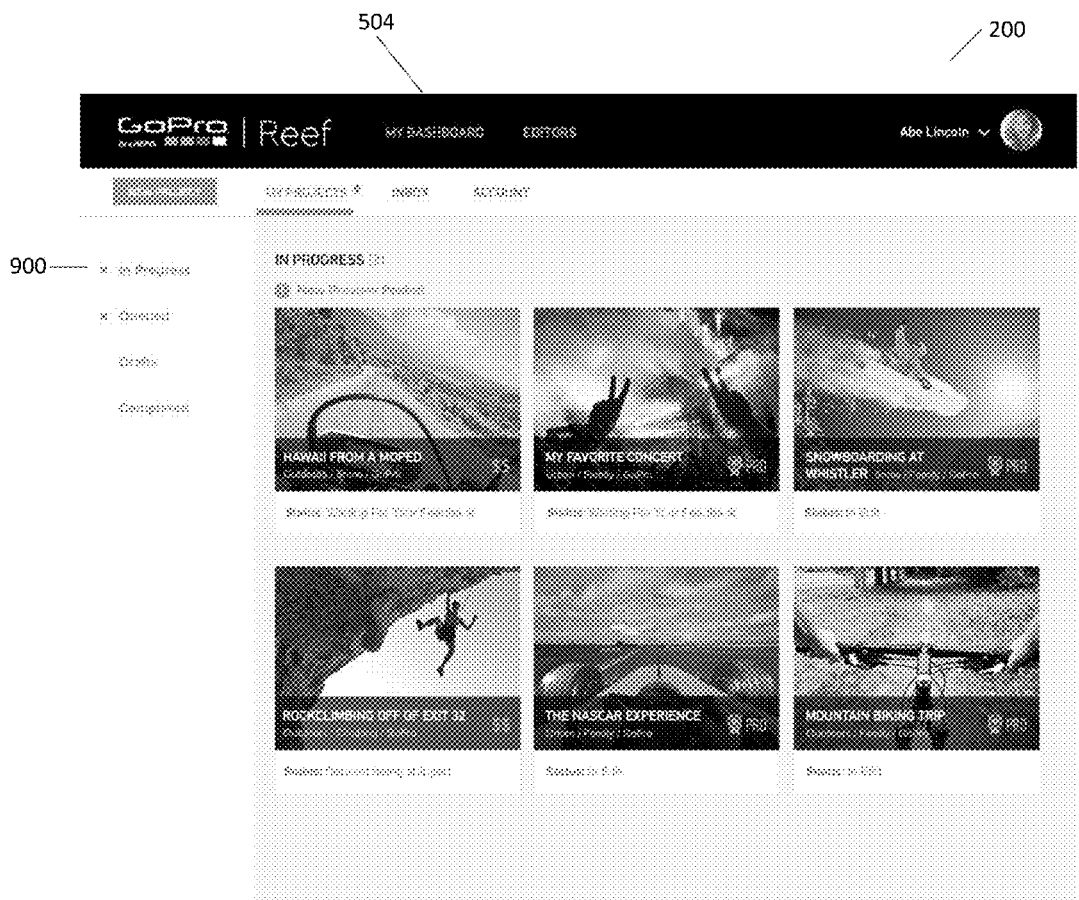
FIGS. 9A-9B illustrate exemplary depictions of a user interface of a content editing marketplace, in accordance with one or more implementations.

Referring to FIG. 9A, upon receiving activation of "POST TO QUEUE" button 714 from one or more client computing platform(s) 104, system 100 may be configured to effectuate presentation of in progress page 900 within user interface 200. In progress page 900 may include projects of the end user and/or the content capture user that are currently in progress within the content editing marketplace. For example, in progress page 900 may include projects that have been assigned to a post-capture user for editing, but has not yet been completed. System 100 may be configured to effectuate presentation of a status associated with individual in progress projects within in progress page 900. For example, one or more projects may be waiting for feedback from the end user and/or the content capture user, one or more projects may currently be in editing by one or more post-capture users, and/or the raw digital media content of one or more projects may be in transit to one or more post-capture users. These are for exemplary purposes only, as other status updates may be available. System 100 may be configured to effectuate presentation of in progress page 900 navigation menu 504 of user interface 200.

Figure 9B:
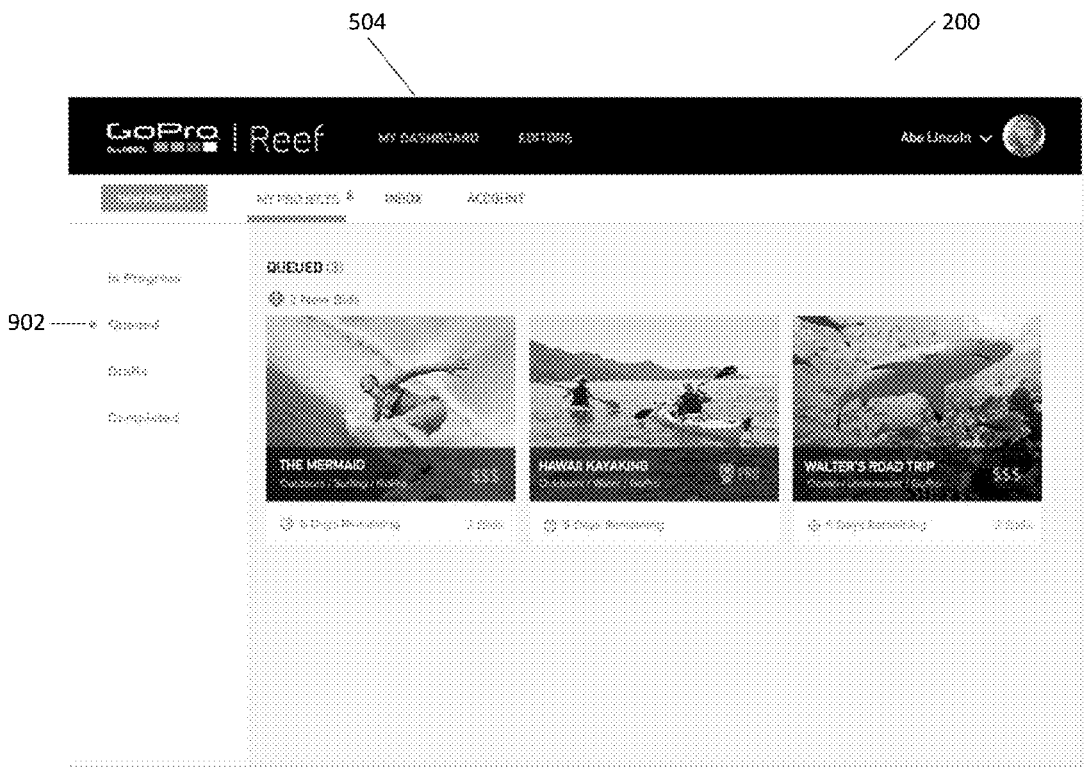

Referring to FIG. 9B, system 100 may be configured to effectuate presentation of queued page 902 within user interface 200. Queued page 902 may include projects of the end user and/or the content capture user that are currently in queue to receive bids from post-capture users. System 100 may effectuate presentation of a status associated with individual projects within queued page 902. For example, how much time is left open to receive bids from post-capture users may be displayed for individual projects. This is for exemplary purposes only, as other status updates may be available. System 100 may effectuate presentation of queued page 902 through navigation menu 504 of user interface 200.

Various users of the content editing marketplace may navigate through the content editing marketplace using navigation menu 504 to view completed projects (e.g., edited versions of other digital media content), other user profiles (e.g., end user profiles, content capture profiles, and/or post-capture user profiles), communicate with other users of the content editing marketplace via a messaging mechanism available via system 100.

Figure 10A:
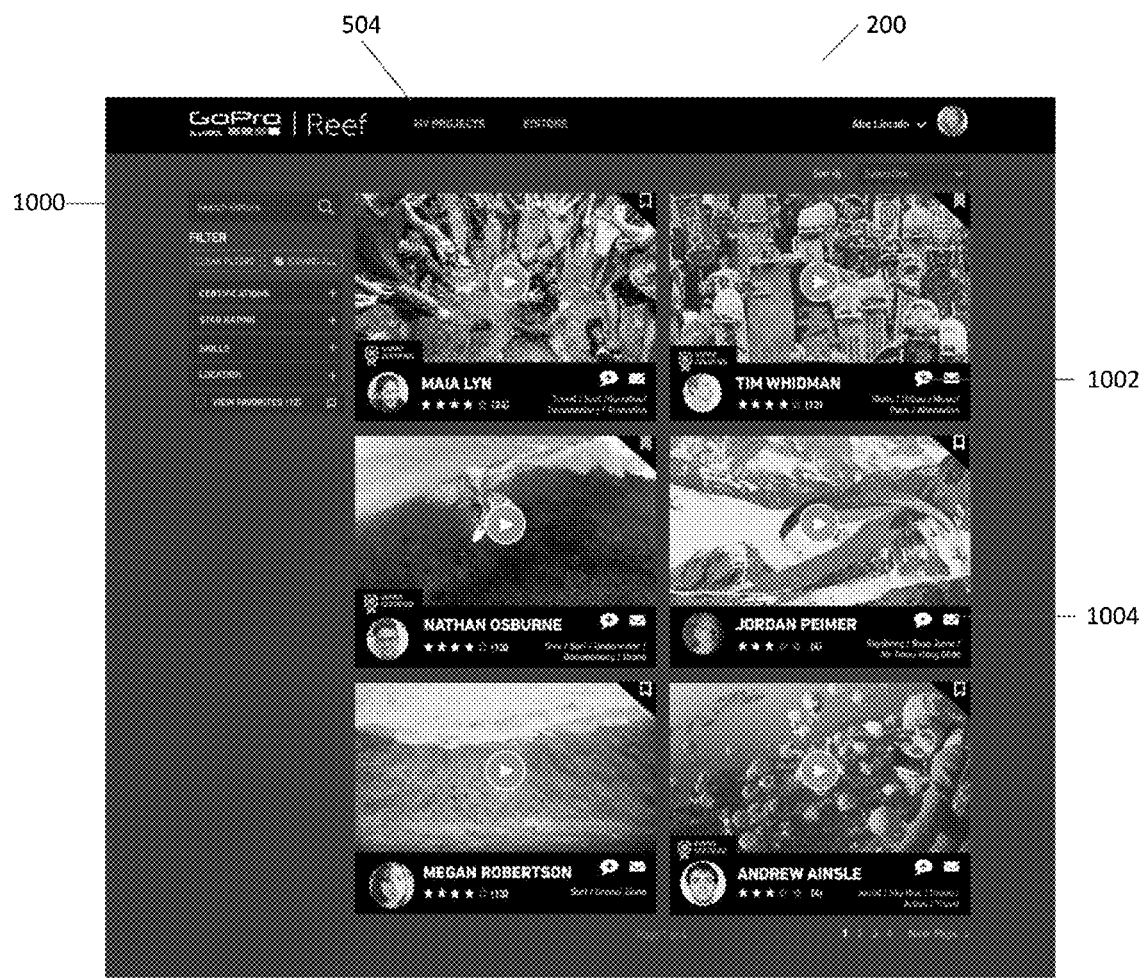
FIGS. 10A-10B illustrate exemplary depictions of a user interface of a content editing marketplace, in accordance with one or more implementations.
Figure 10B:

For example and referring to FIGS. 10A-10B, system 100 may be configured to effectuate presentation of editors page 1000. Editors page 1000 may include a list of post-capture users that are registered users of the content editing marketplace. System 100 may effectuate presentation of relevant information associated with individual post-capture users as a preview of the individual post-capture user profiles such that the end user and/or the content capture user may quickly glance through the list of post-capture users included within editors page 1000. For example, the relevant information may include the name and/or alias of the post-capture user, a rating (e.g., based upon the feedback information) associated with the post-capture user, genres and/or types of digital media content that the post-capture user specializes in and/or would like to edit, the image associated with the post-capture user, and/or at least one demo reel from the post-capture user profile. Individual previews of the individual post-capture user profiles shown in FIG. 10A may include bid button 1002 and/or message button 1004. System 100 may be configured to receive activation of bid button 1002 from one or more client computing platform(s) 104 to indicate that the end user and/or the content capture user would like to request a bid from that particular post-capture user. System 100 may be configured to receive activation of message button 1004 from one or more client computing platform(s) 104 to indicate that the end user and/or the content capture user would like to communicate with that particular post-capture user via the messaging mechanism available via system 100.

As shown in FIG. 10B, system 100 may be configured to receive an indication (e.g., hovering, clicking, tapping, etc.) from one or more client computing platform(s) 104 to display the at least one demo reel from the post-capture user profile via pop-up 1006 of user interface 200. System 100 may be configured to navigate one or more client computing platform(s) 104 to the post-capture user profile associated with any one of the recommended post-capture users.

Figure 11:
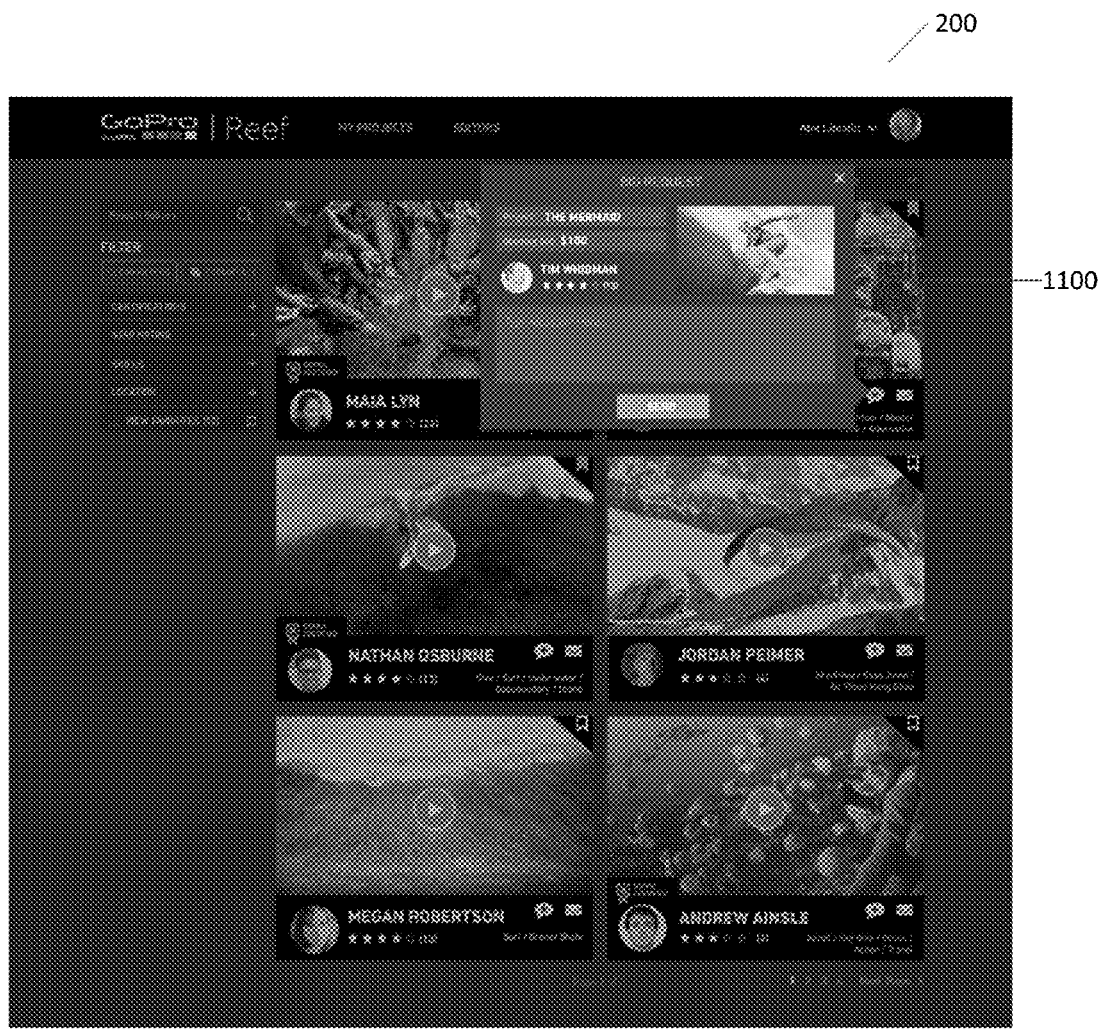
FIGS. 11-12 illustrate exemplary depictions of a user interface of a content editing marketplace, in accordance with one or more implementations.

Referring to FIG. 11, the end user and/or the capture content user may request a bid from one or more post-capture users. As shown in FIG. 11, system 100 may be configured to receive an indication (e.g., hovering over, clicking, tapping, etc. button 1002 within the preview of the post-capture user profile and/or the post-capture user profile itself, etc.) from one or more client computing platform(s) 104 to display bid request pop-up window 1080 of user interface 200. System 100 may be configured to receive a bid request from one or more client computing platform(s) 104 via bid request pop-up window 1080. System 100 may effectuate transmission of the bid request to the post-capture user. In this manner, the end user and/or the content capture user may communicate that the end user and/or the content capture user is interested in the post-capture user and/or would potentially like the post-capture user to edit the digital media content (e.g., the project).

Figure 12:
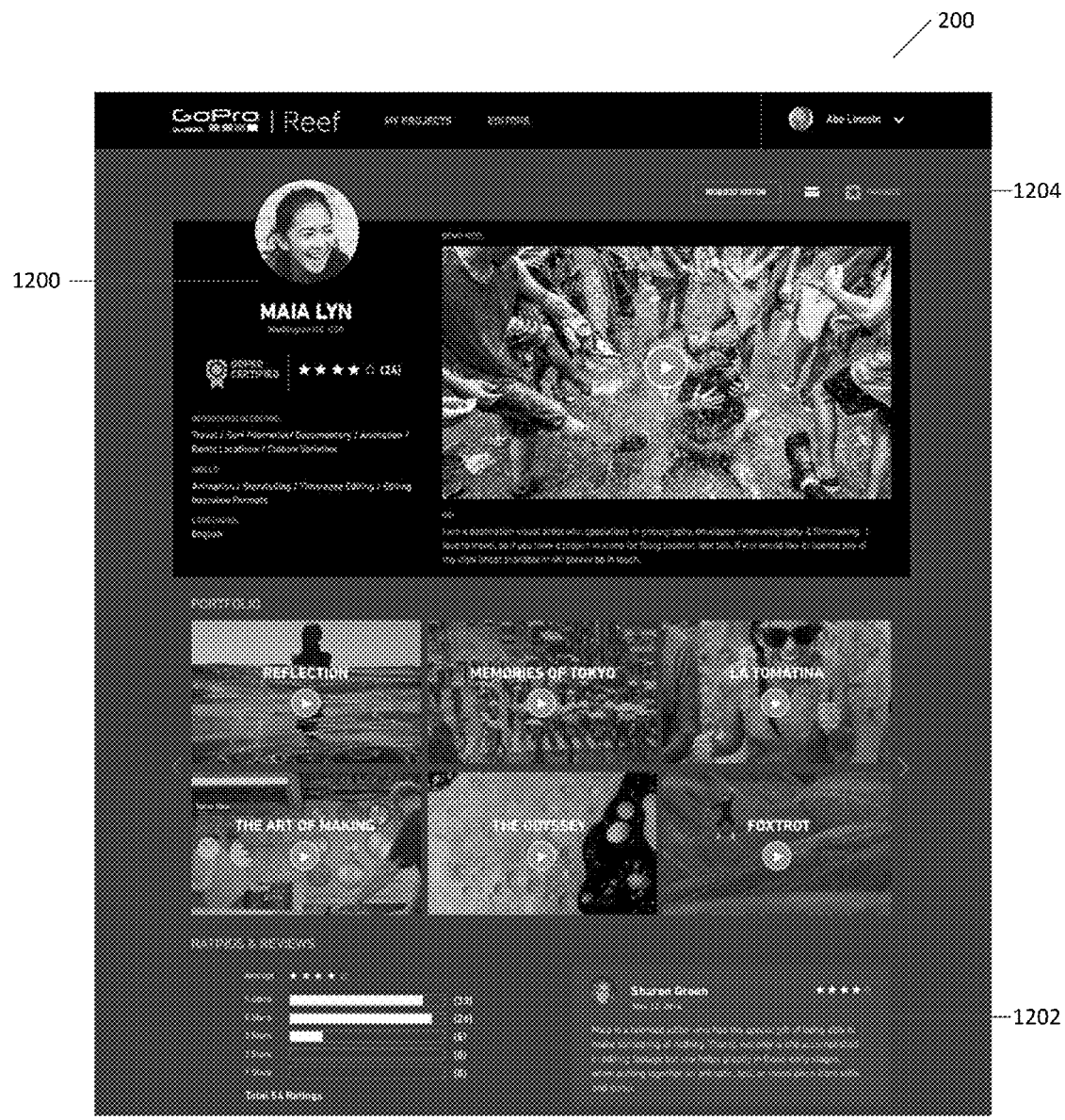

System 100 may effectuate presentation of the post-capture user profile associated with the post-capture user. Referring to FIG. 12, post-capture user profile 1200 may include the expertise attributes associated with the post-capture user. As discussed above, the expertise attributes associated with the post-capture user may include the stated information provided by the post-capture user and feedback information. Feedback information may include information provided by one or more of the content capture users and/or the end users for whom the post-capture user has created edited versions of other digital media content. As shown in FIG. 12, the post-capture user profile may include the name and/or alias of the post-capture user (e.g., Maia Lyn), the feedback information (e.g., an overall rating of 4 out of 5 stars with 24 reviews, actual written reviews by other users of the content editing marketplace (e.g., review 1202)), whether the post-capture user is certified as an editor for the content editing marketplace, what the post-capture user is interested in editing, skills of the post-capture user, languages spoken and/or understood by the post-capture user, the biography of the post-capture user, the portfolio of the post-capture user available for viewing, and/or any other information may be included within the post-capture user profile. The end user and/or the content capture user may request the post-capture user directly from the post-capture user profile via "REQUEST EDITOR" button 1204.

Figure 13A:
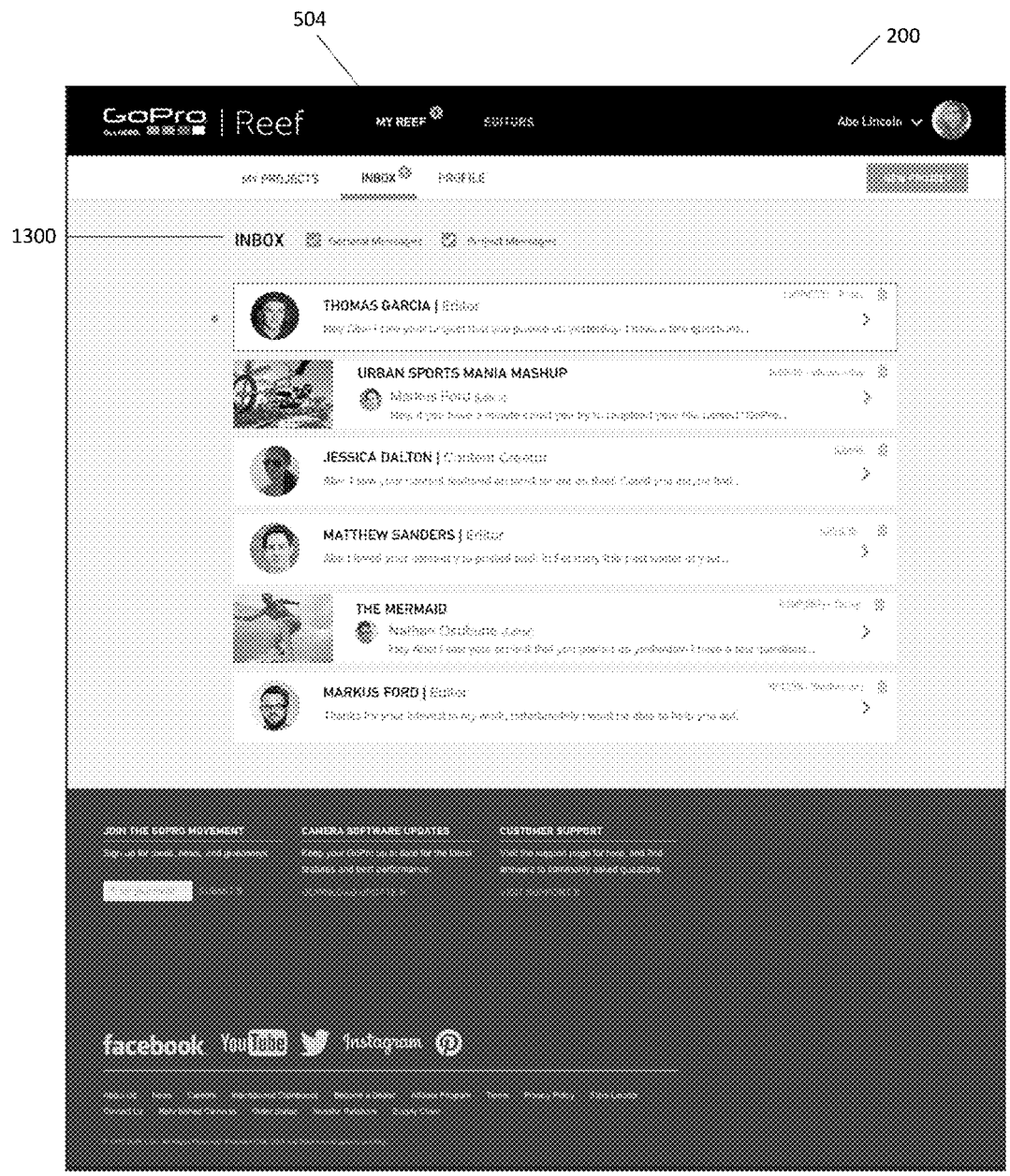
FIGS. 13A-13B illustrate exemplary depictions of a user interface of a content editing marketplace, in accordance with one or more implementations.
Figure 13B:
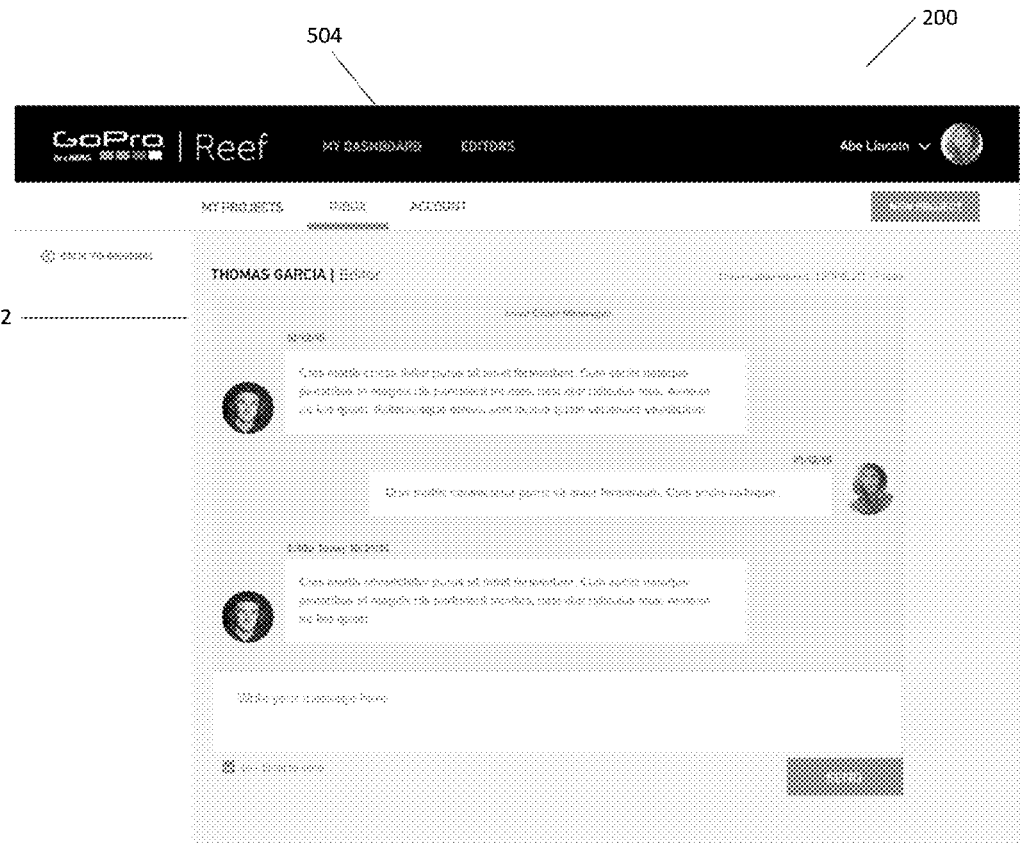

Users of the content editing marketplace may communicate with one another via the messaging mechanism available via system 100. The messaging mechanism may include an email functionality, an instant messaging functionality, and/or other communicating functionality. Referring to FIGS. 13A-13B, system 100 may be configured to effectuate presentation of messaging inbox 1300 within user interface 200. Messaging inbox 1300 may include a list of messages received from other users of the content editing marketplace. Upon receiving an indication (e.g., clicking, tapping, etc.) from one or more client computing platform(s) 104 to view a particular thread of messages between a particular user of the content editing marketplace, system 100 may be configured to effectuate presentation of messages page 1302. Messages page 1302 may include a history of communication between the logged in user and another user of the content editing marketplace. Messages page 1302 may be used to communicate with a particular user of the content editing marketplace.

Figure 14:
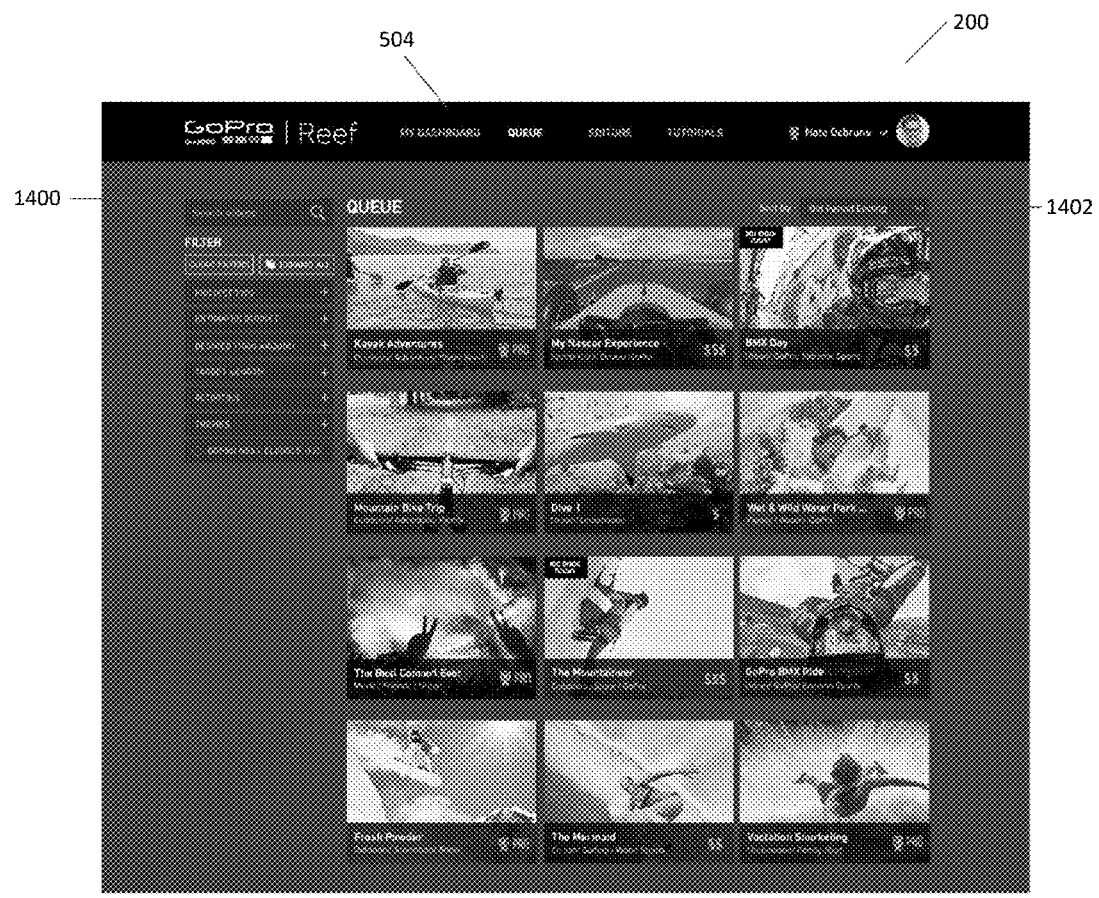
FIG. 14 illustrates an exemplary depiction of a user interface of a content editing marketplace, in accordance with one or more implementations.

System 100 may be configured to effectuate presentation of a project queue for the post-capture user to view via a display of one or more client computing platform(s) 104. Referring to FIG. 14, system 100 may be configured to effectuate presentation of project queue page 1400 within user interface 200. Project queue page 1400 may include a list of projects that are available to bid for editing the digital media content associated with the project. The list of projects may include the title of the project, the proposed budget of the project, the genre and/or type of the digital media content of the project, and/or other information relating to the project. System 100 may be configured to filter through the projects listed within project queue page 1400 by receiving a selection from "Sort By" dropdown menu 1402. System 100 may be configured to navigate users to project queue page 1400 via navigation menu 504 of user interface 200.

Figure 15A:
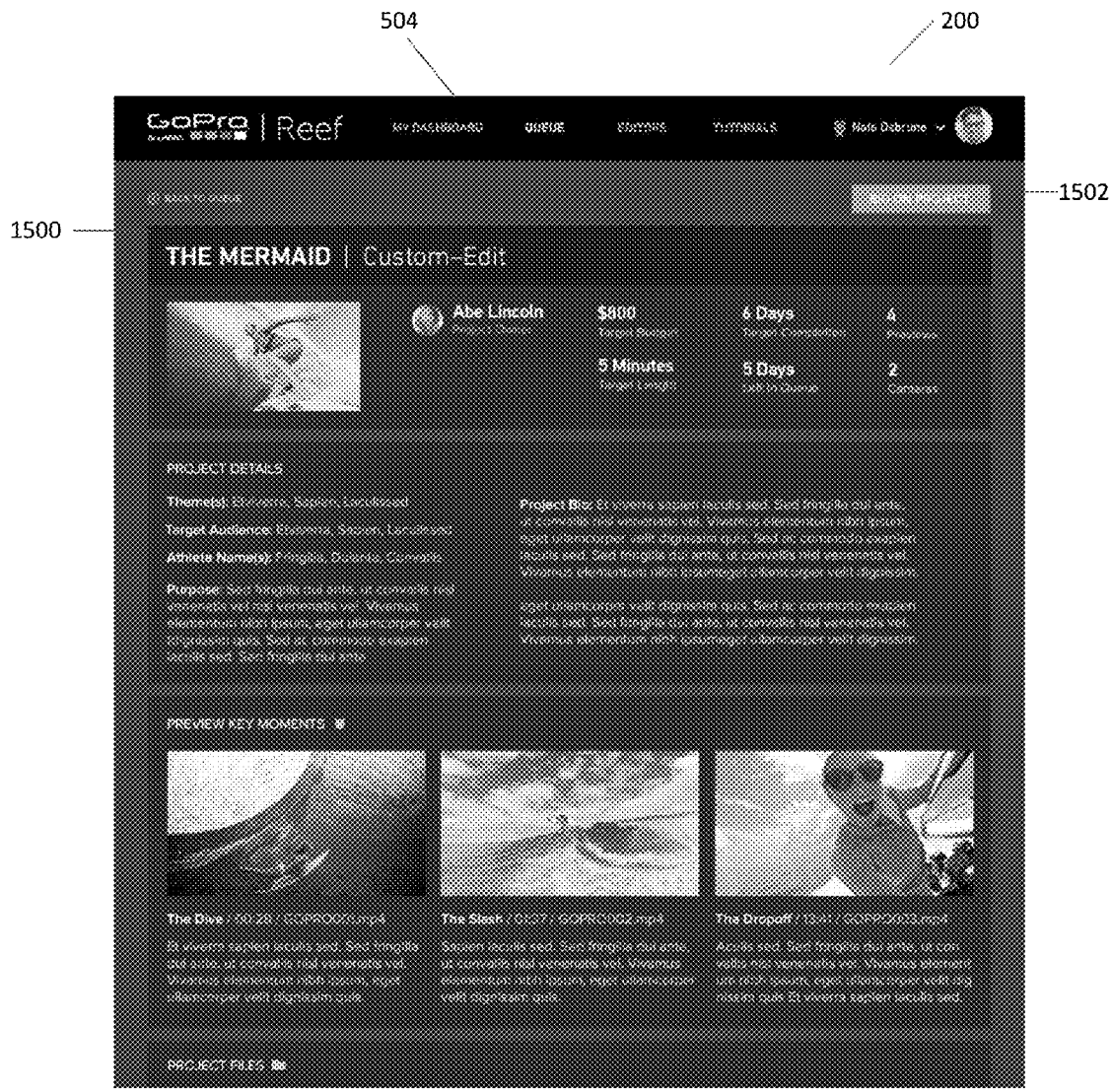
FIGS. 15A-15B illustrate exemplary depictions of a user interface of a content editing marketplace, in accordance with one or more implementations.
Figure 15B:
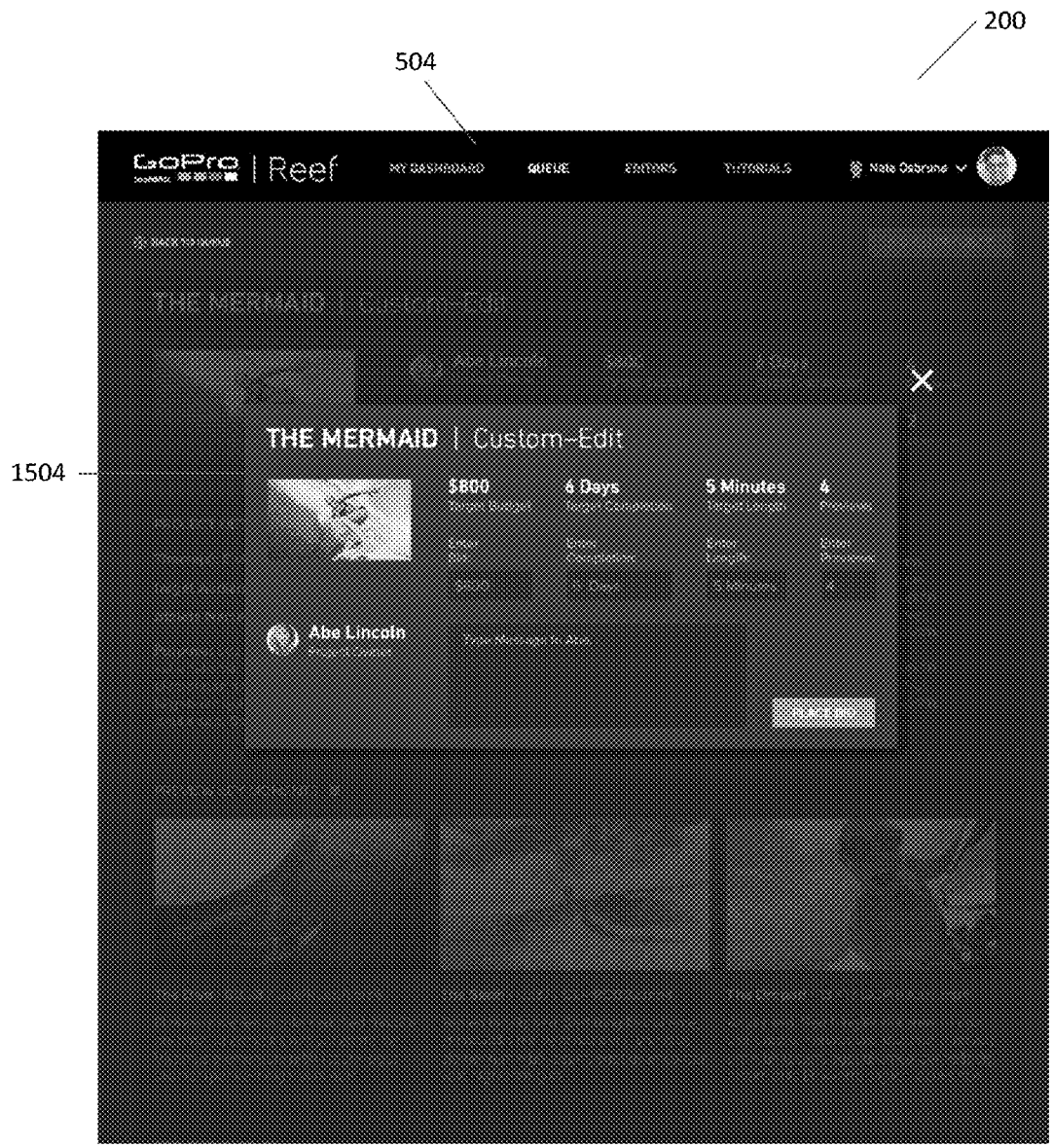

Referring to FIGS. 15A-15B, system 100 may be configured to effectuate presentation of project page 1500. Project page 1500 may include values of the contextual parameters and/or the editing parameters provided by the end user and/or the content capture user associated with the digital media content (e.g., the project). As shown in FIG. 15A, project page 1500 may include the title of the project (e.g., "THE MERMAID"), an image associated with the project, the end user and/or the content capture user associated with the project (e.g., Abe Lincoln), the target budget for the edited version of the digital media content to be created (e.g., $500), the completion date for the edited version of the digital media content (6 days from today), the target length of the edited version of the digital media content (5 minutes), the number of camera angles included within the raw digital media content (e.g., 2), the theme, target audience, individuals captured within the digital media content, the purpose for the project, the biography for the project, the one or more selected moments of interest to be included within the edited version of the digital media content, and/or other information relating to the project. Post-capture users may bid for the project via "BID ON PROJECT" button 1502 available within project page 1500.

Upon receiving activation (e.g., clicking, tapping, hovering, etc.) of button 1502 from one or more client computing platform(s) 104, system 100 may be configured to effectuate presentation of pop-up window 1504 of FIG. 15B. Pop-up window 1504 may include free forms such that the post-capture user may include a bid for the project. System 100 may be configured to receive the bid via pop-up window 1504.

Figure 16:
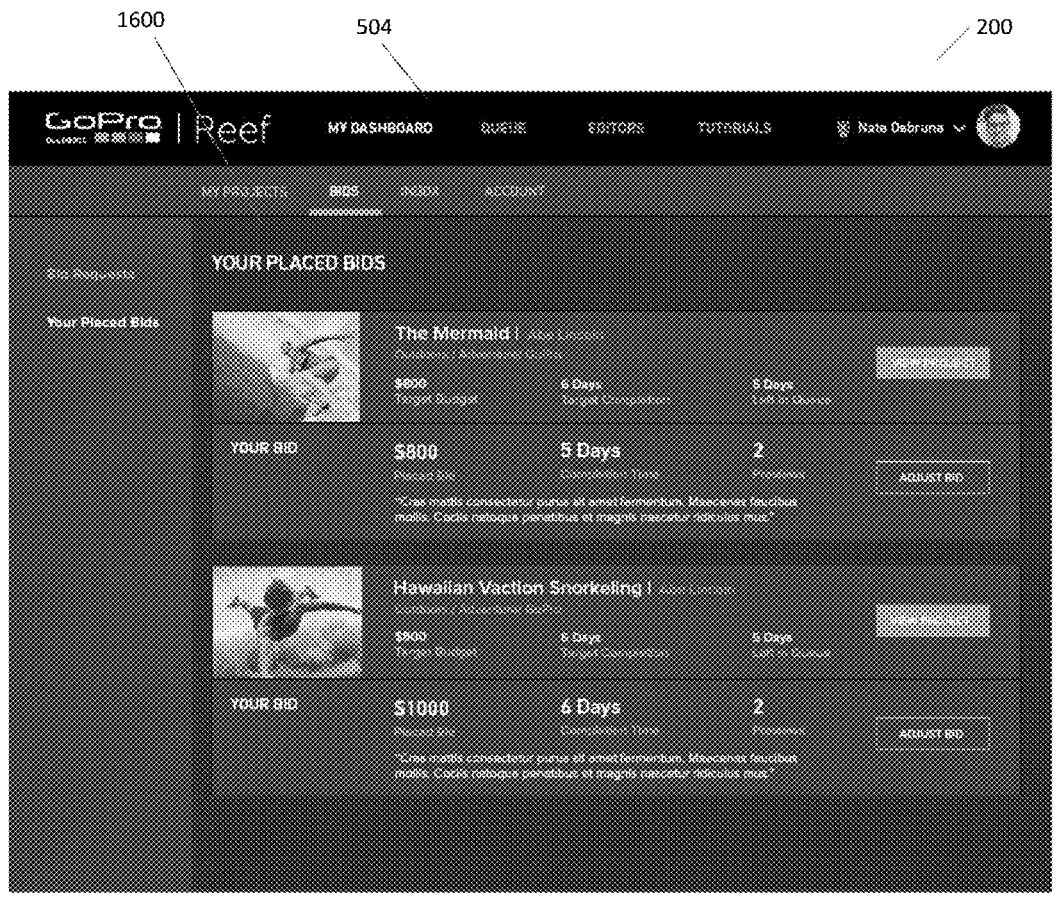
FIGS. 16-17 illustrate exemplary depictions of a user interface of a content editing marketplace, in accordance with one or more implementations.

System 100 may be configured to effectuate presentation of placed bids of a post-capture user via placed bids page 1600 of FIG. 16. Placed bids page 1600 may include any bids for projects that the post-capture user has placed. System 100 may allow for the post-capture user to adjust and/or edit an individual bid of an individual project prior to close of the bidding period.

Figure 17:
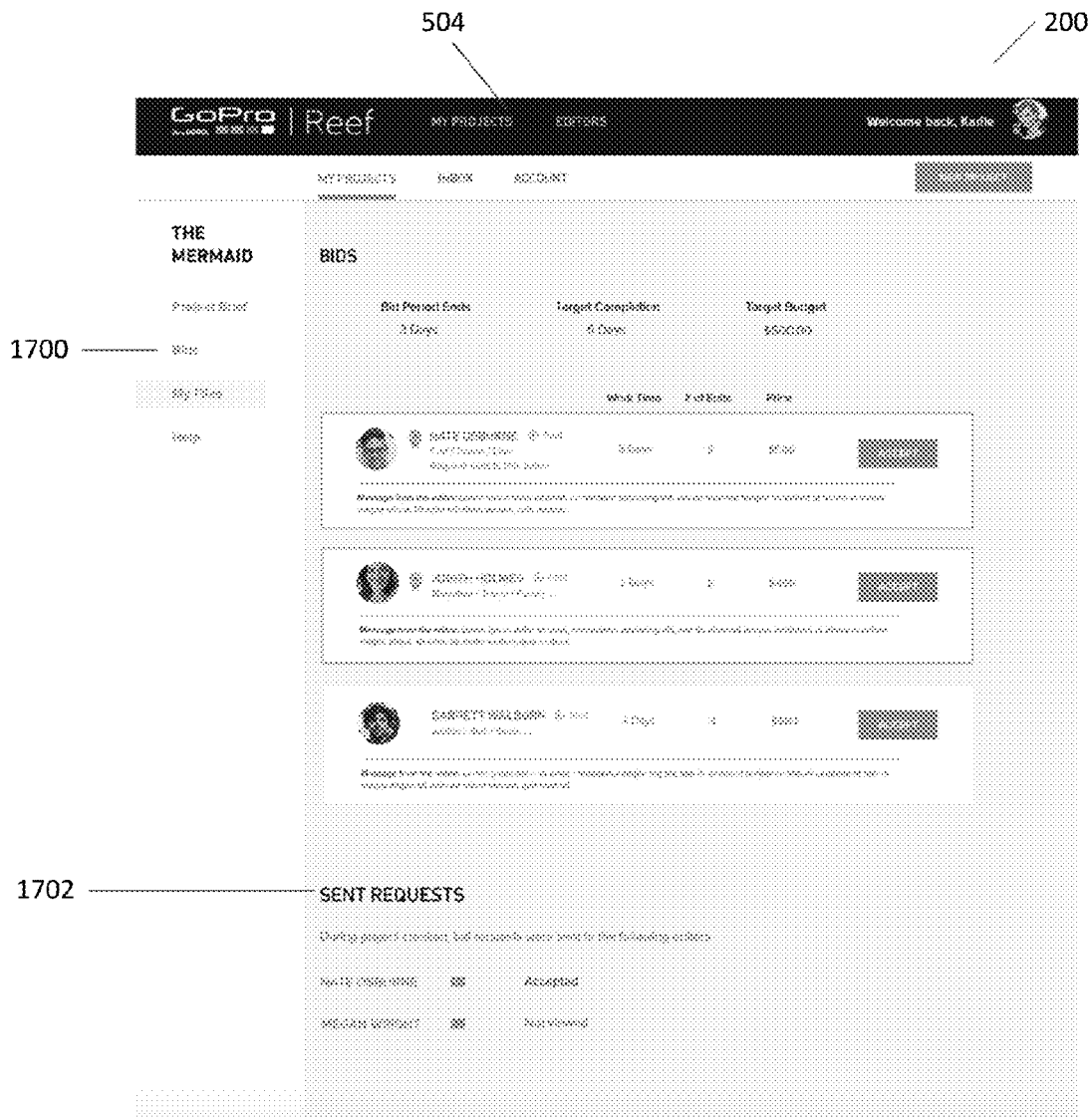

System 100 may be configured to effectuate presentation of received bids for a project (e.g., digital media content) of an end user and/or content capture user via received bids page 1700 of FIG. 17. Received bids page 1700 may include any bids received for the digital media content (e.g., the project) from post-capture users to edit the digital media content (e.g., the project) and/or individual bid requests that the end user and/or the content capture user sent to individual post-capture users (e.g., sent requests 1702). System 100 may be configured to allow for the end user and/or the content capture user to view and/or accept any received bid via received bids page 1700.

Figure 18A:
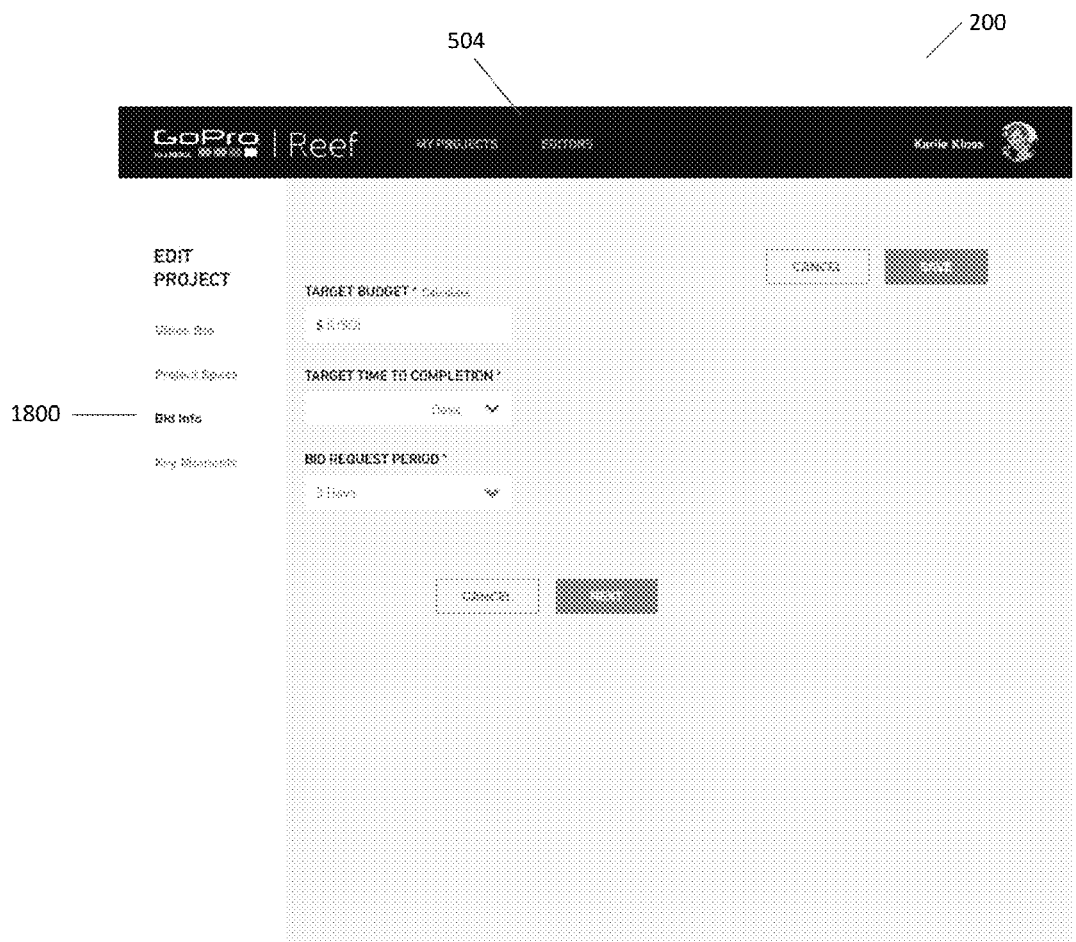
FIGS. 18A-18B illustrate exemplary depictions of a user interface of a content editing marketplace, in accordance with one or more implementations.

System 100 may be configured to receive edits to the project from the end user and/or the content capture user. Referring to FIG. 18A, system 100 may be configured to effectuate presentation of edit bid page 1800 within user interface 200. The end user and/or the content capture user may edit bid information associated with the project within edit bid page 1800. For example, system 100 may receive one or more of updated bid information (e.g., an updated target budget which may be calculated by system 100 and/or entered by the end user and/or the content capture user via one or more client computing platform(s) 104), an updated target time of completion, an updated bidding time period, and/or other information during which system 100 may be configured to accept bids from post-capture users for the project.

Figure 18B:
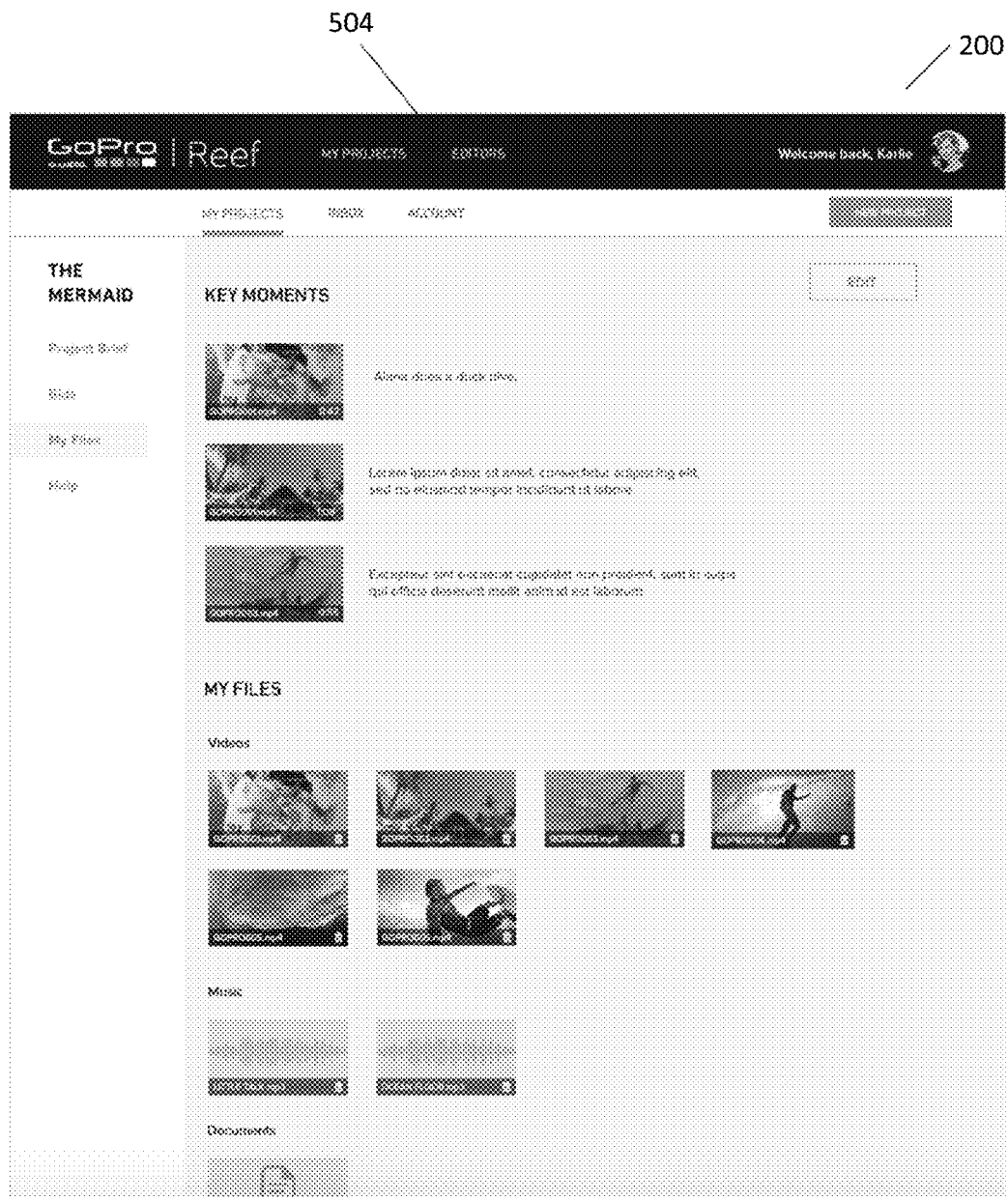

Referring to FIG. 18B, receiving edits to the project may include receiving edits to the one or more selected moments of interest, the digital media content (e.g., the raw digital media content files), music to be included within the edited versions of the digital media content, documentation, and/or other edits to the project.

Referring back to FIG. 1, system 100 may be configured to receive a selection of one of the post-capture users from the set of post-capture users to create the edited version of the digital media content. In response to the selection, system 100 may be configured to facilitate a payment associated with creation of the edited version of the digital media content. The payment may include payment of services (e.g., the bid associated with the project upon acceptance and/or selection of the post-capture user) to the post-capture user to edit the digital media content and/or payment of shipping the raw digital media content from the end user, the content capture user to the post-capture user, and/or other payments. System 100 may be configured to facilitate and/or process the payment based upon the payment method and/or payment-related information received via FIG. 7F, as discussed above.

In response to the payment, system 100 may be configured to generate a shipping label for shipment of the digital media content from the origin address associated with the end user and/or the content capture user to the destination address associated with the selected post-capture user. System 100 may be configured to obtain the destination address associated with the selected post-capture user via the stored user information discussed above and include it within the shipping label.

Figure 19A:
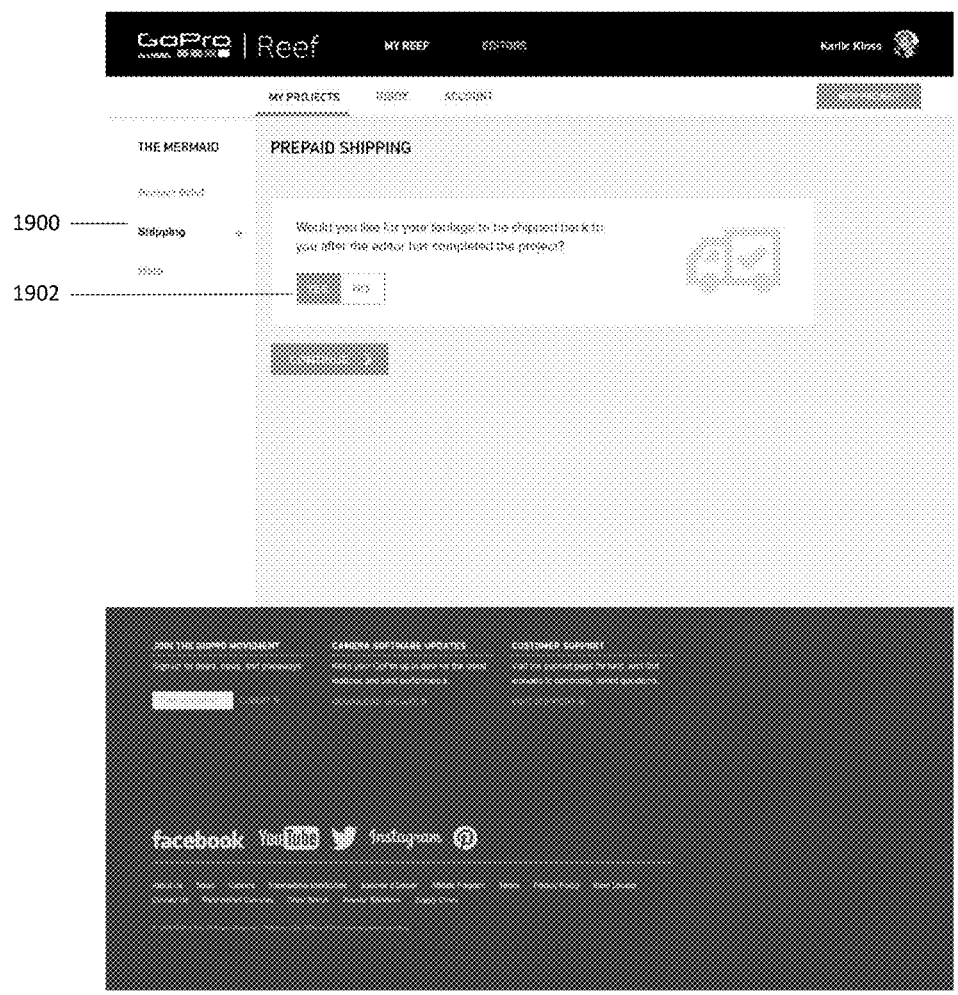
FIGS. 19A-19F illustrate exemplary depictions of a user interface of a content editing marketplace, in accordance with one or more implementations.
Figure 19B:
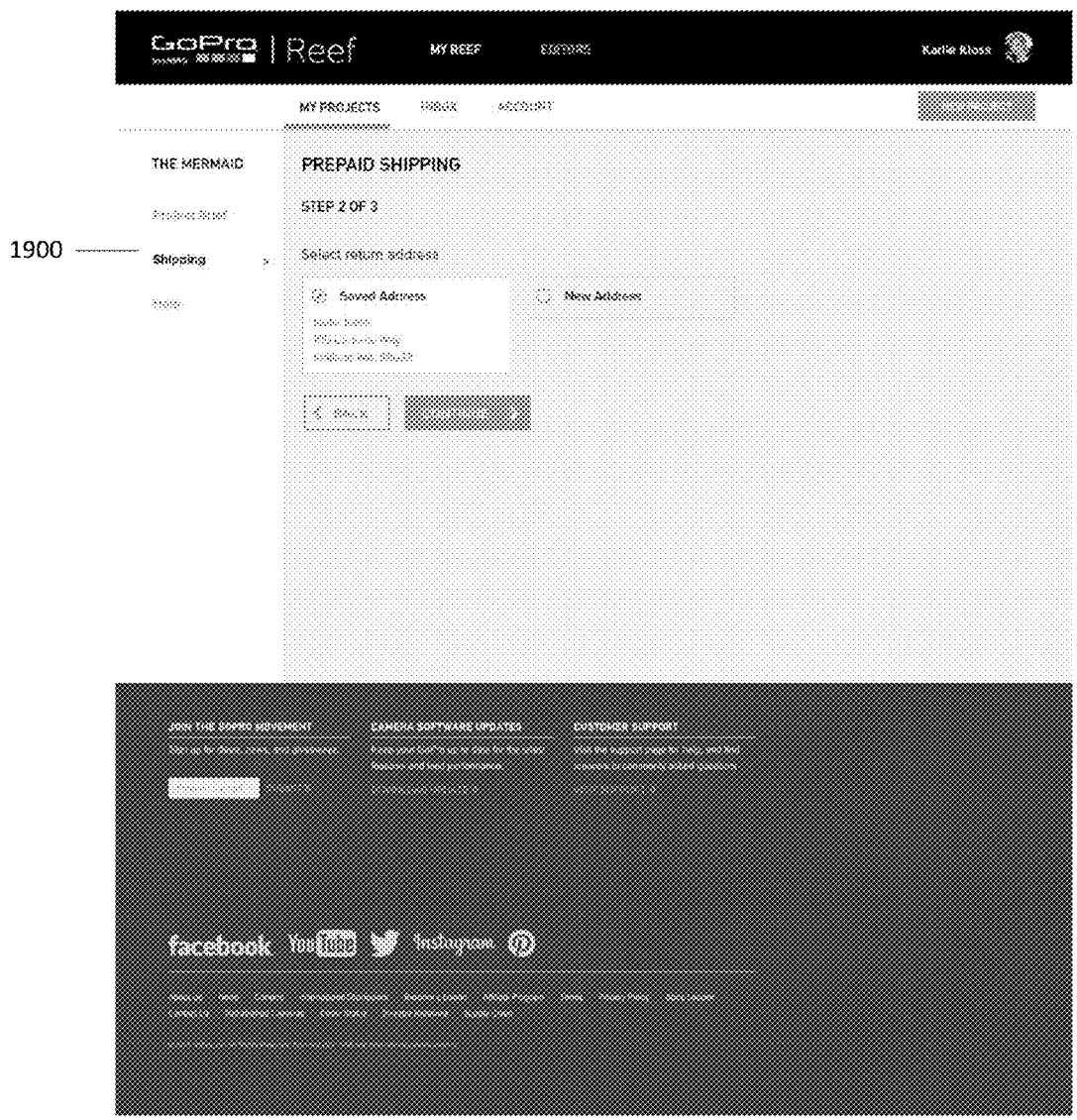
Figure 19C:
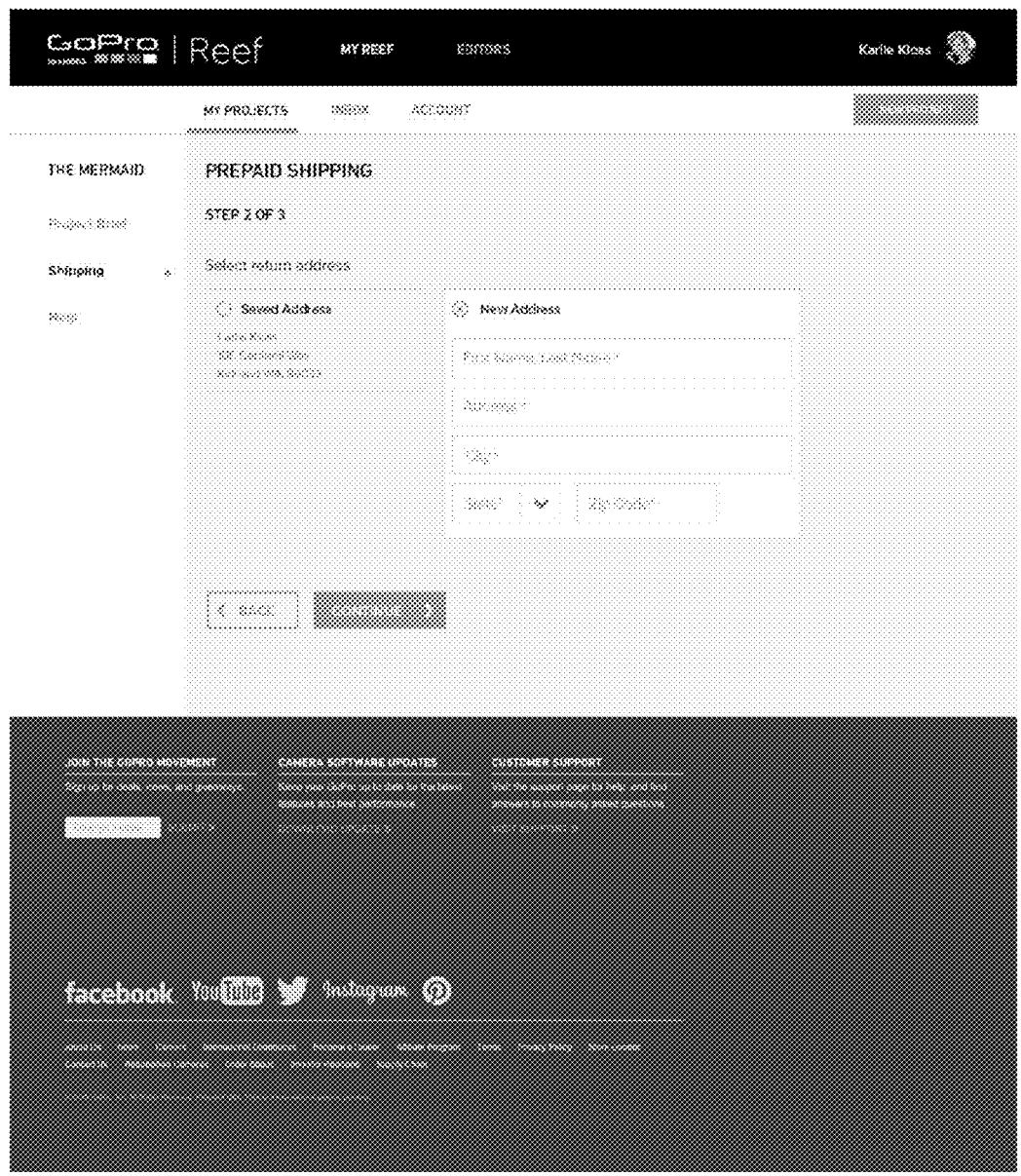

In some embodiments, system 100 may be configured to provide a return shipping option to the end user and/or the content capture user for shipment of the edited version of the digital media content from the selected post-capture user to the end user and/or the content capture user. Referring to FIGS. 19A-19C, system 100 may be configured to effectuate presentation of shipping page 1900 within user interface 200. As shown in FIG. 19A, system 100 may be configured to effectuate presentation of the return shipping option within user interface 200. System 100 may be configured to receive a user selection via button 1902 to generate a return shipping label for shipment of the digital media content (the copy of the raw digital media content and/or the raw digital media content itself, whichever the end user and/or the post-capture user may have shipped to the selected post-capture user) from the selected post-capture user to the end user and/or the content capture user.

Referring to FIGS. 19B-19C, system 100 may obtain shipping information from one or more client computing platform(s) 104 associated with the end user and/or the content capture user. For example, the end user and/or the content capture user may provide a return shipping address to return the digital media content (the copy of the raw digital media content and/or the raw digital media content itself, whichever the end user and/or the post-capture user may have shipped to the selected post-capture user) and/or the edited version of the digital media content back to the end user and/or the content capture user from the post-capture user. The return shipping address may be the same as the origin address or the return shipping address may be different than the origin address). If different, the return shipping address may be stored for later use. The return shipping label may include the return shipping address (e.g., the origin address or other return shipping address provided by the end user and/or the content capture user). Payment for return shipping may be included within the payment discussed above and/or may be a separate payment. If separate, system 100 may be configured to facilitate and/or process payment for the return shipping.

Figure 19D:
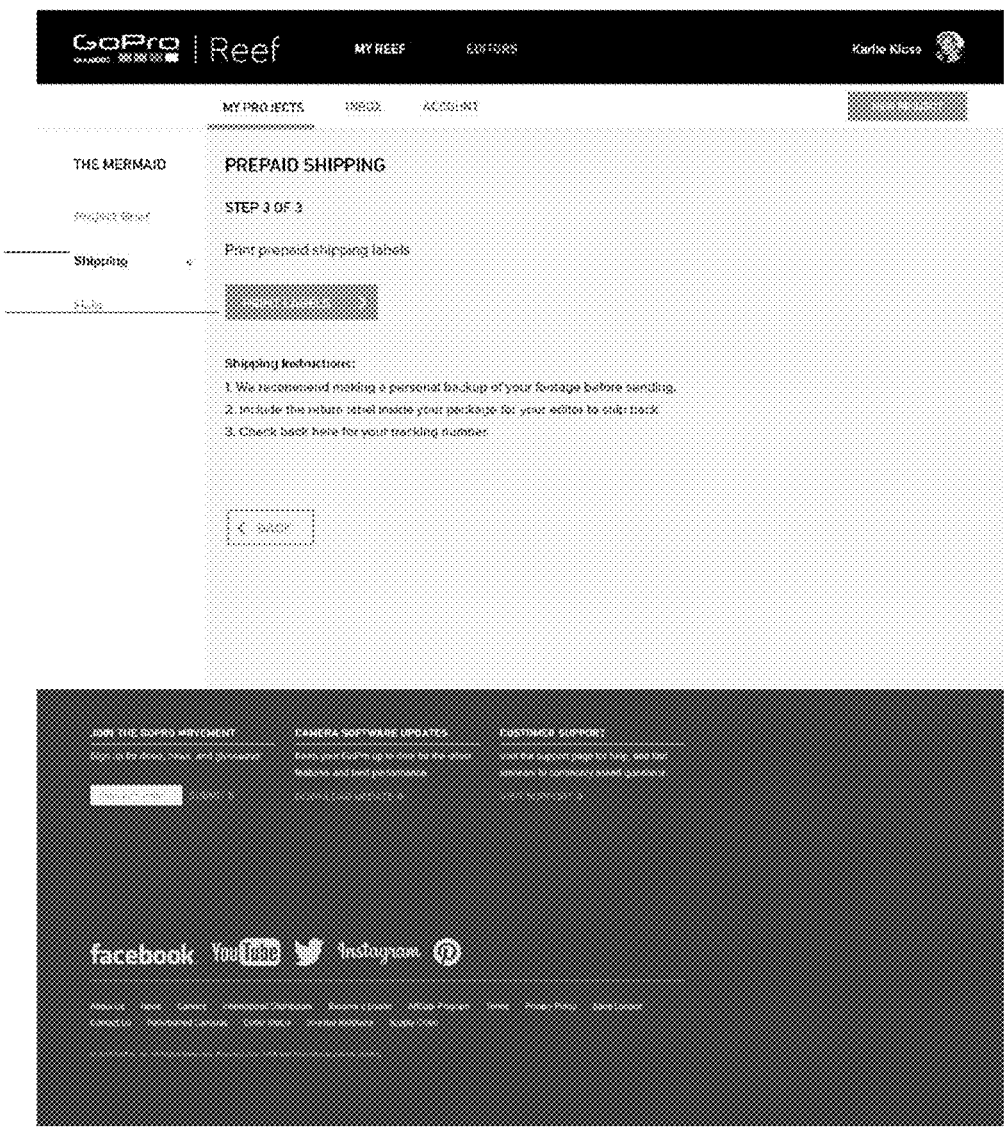

Generating the shipping label for shipment of the digital media content may include generating an image for the shipping label. System 100 may be configured to effectuate presentation of the image of the shipping label for shipment of the digital media content. System 100 may be configured to provide a print option to allow the end user and/or the content capture user to print the image of the shipping label. Referring to FIG. 19D, the end user and/or the content capture user may print the shipping label from shipping page 1900 by activation of "PRINT LABELS" button 1904 via one or more client computing platform(s) 104. The end user and/or the content capture user may use the printed shipping label to place on a package including the raw digital media content (a copy of the raw digital media content or the raw digital media content itself), such that a postal service may deliver the package to the destination address.

In a similar manner as discussed above, generating the return shipping label for shipment of the edited version of the digital media content may include generating an image for the return shipping label. System 100 may be configured to effectuate presentation of the image of the return shipping label for shipment of the edited version of the digital media content. System 100 may be configured to provide a print option to allow the end user and/or the content capture user to print the image of the return shipping label. As discussed in reference to FIG. 19D, the end user and/or the content capture user may print the return shipping label from shipping page 1900 by activation of "PRINT LABELS" button 1904 via one or more client computing platform(s) 104. The end user and/or the content capture user may use the printed return shipping label to place into the package including the raw digital media content (a copy of the raw digital media content or the raw digital media content itself), such that the selected post-capture user may include the return shipping label on a package including the digital media content (a copy of the raw digital media content or the raw digital media content itself) and/or the edited version of the digital media content, such that a postal service may deliver the package to the return shipping address.

Figure 19E:
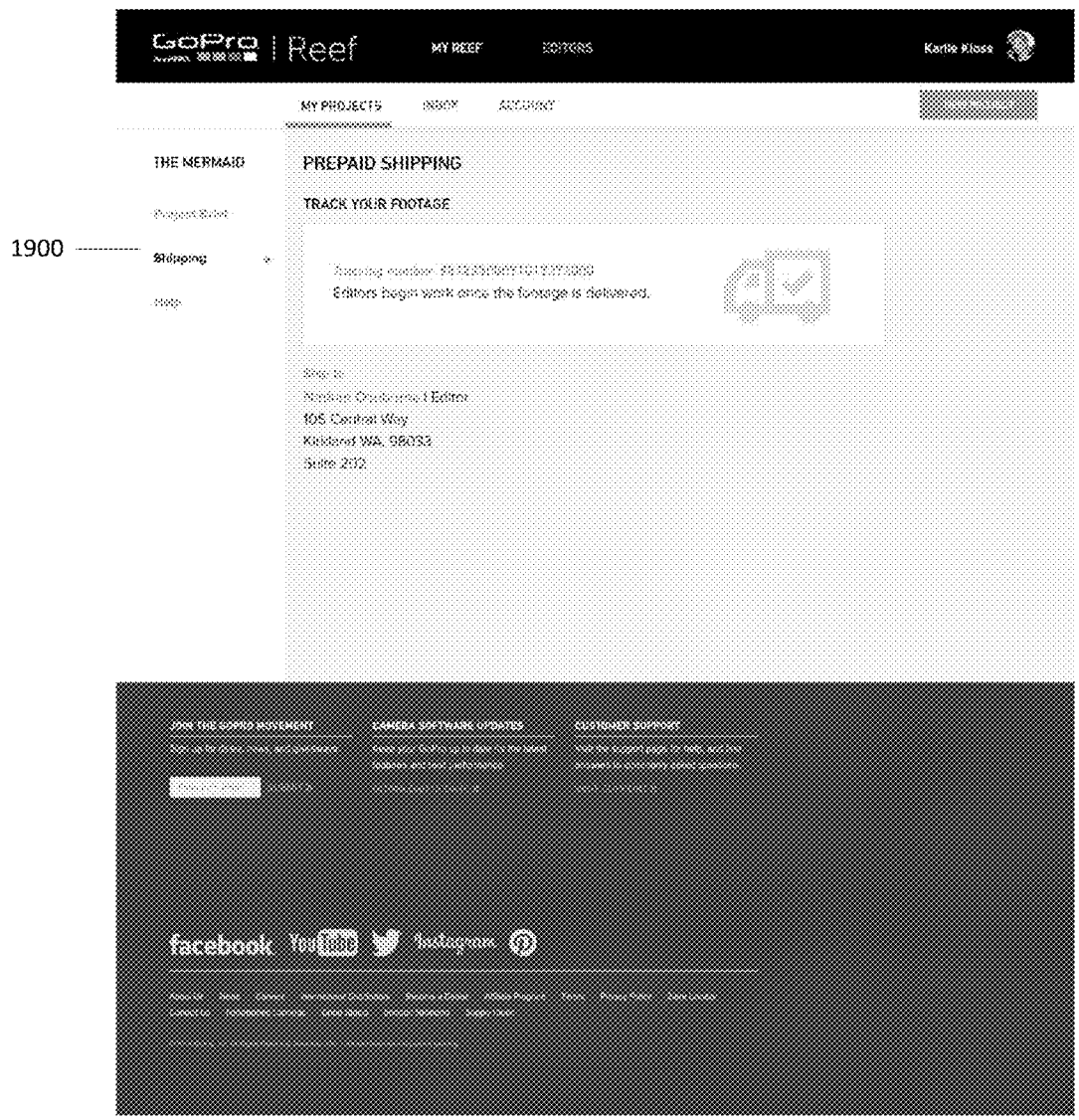
Figure 19F:
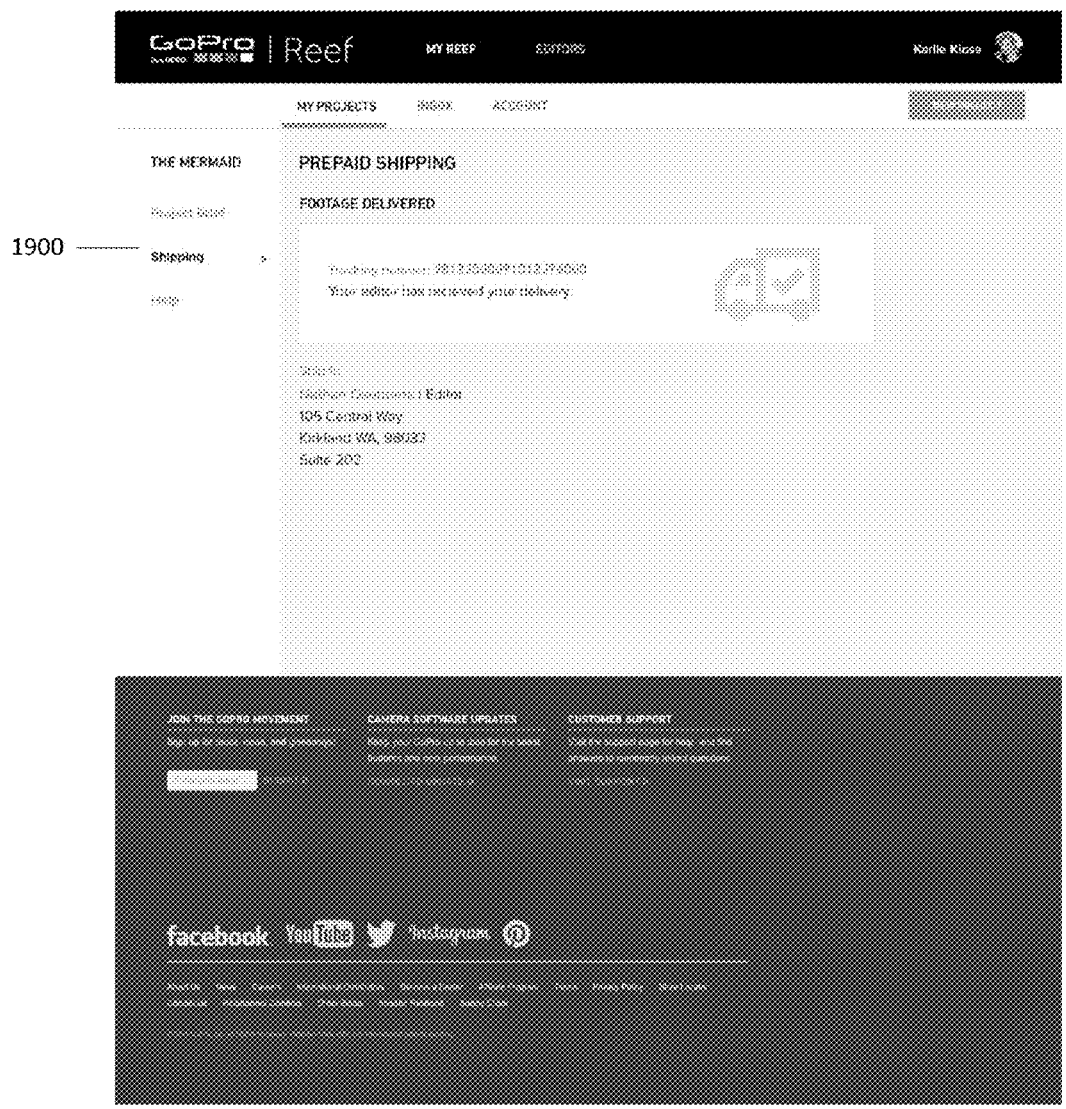

Referring to FIGS. 19E-19F, system 100 may be configured to provide a tracking number to the end user and/or the content capture user to track shipment of the digital media content to the post-capture user. For example, as shown in FIG. 19E, system 100 may be configured to effectuate presentation of the tracking number associated with the shipping label. System 100 may be configured to provide an update (e.g., via FIG. 19F) when the post-capture user has received the digital media content from the end user and/or the content capture user. In this manner, the end user and/or the content capture user may track shipment of the digital media content to the selected post-capture user.

In a similar manner as discussed above, system 100 may be configured to provide a tracking number to the end user and/or the content capture user to track shipment of the edited version of the digital media content to the post-capture user. System 100 may be configured to effectuate presentation of the tracking number associated with the return shipping label. System 100 may be configured to provide an update when the post-capture user has sent the edited version of the digital media content to the end user and/or the content capture user. In this manner, the end user and/or the content capture user may track shipment of the edited version of the digital media content to the end user and/or the content capture user.

Figure 20A:
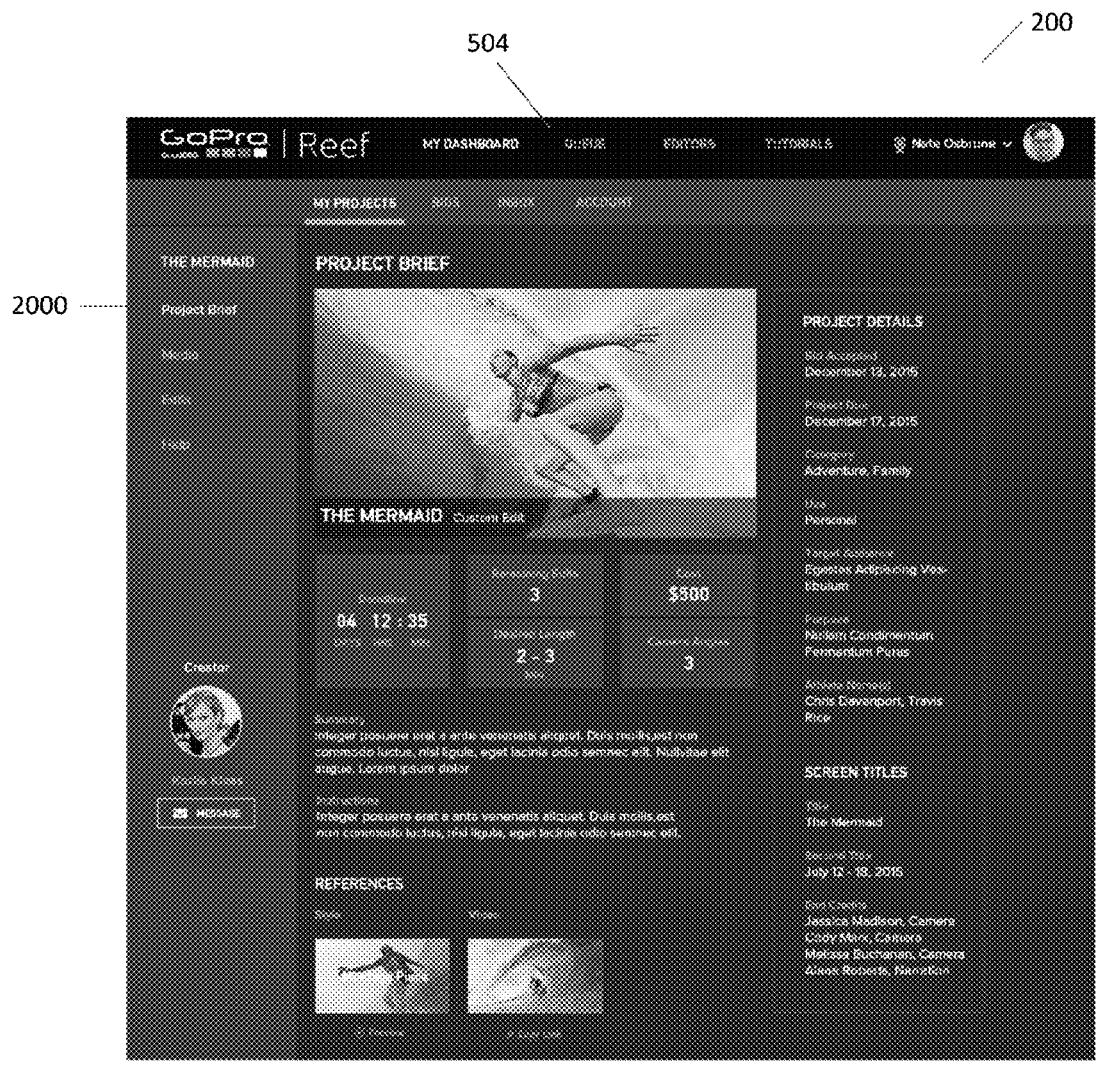
FIGS. 20A-20C illustrate exemplary depictions of a user interface of a content editing marketplace, in accordance with one or more implementations.
Figure 20B:
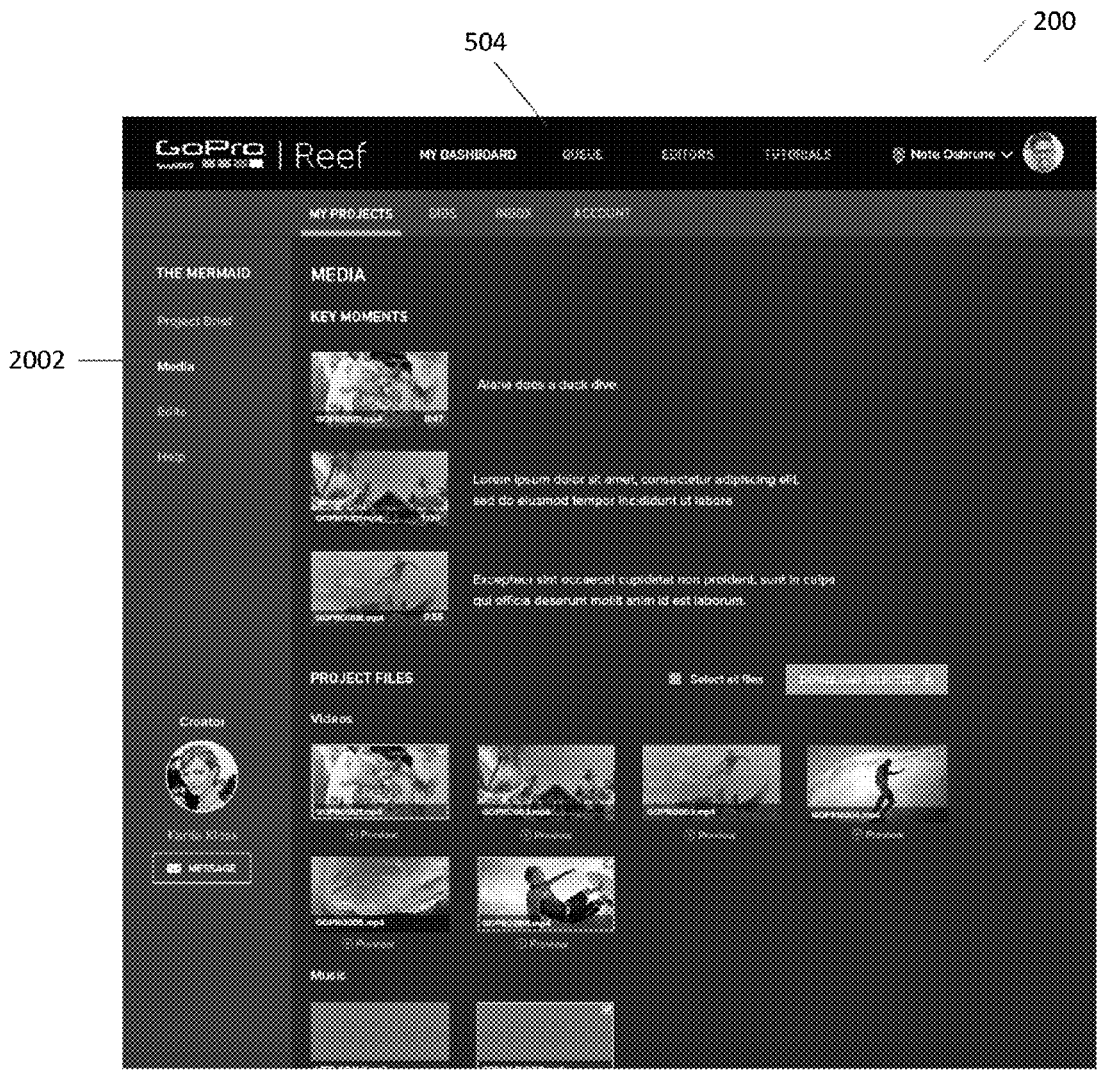
Figure 20C:
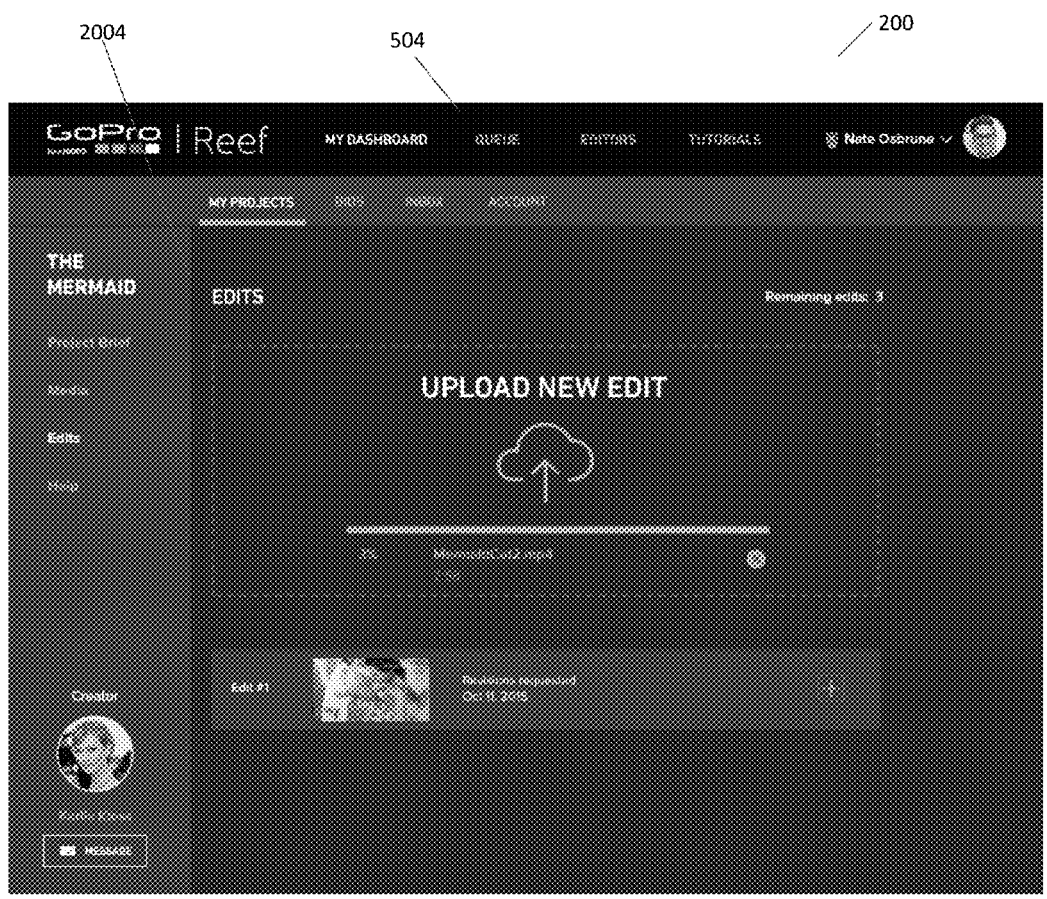

Referring to FIGS. 20A-20C, system 100, for example, may be configured to receive the selection of Nate Osbrune as the post-capture user to create the edited version of the digital media content. As shown in FIG. 20A, system 100 may be configured to effectuate presentation of project brief page 2000. Project brief page 2000 may include values of the contextual parameters of the digital media content and/or the editing parameters for creating the edited version of the digital media content for the selected post-capture user (e.g., Nate Osbrune) to view. For example, project brief page 2000 may include project details. The project details may include when the bid was accepted, when the edited version of the digital media content is due, one or more categories associated with the project, what the edited version of the digital media content may be used for, the target audience, individuals captured and/or included within the digital media content, screen titles, a summary of the project, one or more samples of targeted edited content for the edited version of the digital media content, the completion date, a number of remaining edits to the digital media content, the budgets, the number of camera angles included within the digital media content, and/or other project details. Project brief page 2000 may be used as a reference for the project by the post-capture user.

As shown in FIG. 20B, system 100 may effectuate presentation of media file page 2002. Media file page 2002 may include the one or more selected moments of interest to include within the edited version of the digital media content, the raw digital media content files (if the raw digital media content files were not mailed directly to the selected post-capture user via a postal service), and/or other media file information associated with the project. The selected post-capture user may preview the raw digital media content files within media file page 2002 and/or may download the raw digital media content files (e.g., which may be stored within electronic storage 122 of FIG. 1) from media file page 2002.

Once the post-capture user has completed one or more edits to the digital media content, the post-capture user may upload a first round of one or more edits to the content editing marketplace via edits page 2004 of FIG. 20C. System 100 may be configured to receive the first round of one or more edits uploaded via edits page 2004. System 100 may be configured to effectuate presentation of the number of edits remaining on the project within edits page 2004. While more rounds of edits may occur, the first round of edits may be the edited version of the digital media content.

System 100 may be configured to obtain, via a second client computing platform associated with the selected post-capture user, a portion of the edited version of the digital media content. The portion of the edited version of the digital media content may have an edited time duration. The edited time duration of the portion of the edited version of the digital media content may be less than a time duration of the edited version of the digital media content or may be equal to the time duration of the edited version of the digital media content. In this manner, the post-capture user may upload the portion of the edited version of the digital media content to the content editing marketplace via one or more client computing platform(s) 104.

Upon receiving the portion of the edited version of the digital media content, system 100 may be configured to effectuate transmission of the portion of the edited version of the digital media content to client computing platform 104 associated with the post-capture user for presentation. The post-capture user may consume the portion of the edited version of the digital media content that was uploaded to the content editing marketplace. As the post-capture user consumes the portion of the edited version of the digital media content, system 100 may be configured to receive a selection of one or more edited moments of interest within the portion of the edited version of the digital media content. Individual edited moments of interest may correspond to individual points in time within the edited time duration of the portion of the edited version of the digital media content. Individual points in time may correspond to individual frames of the edited version of the digital media content.

System 100 may receive a selection from one or more client computing platform(s) 104 associated with the post-capture user of one or more edited moments of interest within the portion of the edited version of the digital media content. Individual edited moments of interest may correspond to individual points in time within the edited time duration of the portion of the edited version of the digital media content. System 100 may be configured to tag the edited moment of interest at the point in time during the edited time duration within the portion of the edited version of the digital media content. Tagging the edited moment of interest may include providing a highlight of the edited moment of interest during playback of the edited version of the digital media content. The tag may include an indication provided to one or more users to make the user(s) aware of the edited moment(s) of interest. The indication may include one or more of a visual indication, an audible indication, and/or other indications. The indication may be provided during playback of the edited version of the digital media content to make user(s) aware of the edited moment(s) of interest. If the edited version of the digital media content includes a spherical video segment, receiving one or more selected edited moments of interest may include receiving, from one or more client computing platforms 104 associated with the post-capture user, a selection of a field of view within the spherical video segment.

Receiving the one or more selected edited moments of interest may include receiving, from one or more client computing platforms 104 associated with the post-capture user, tag information associated with the one or more edited moments of interest. Individual edited moments of interest may include tag information. The tag information may include information regarding the editing of the edited version of the digital media content. For example, the post-capture user may provide information associated with a particular edited moment of interest to convey to the end user and/or the content capture user.

Figure 21A:
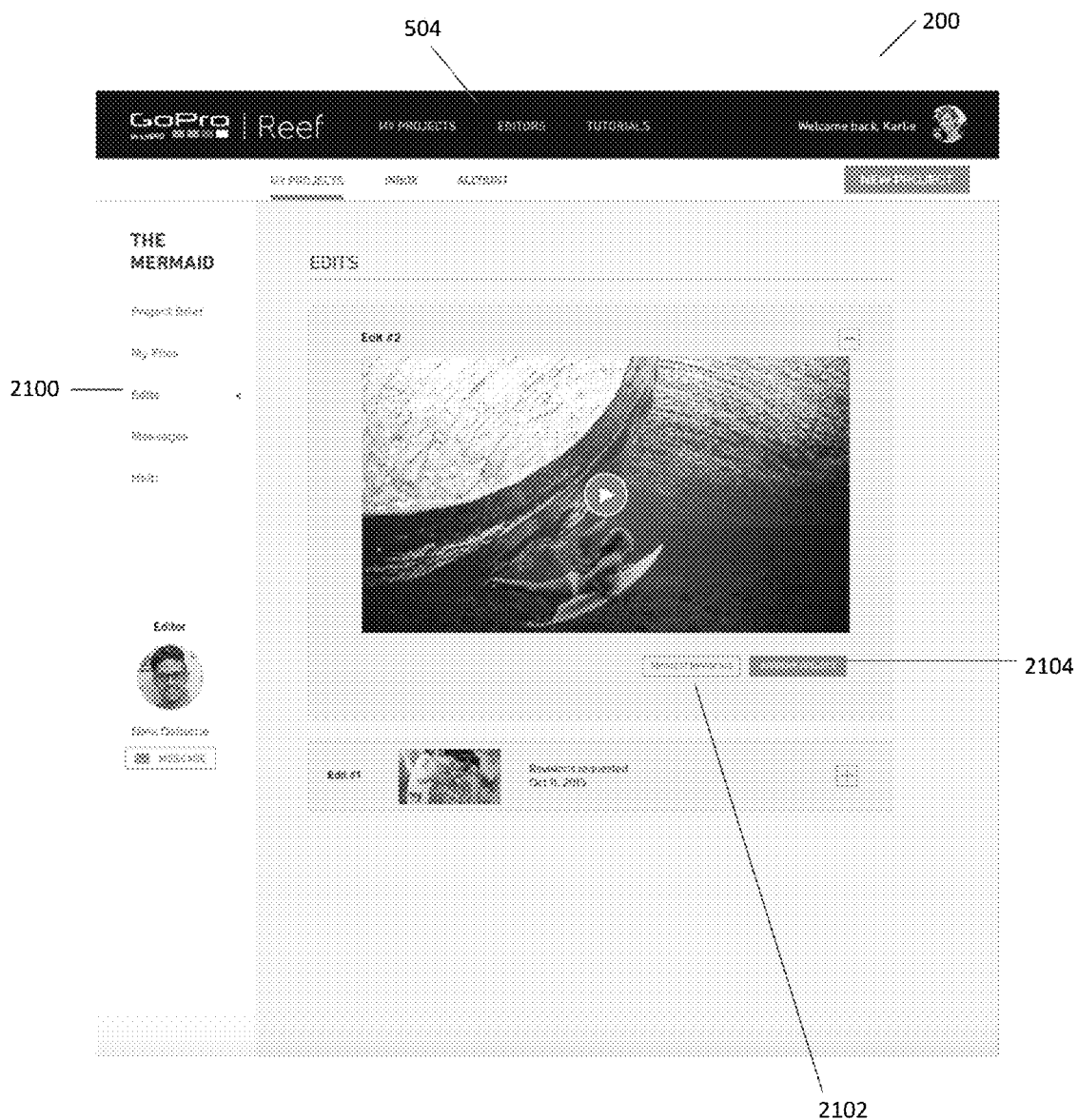
FIGS. 21A-21E illustrate exemplary depictions of a user interface of a content editing marketplace, in accordance with one or more implementations.

Referring to FIG. 21A, system 100 may be configured to effectuate presentation of received edits page 2100. Received edits page 2100 may include the first round of one or more edits to the content editing marketplace received via edits page 2004 of FIG. 20C. The end user and/or the content capture user may view the received edits from the post-capture user within received edits page 2100. The end user and/or the content capture user may request further revisions to the one or more received edits (e.g., via "REQUEST REVISIONS" button 2102) and/or may approve the project (e.g., via "APPROVE PROJECT" button 2104). As discussed above with reference to FIG. 6, the number of draft/revision rounds may be predetermined based upon the editing option chosen by the end user and/or the content capture user.

Figure 21B:
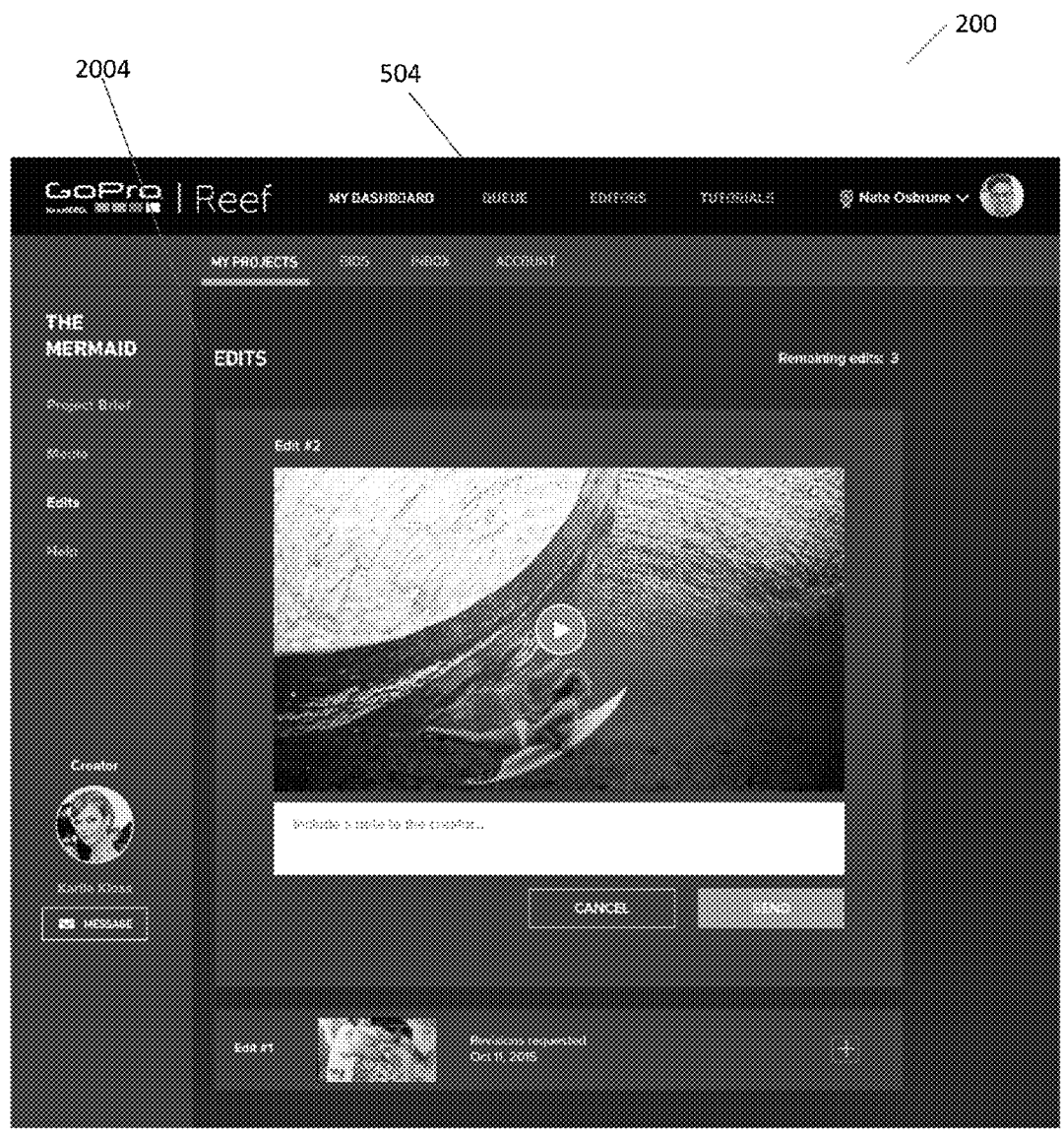

Referring to FIG. 21B, system 100 may be configured to effectuate presentation of a request by the end user and/or the content capture user to make further revisions to the digital media content (e.g., upon system 100 receiving activation of button 2102 of FIG. 21A). The request may be displayed within edits page 2004 of FIG. 21B, which may be similar to edits page 2004 of FIG. 20C. System 100 may be configured to receive a second round of one or more edits uploaded via edits page 2004 of FIG. 21B (e.g., system 100 may be configured to obtain the edited version of the digital media content). The post-capture user may include a message to the end user and/or the content capture user along with the second round of one or more edits. The end user and/or the content capture user and the post-capture user may communicate at any time through the communication mechanism available via system 100. System 100 may be configured to effectuate presentation of the number of edits remaining on the project within edits page 2004 of FIG. 21B.

Figure 21C:
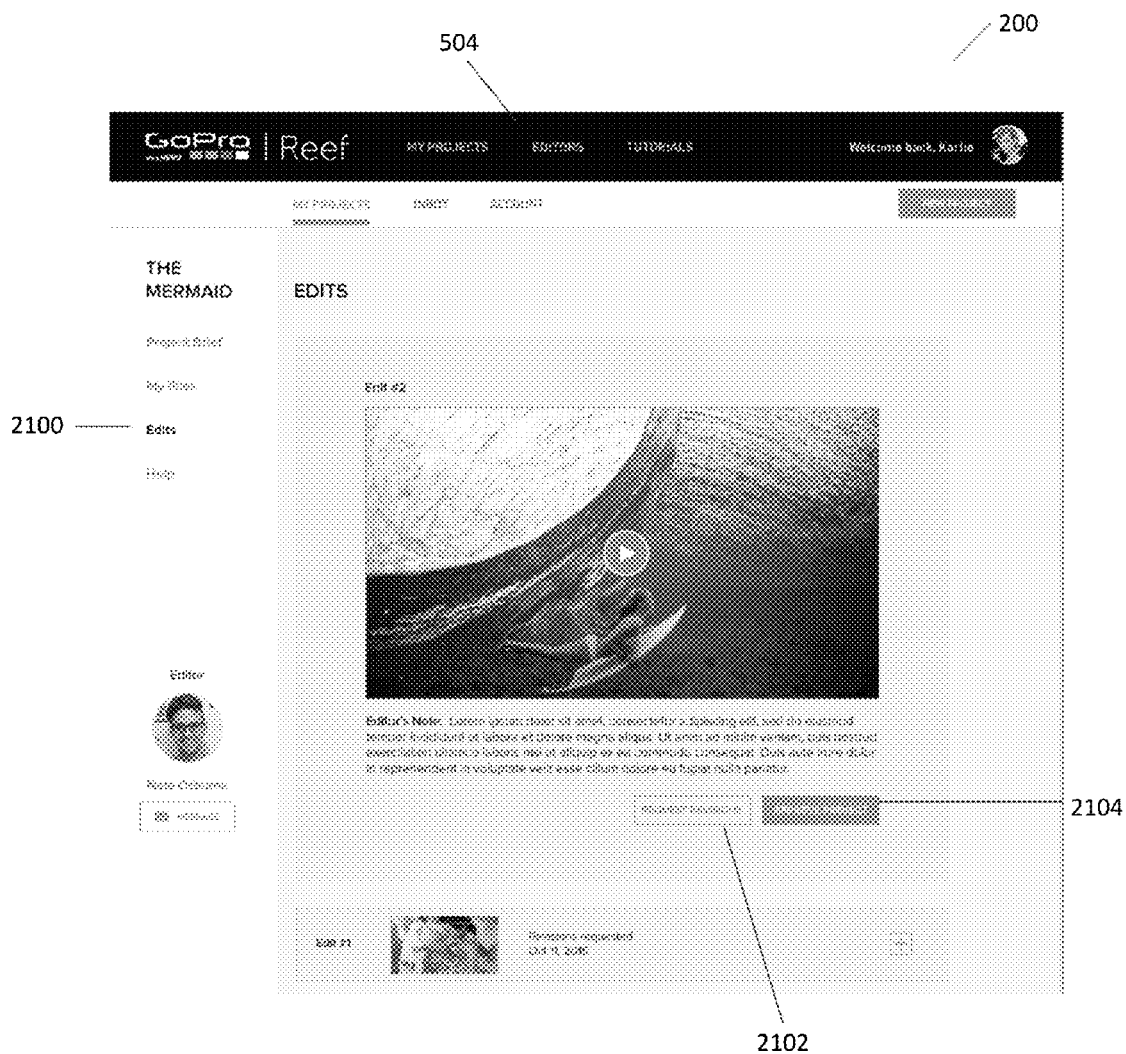

Referring to FIG. 21C, upon receiving the second round of one or more edits to the digital media content, system 100 may be configured to effectuate presentation of received edits page 2100 (e.g., system 100 may be configured to effectuate transmission of the edited version of the digital media content to one or more client computing platform(s) 104 associated with the end user and/or the content capture user). Received edits page 2100 may include the first and/or second rounds of one or more edits to the content editing marketplace received via edits page 2004 of FIG. 21B. The end user and/or the content capture user may view the second round of received edits from the post-capture user within received edits page 2100 of FIG. 21C. Received edits page 2100 of FIG. 21C may be similar to received edits page 2100 of FIG. 21A. The end user and/or the content capture user may request further revisions to the one or more received edits (e.g., via "REQUEST REVISIONS" button 2102) and/or may approve the project (e.g., via "APPROVE PROJECT" button 2104).

Figure 21D:
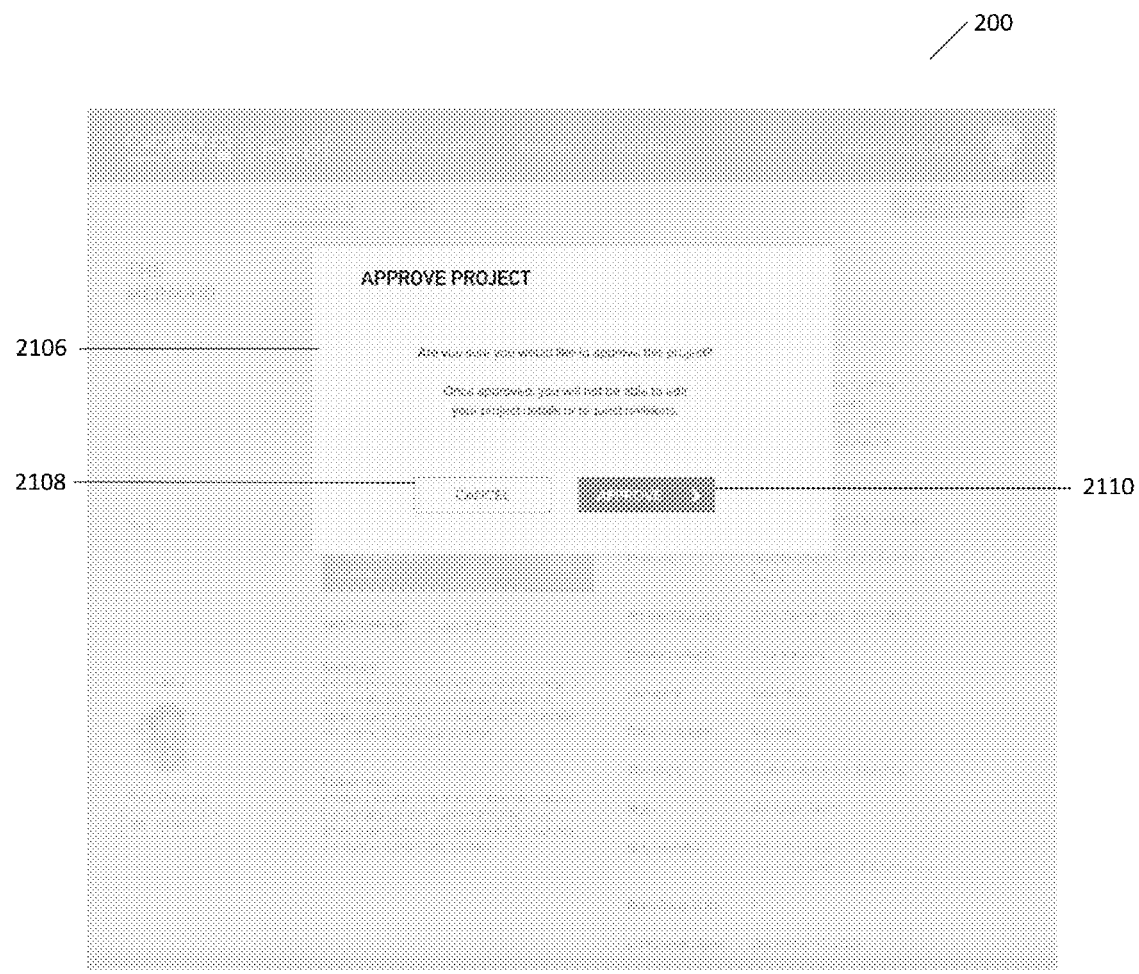

Referring to FIG. 21D, if system 100 receives activation of button 2104 from one or more client computing platform(s) 104, system 100 may be configured to effectuate presentation of approval pop-up 2106 within user interface 200. System 100 may be configured to prompt the end user and/or the content capture user to confirm approval of the edited version of the digital media content via approval pop-up 2106. Approval pop-up 2106 may include "CANCEL" button 2108 and "APPROVE" button 2110.

Figure 21E:
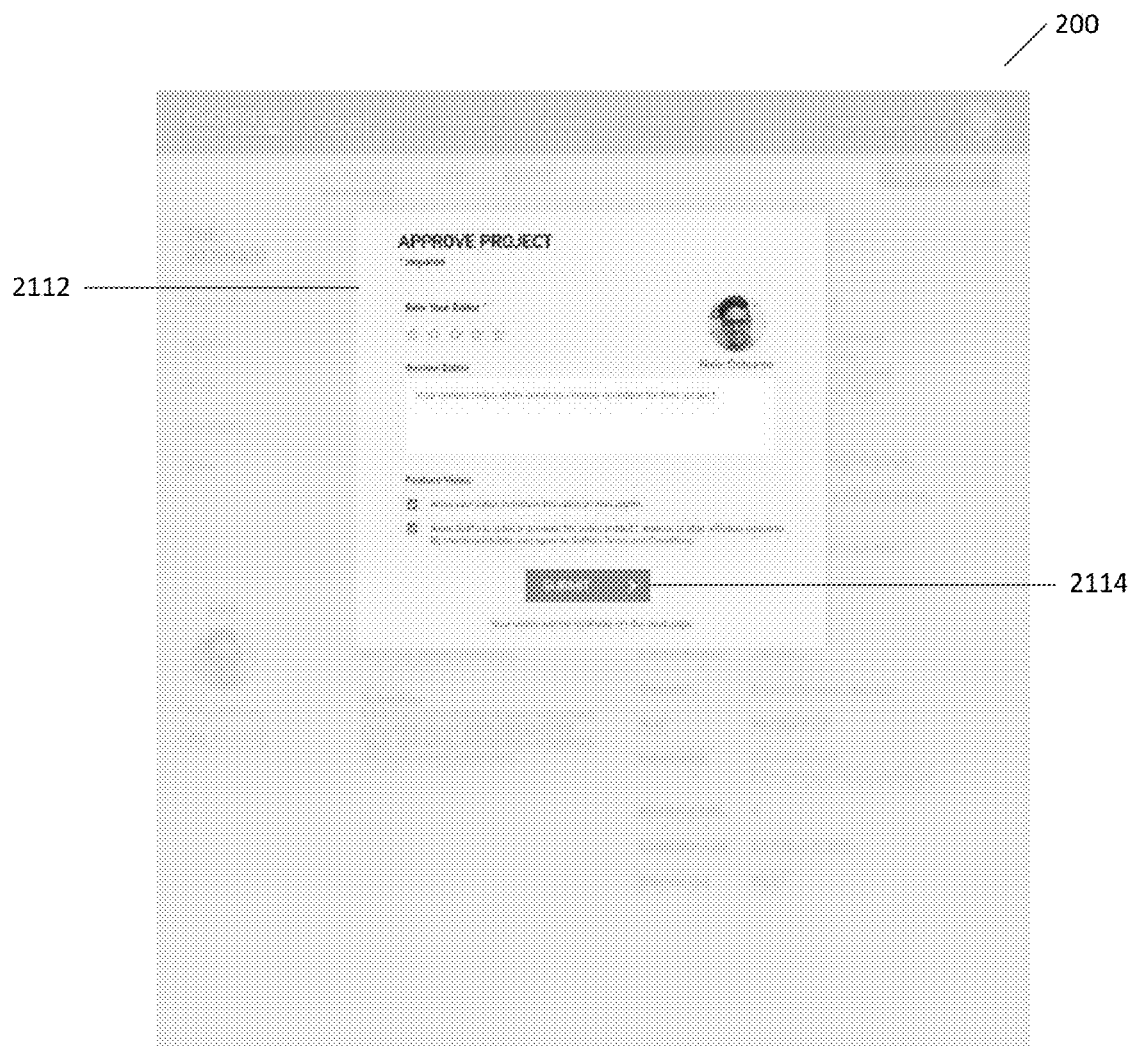

Referring to FIG. 21E, if system 100 receives activation of button 2110 from one or more client computing platform(s) 104, system 100 may be configured to effectuate presentation of feedback pop-up 2112 within user interface 200. System 100 may be configured to prompt the end user and/or the content capture user to rate the post-capture user based upon the edited version of the digital media content via feedback pop-up 2112. For example, the end user and/or the content capture user may rate the post-capture user (e.g., the editor) via a rating system (e.g., selecting one or more stars), write a review and/or comment, allow the edited version of the digital media content to be available for viewing within the digital media marketplace, and/or other feedback may be provided via feedback pop-up 2112. Information provided via feedback pop-up 2112 may be stored (e.g., within electronic storage 122 of FIG. 1) and/or may be used for the feedback information, as discussed above. Feedback pop-up 2112 may include "SUBMIT" button 2114.

Figure 22:
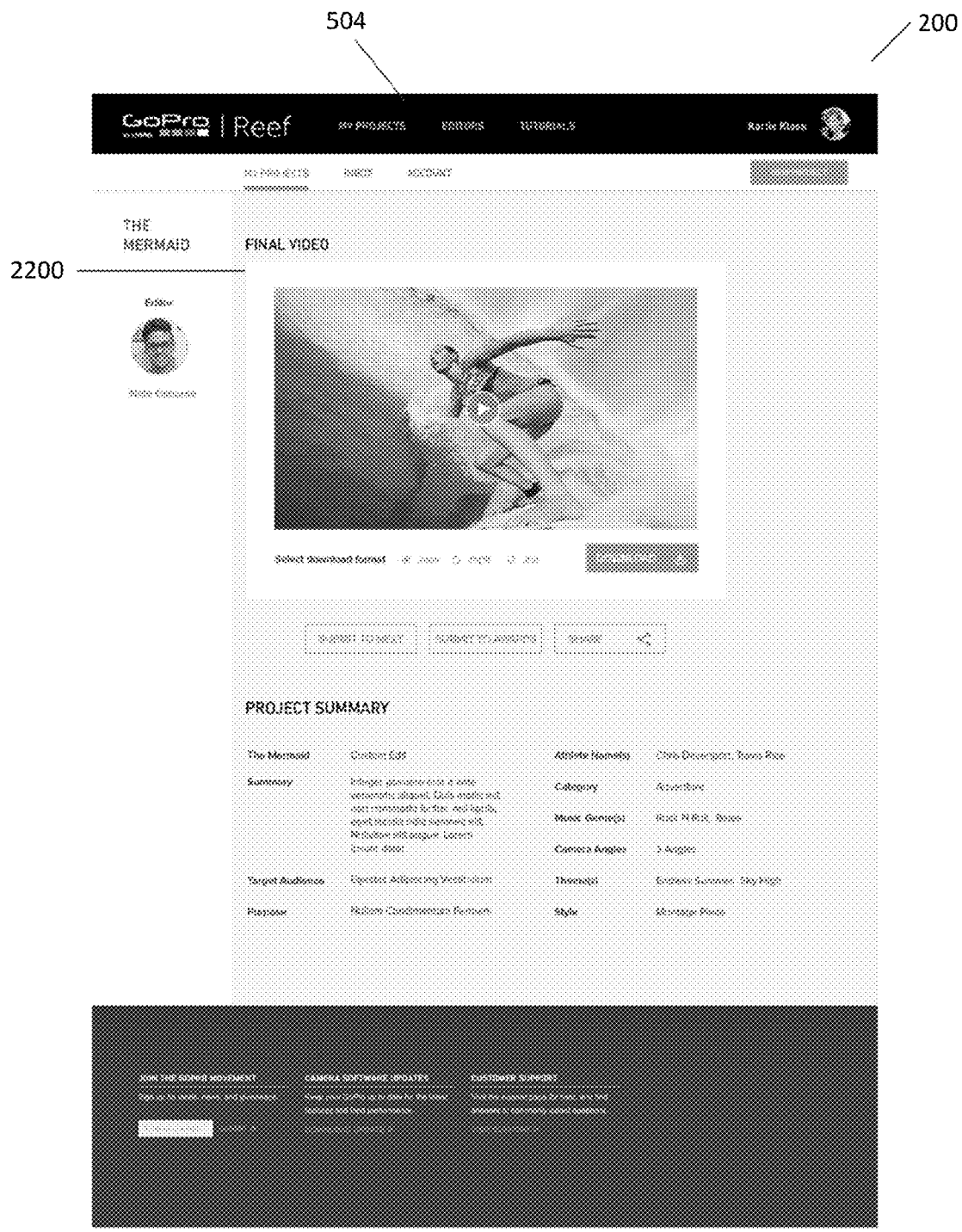
FIG. 22 illustrates an exemplary depiction of a user interface of a content editing marketplace, in accordance with one or more implementations.

Referring to FIG. 22, if system 100 receives activation of button 2114, system 100 may be configured to effectuate presentation of a final video via final video page 2200. Final video page 2200 may include the edited version of the digital media content (e.g., the final video) for viewing by the end user and/or the content capture user. The end user and/or the content capture user may share and/or download the final video (e.g., the final video may be stored within electronic storage 122 of FIG. 1) from final video page 2200. The end user and/or the content capture user may share the final video to the content editing marketplace so that other users of the content editing marketplace may view the final video. System 100 may be configured to effectuate presentation of the final video within the end user profile and/or the content capture user profile, the post-capture user profile, and/or within other areas/pages of the content editing marketplace.

Figure 23A:
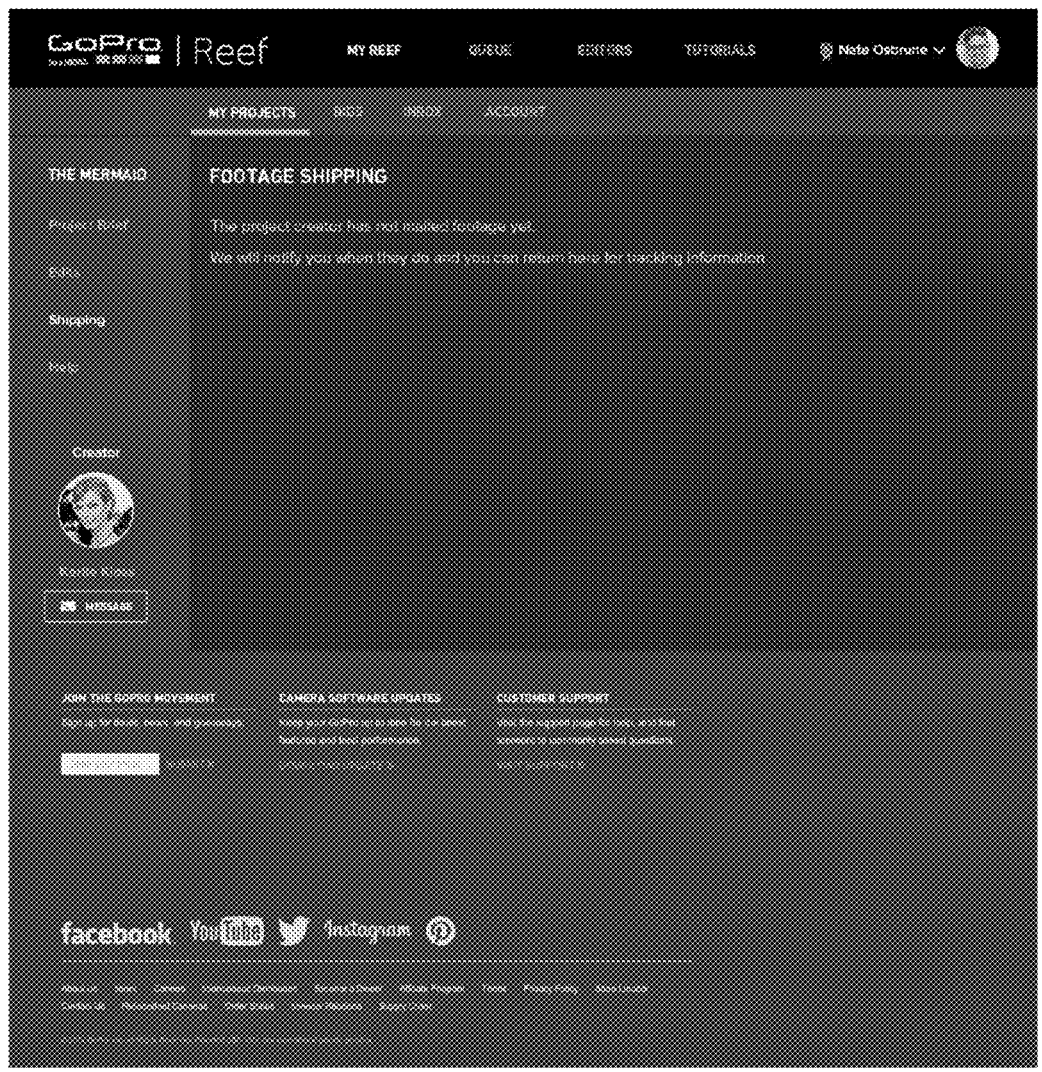
FIGS. 23A-23C illustrate exemplary depictions of a user interface of a content editing marketplace, in accordance with one or more implementations.
Figure 23B:
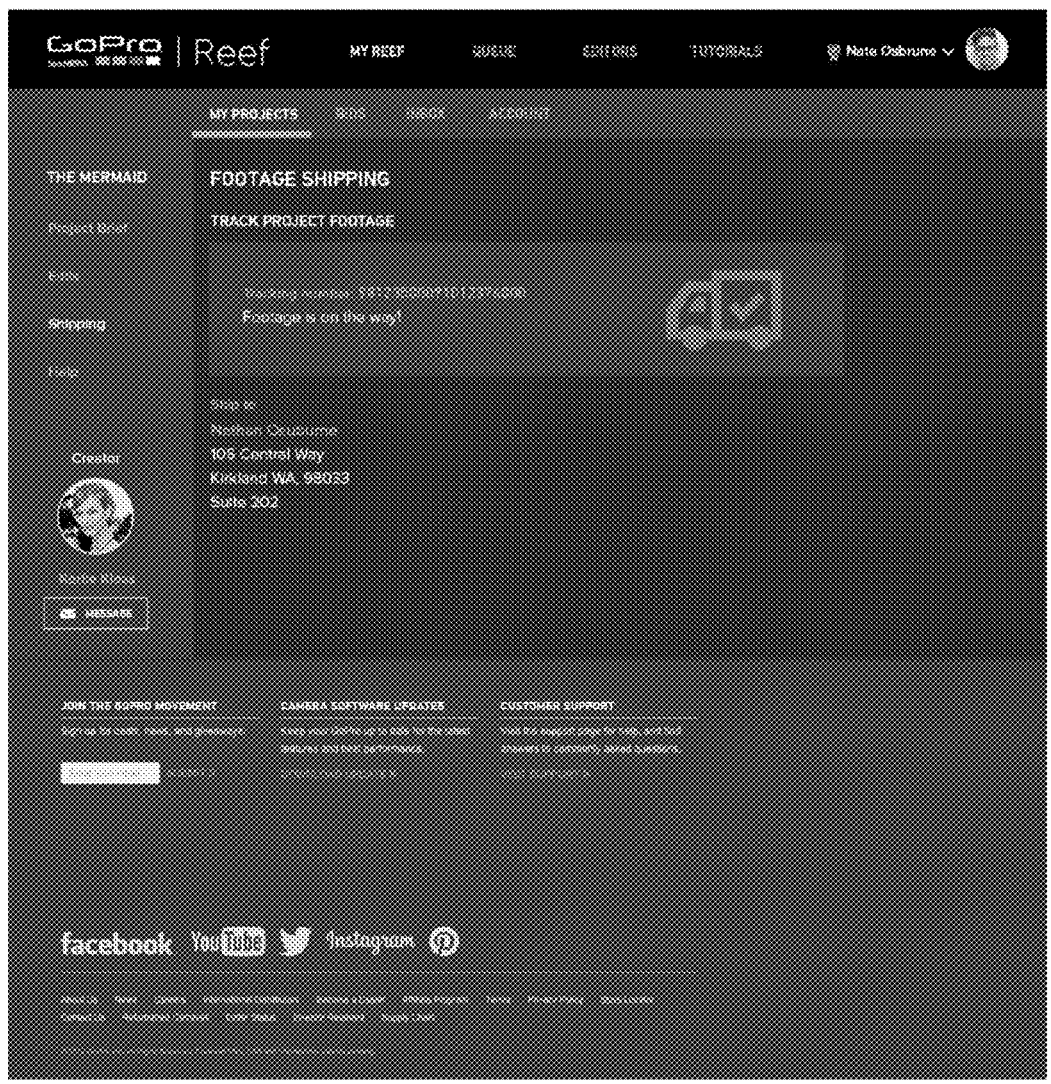
Figure 23C:
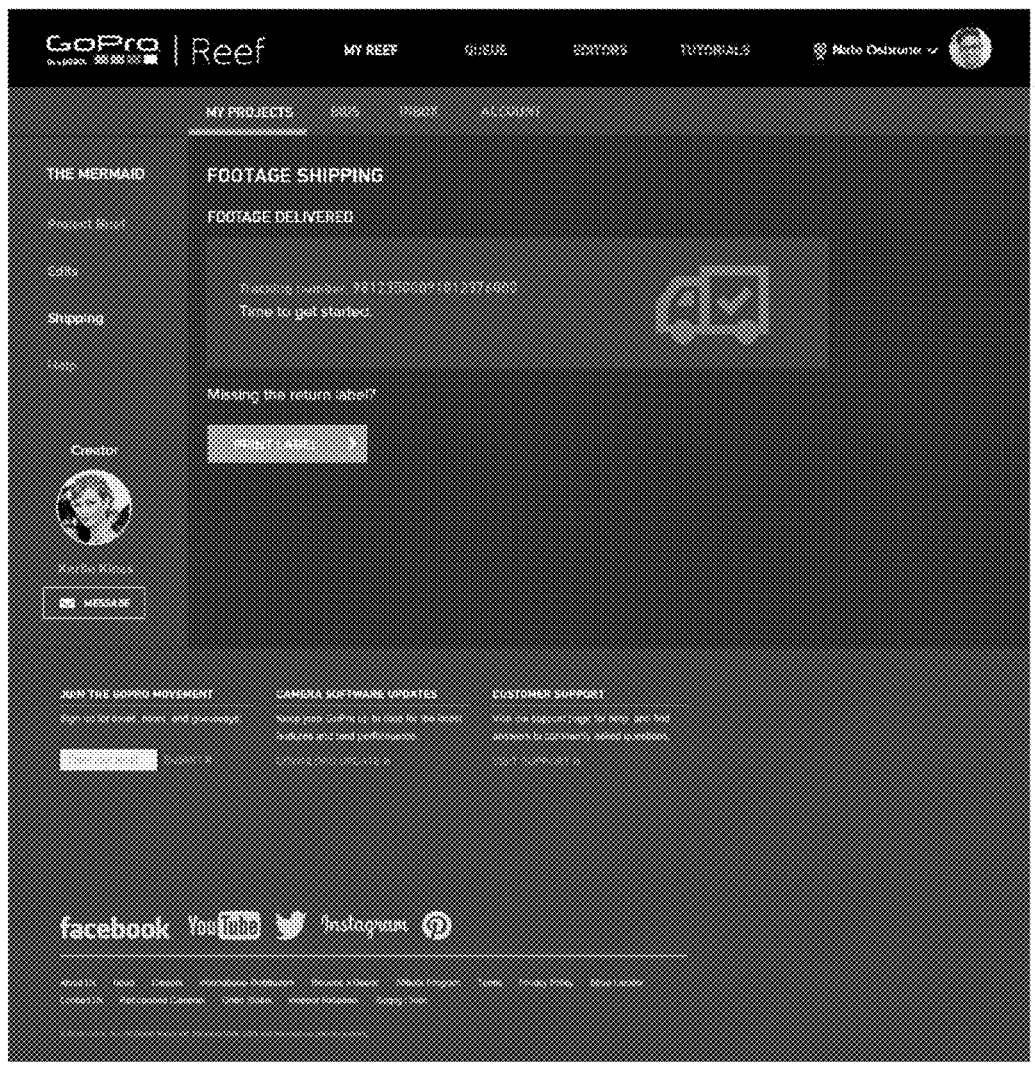

Referring to FIGS. 23A-23C, system 100 may be configured to provide an update with regards to shipment of the digital media content from the end user and/or the content capture user to the selected post-capture user. For example, as shown in FIG. 23A, system 100 may be configured to effectuate presentation of an update and/or notification as to whether the end user and/or the content capture user has shipped the digital media content to the post-capture user yet. As shown in FIGS. 23B-23C, system 100 may similarly notify the post-capture user when the digital media content has been shipped and/or when the digital media content has been delivered. System 100 may be configured to effectuate presentation of the tracking number associated with the shipping label to the post-capture user such that the post-capture user may track when the package including the digital media content may be expected to arrive. As shown in FIG. 23C, if the return shipping label was not included within the package received by the post-capture user, system 100 may be configured to provide an option for the post-capture user to print the image of the return shipping label.

Figure 24:
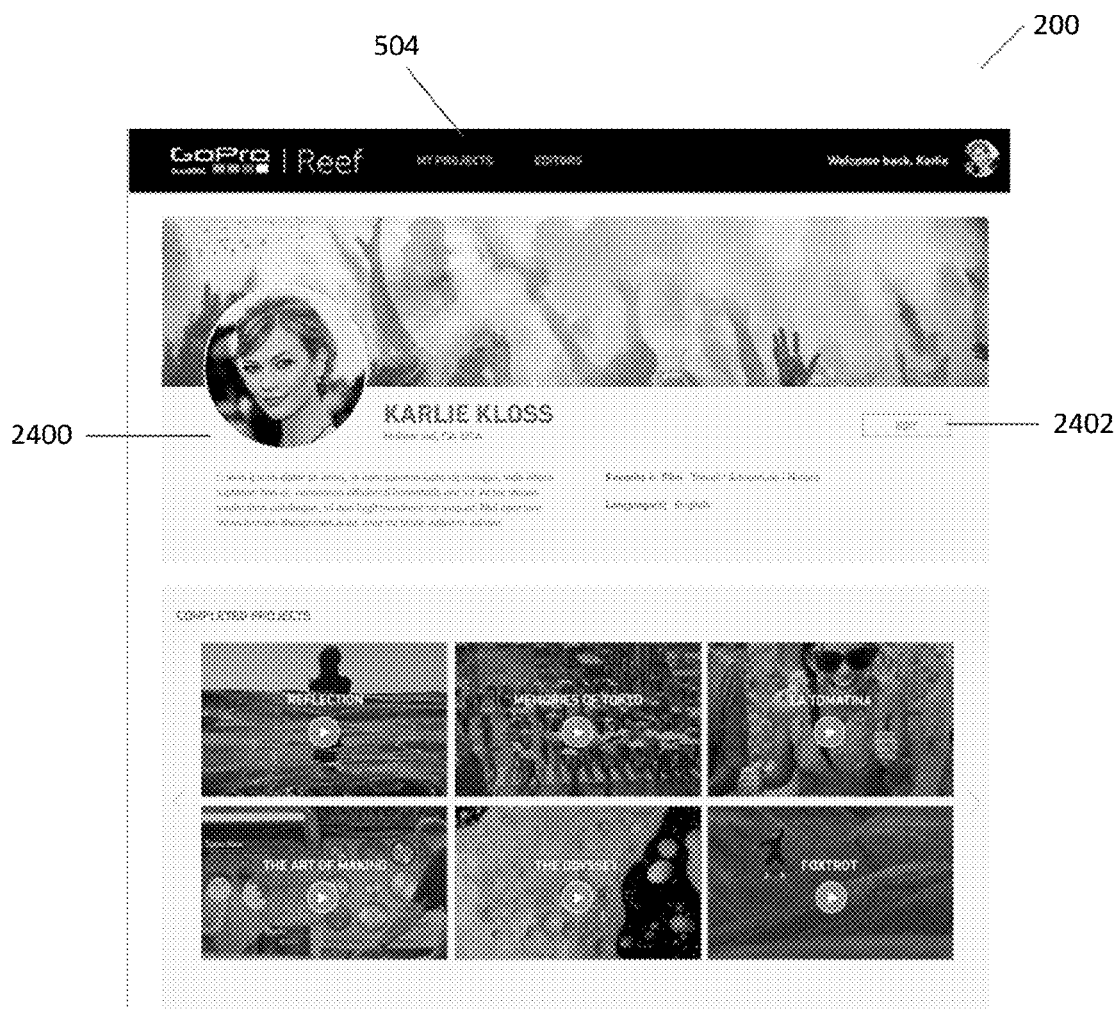
FIGS. 24-25 illustrate exemplary depictions of a user interface of a content editing marketplace, in accordance with one or more implementations.

Referring to FIG. 24, system 100 may effectuate presentation of the end user profile and/or the content capture user profile (e.g., profile 2400). Profile 2400 may include the name of the end user and/or the content capture user, the image associated with the end user and/or the content capture user, the biography of the end user and/or the content capture user, completed projects of the end user and/or the content capture user, languages spoken and/or understood by the end user and/or the content capture user, genres and/or types of digital media content the end user and/or the content capture user is interested in capturing and/or working on, and/or other information related to the end user and/or the content capture user. The end user and/or the content capture user may edit and/or update information displayed within profile 1900 via "EDIT" button 2402.

While not shown, profile 2400 may include feedback information associated with the end user and/or the content capture user. Feedback information associated with the end user and/or the content capture user may be provided by other users of the content editing marketplace. For example, system 100 may be configured to receive feedback information from one or more client computing platform(s) 104 associated with the selected post-capture user. The feedback information received from the selected post-capture user may include feedback information relating to capture of the digital media content. The feedback information may include ratings, reviews, comments, and/or other feedback information. For example, the post-capture user may provide feedback information indicating that the end user and/or the content capture user is very skilled in capturing watersport related content, but not particularly skilled in capturing motorsport related content. The feedback information may include a rating system including a number of stars, whether the post-capture user would recommend the end user and/or the content capture user to others, etc. System 100 may be configured to post the feedback information to the end user profile and/or the content capture user profile such that other users of the content editing marketplace may view the feedback information in order to make an informed decision about using the end user and/or the content capture user to capture digital media content.

In a similar manner, system 100 may be configured to receive feedback information associated with the selected post-capture user from the end user and/or the content capture user via one or more client computing platform(s) 104. For example, the end user and/or the content capture user may provide feedback information indicating that the post-capture user did an overall excellent job at editing the digital media content, but did not include enough footage of one or more of the selected moments of interest that the end user and/or the content capture user wanted to include within the edited version of the digital media content. The feedback information may include a rating system including a number of stars, whether the end user and/or the content capture user would recommend the post-capture user to others, etc. System 100 may be configured to post the feedback information to the post-capture user profile such that other users of the content editing marketplace may view the feedback information in order to make an informed decision about using the post-capture user to edit his or her digital media content.

Figure 25:
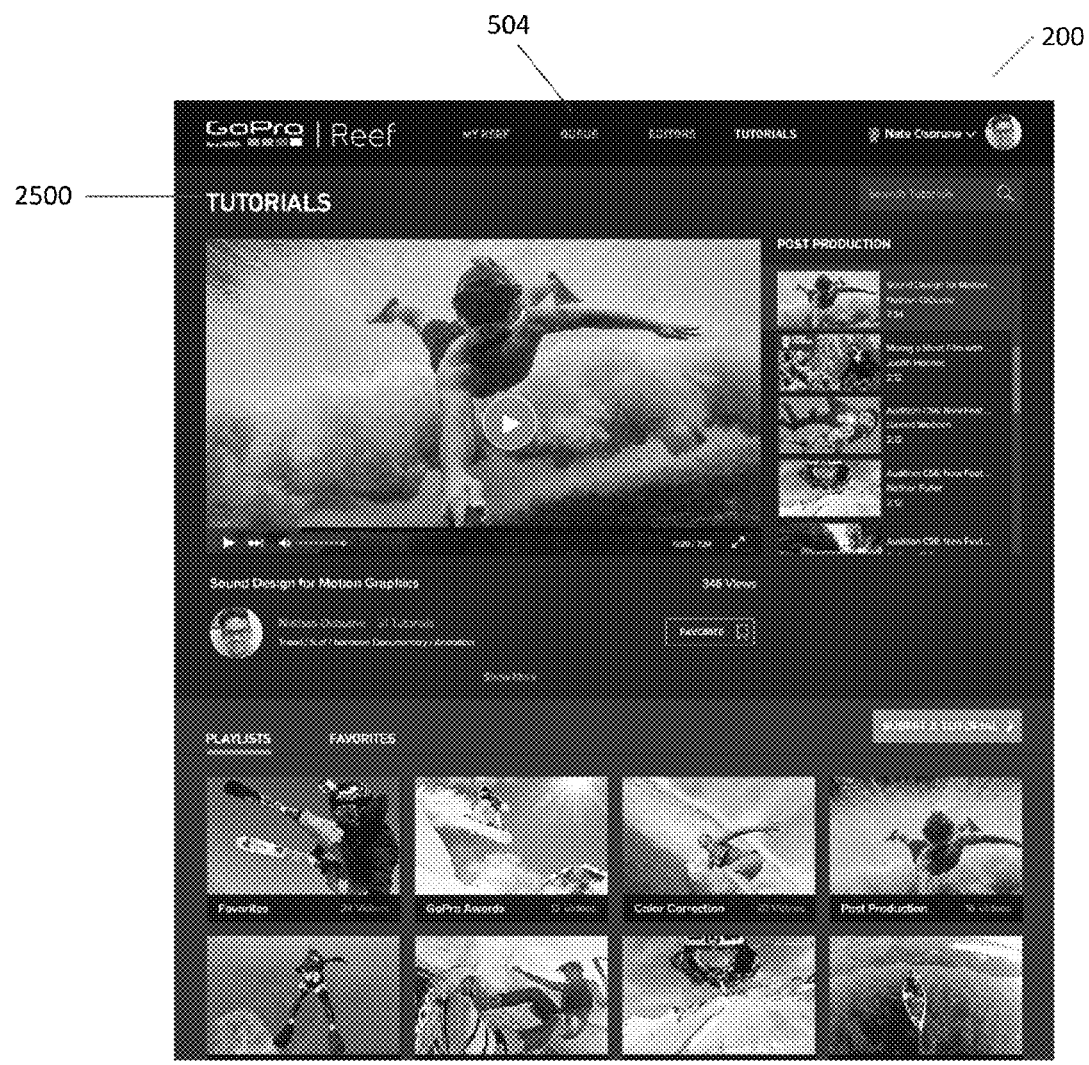

Referring to FIG. 25, the content editing marketplace may include tutorials for capturing and/or editing digital media content. Tutorials may include videos, descriptions, audio files, presentations, and/or other forms of educational material. As shown in FIG. 25, tutorials may include color correction tutorials, post production tutorials, (e.g., sound design for motion graphics, making a short film, etc.) and/or other tutorials. System 100 may be configured to receive and/or obtain tutorials from one or more client computing platform(s) 104 via tutorials page 2500. System 100 may be configured to effectuate presentation of the tutorials within tutorials page 2500. Users of the content editing marketplace may view and/or consume the tutorials within tutorials page 2500. One or more of the tutorials may be exclusive to particular users of the content editing marketplace. For example, one or more of the tutorials may be exclusive to post-capture users, while other tutorials may be available for viewing by any and/or all users of system 100. System 100 may navigate users to tutorials page 2500 via navigation menu 504 within user interface 200.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, a given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 107, 108, 109, 110, 111, and/or other components. The processor(s) 124 may be configured to execute components 106, 107, 108, 109, 110, 111, and/or other components by software; hardware; firmware; some combination of software, hardware, and/or firmware; and/or other mechanisms for configuring processing capabilities on processor(s) 124.

It should be appreciated that although components 106, 107, 108, 109, 110, and 111 are illustrated in FIG. 1 as being co-located within a single processing unit, in implementations in which processor(s) 124 includes multiple processing units, one or more of components 106, 107, 108, 109, 110, and/or 111 may be located remotely from the other components. The description of the functionality provided by the different components 106, 107, 108, 109, 110, and/or 111 described herein is for illustrative purposes, and is not intended to be limiting, as any of components 106, 107, 108, 109, 110, and/or 111 may provide more or less functionality than is described. For example, one or more of components 106, 107, 108, 109, 110, and/or 111 may be eliminated, and some or all of its functionality may be provided by other ones of components 106, 107, 108, 109, 110, and/or 111. As another example, processor(s) 124 may be configured to execute one or more additional components that may perform some or all of the functionality attributed herein to one of components 106, 107, 108, 109, 110, and/or 111.

Figure 26:
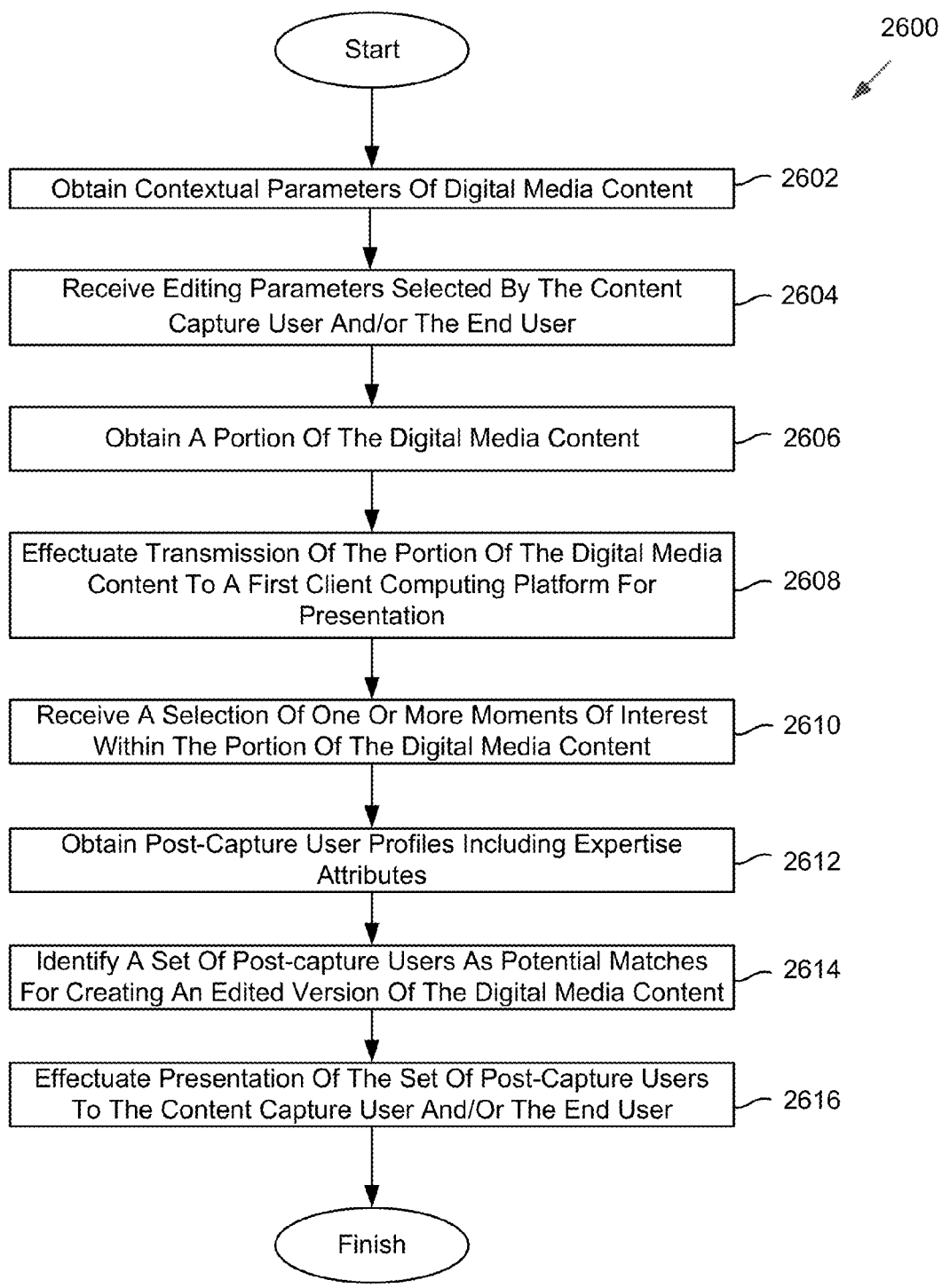
FIG. 26 illustrates a method for generating recommendations of post-capture users to edit digital media content, in accordance with one or more implementations.

FIG. 26 illustrates a method 2600 that generates recommendations of post-capture users to edit digital media content, in accordance with one or more implementations. The operations of method 2600 presented below are intended to be illustrative. In some implementations, method 2600 may be accomplished with one or more additional operations not described, and/or without one or more of the operations discussed. Additionally, the order in which the operations of method 2600 are illustrated in FIG. 26 and described below is not intended to be limiting.

In some implementations, method 2600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2600 in response to instructions stored electronically on an electronic storage medium. The one or more processing devices may include one or more devices configured through hardware, firmware, and/or software to be specifically designed for execution of one or more of the operations of method 2600.

At an operation 2602, values of contextual parameters of digital media content may be obtained. The digital media content may be associated with a content capture user and/or an end user. The contextual parameters may define one or more temporal attributes and/or spatial attributes associated with capture of the digital media content. Operation 2602 may be performed by a contextual parameters component that is the same as or similar to contextual parameters component 107, in accordance with one or more implementations.

At an operation 2604, values of editing parameters selected by the content capture user and/or the end user may be received. The editing parameters may define one or more editing attributes of an edited version of the digital media content to be created. The one or more editing attributes may include one or more selected moments of interest within the digital media content to include within the edited version of the digital media content. Operation 2604 may be performed by an editing parameters component that is the same as or similar to editing parameters component 108, in accordance with one or more implementations.

At an operation 2606, a portion of the digital media content may be obtained. Operation 2606 may be performed by an editing parameters component that is the same as or similar to editing parameters component 108, in accordance with one or more implementations.

At an operation 2608, the portion of the digital media content may be transmitted to a first client computing platform for presentation. Operation 2608 may be performed by an editing parameters component that is the same as or similar to editing parameters component 108, in accordance with one or more implementations.

At an operation 2610, a selection of one or more moments of interest within the portion of the digital media content may be received. Operation 2610 may be performed by an editing parameters component that is the same as or similar to editing parameters component 108, in accordance with one or more implementations.

At an operation 2612, post-capture user profiles may be obtained. Individual post-capture user profiles may include expertise attributes associated with individual post-capture users. The expertise attributes may include stated information and feedback information. The stated information may be provided by the post-capture users themselves and the feedback information may include information provided by one or more of content capture users and/or end users for whom the individual post-capture users have created edited versions of other digital media content. Operation 2612 may be performed by a profile component that is the same as or similar to profile component 109, in accordance with one or more implementations.

At an operation 2614, a set of post-capture users may be identified as potential matches for creating the edited version of the digital media content based upon one or more of the contextual parameter values, the editing parameter values, the one or more expertise attributes of the post-capture user profiles, and/or other information. Operation 2614 may be performed by an identification component that is the same as or similar to identification component 110, in accordance with one or more implementations.

At an operation 2616, the set of post-capture users may be presented to the content capture user and/or the end user for selection by the content capture user and/or the end user of one of the post-capture users from the set of post-capture users to create the edited version of the digital media content. Operation 2616 may be performed by a presentation component that is the same as or similar to presentation component 111, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that generates recommendations of post-capture users to edit digital media content, the system comprising:
one or more physical computer processors configured by computer readable instructions to:
obtain contextual parameters of digital media content, the digital media content being associated with a content capture user and/or an end user, the contextual parameters defining one or more temporal attributes and/or spatial attributes associated with capture of the digital media content;

receive editing parameters selected by the content capture user and/or the end user, the editing parameters defining one or more editing attributes of an edited version of the digital media content to be created, the one or more editing attributes including one or more selected moments of interest within the digital media content to include within the edited version of the digital media content, wherein receiving the one or more selected moments of interest includes:
obtaining, via a first client computing platform, a portion of the digital media content, the portion of the digital media content having a time duration;
effectuate transmission of the portion of the digital media content to the first client computing platform for presentation; and
receiving, from the first client computing platform, a selection of one or more moments of interest within the portion of the digital media content, individual moments of interest corresponding to individual points in time within the time duration of the portion of the digital media content;
obtain post-capture user profiles, individual post-capture user profiles including expertise attributes associated with individual post-capture users, the expertise attributes including stated information and feedback information, the stated information being provided by the post-capture users themselves and the feedback information including information provided by one or more of content capture users and/or end users for whom the individual post-capture users have created edited versions of other digital media content;
identify a set of post-capture users as potential matches for creating the edited version of the digital media content based upon the contextual parameters, the editing parameters, and the one or more expertise attributes of the post-capture user profiles; and
effectuate presentation of the set of post-capture users to the content capture user and/or the end user for selection by the content capture user and/or the end user of one of the post-capture users from the set of post-capture users to create the edited version of the digital media content.

2. The system of claim 1, wherein the one or more processors are further configured to:
tag the individual moments of interest at individual points in time within the time duration of the portion of the digital media content.

3. The system of claim 1, wherein receiving the one or more selected moments of interest includes:
receiving, from the first client computing platform, tag information associated with the one or more moments of interest, the tag information including instructions for editing the digital media content.

4. The system of claim 1, wherein the digital media content includes a spherical video segment.

5. The system of claim 4, wherein receiving the one or more selected moments of interest includes:
receiving, from the first client computing platform, a selection of a field of view within the spherical video segment.

6. The system of claim 1, wherein receiving the one or more selected moments of interest includes:
obtaining individual images associated with the individual moments of interest from the portion of the digital media content at individual points in time within the time duration, including obtaining a first image from the portion of the digital media content at a first point in time of a first moment of interest.

7. The system of claim 1, wherein the one or more processors are further configured to:
receive a selection of one of the post-capture users from the set of post-capture users to create the edited version of the digital media content.

8. The system of claim 7, wherein the one or more processors are further configured to:
obtain, via a second client computing platform associated with the selected post-capture user, a portion of the edited version of the digital media content, the portion of the edited version of the digital media content having an edited time duration;
effectuate transmission of the portion of the edited version of the digital media content to the second client computing platform for presentation; and
receive, from the second client computing platform, a selection of one or more edited moments of interest within the portion of the edited version of the digital media content, individual edited moments of interest corresponding to individual points in time within the edited time duration of the portion of the edited version of the digital media content.

9. The system of claim 8, wherein the one or more processors are further configured to:
tag the individual edited moments of interest at individual points in time within the edited time duration of the portion of the edited version of the digital media content.

10. The system of claim 9, wherein receiving the one or more selected edited moment of interest includes:
receiving, from the second client computing platform, tag information associated with the one or more edited moments of interest, the tag information including comments associated with the edited version of the digital media content.

11. A method that generates recommendations of post-capture users to edit digital media content, the method comprising:
obtaining contextual parameters of digital media content, the digital media content being associated with a content capture user and/or an end user, the contextual parameters defining one or more temporal attributes and/or spatial attributes associated with capture of the digital media content;
receiving editing parameters selected by the content capture user and/or the end user, the editing parameters defining one or more editing attributes of an edited version of the digital media content to be created, the one or more editing attributes including one or more selected moments of interest within the digital media content to include within the edited version of the digital media content, wherein receiving the one or more selected moments of interest includes:
obtaining, via a first client computing platform, a portion of the digital media content, the portion of the digital media content having a time duration;
effectuate transmission of the portion of the digital media content to the first client computing platform for presentation; and
receiving, from the first client computing platform, a selection of one or more moments of interest within the portion of the digital media content, individual moments of interest corresponding to individual points in time within the time duration of the portion of the digital media content;

obtaining post-capture user profiles, individual post-capture user profiles including expertise attributes associated with individual post-capture users, the expertise attributes including stated information and feedback information, the stated information being provided by the post-capture users themselves and the feedback information including information provided by one or more of content capture users and/or end users for whom the individual post-capture users have created edited versions of other digital media content;

identifying a set of post-capture users as potential matches for creating the edited version of the digital media content based upon the contextual parameters, the editing parameters, and the one or more expertise attributes of the post-capture user profiles; and effectuate presentation of the set of post-capture users to the content capture user and/or the end user for selection by the content capture user and/or the end user of one of the post-capture users from the set of post-capture users to create the edited version of the digital media content.

12. The method of claim 11, further comprising:
tagging the individual moments of interest at individual points in time within the time duration of the portion of the digital media content.

13. The method of claim 11, wherein receiving the one or more selected moments of interest includes:
receiving, from the first client computing platform, tag information associated with the one or more moments of interest, the tag information including instructions for editing the digital media content.

14. The method of claim 11, wherein the digital media content includes a spherical video segment.

15. The method of claim 14, wherein receiving the one or more selected moments of interest includes:
receiving, from the first client computing platform, a selection of a field of view within the spherical video segment.

16. The method of claim 11, wherein receiving the one or more selected moments of interest includes:
obtaining individual images associated with the individual moments of interest from the portion of the digital media content at individual points in time within the time duration, including obtaining a first image from the portion of the digital media content at a first point in time of a first moment of interest.

17. The method of claim 11, further comprising:
receiving a selection of one of the post-capture users from the set of post-capture users to create the edited version of the digital media content.

18. The method of claim 17, further comprising:
obtaining, via a second client computing platform associated with the selected post-capture user, a portion of the edited version of the digital media content, the portion of the edited version of the digital media content having an edited time duration;

effectuate transmission of the portion of the edited version of the digital media content to the second client computing platform for presentation; and receiving, from the second client computing platform, a selection of one or more edited moments of interest within the portion of the edited version of the digital media content, individual edited moments of interest corresponding to individual points in time within the edited time duration of the portion of the edited version of the digital media content.

19. The method of claim 18, further comprising:
tagging the individual edited moments of interest at individual points in time within the edited time duration of the portion of the edited version of the digital media content.

20. The method of claim 19, wherein receiving the one or more selected edited moment of interest includes:
receiving, from the second client computing platform, tag information associated with the one or more edited moments of interest, the tag information including comments associated with the edited version of the digital media content.

* * * * *